(12) United States Patent
Somichetty et al.

(10) Patent No.: US 10,939,432 B2
(45) Date of Patent: Mar. 2, 2021

(54) TIME-DIVISION DUPLEX FRAME STRUCTURE FOR NARROWBAND COMMUNICATIONS

(71) Applicant: QUALCOMM Incorporated, San Diego, CA (US)

(72) Inventors: Gowrisankar Somichetty, Bangalore (IN); Kapil Bhattad, Bangalore (IN); Alberto Rico Alvarino, San Diego, CA (US); Xiao Feng Wang, San Diego, CA (US); Manikandan Chandrasekar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/415,963

(22) Filed: May 17, 2019

(65) Prior Publication Data

US 2019/0274141 A1  Sep. 5, 2019

Related U.S. Application Data

(63) Continuation of application No. 15/724,164, filed on Oct. 3, 2017, now Pat. No. 10,420,102.

(30) Foreign Application Priority Data

Feb. 15, 2017 (IN) .............................. 201741005360

(51) Int. Cl.
*H04W 72/04* (2009.01)
*H04L 5/00* (2006.01)
(Continued)

(52) U.S. Cl.
CPC .......... *H04W 72/0446* (2013.01); *H04L 1/00* (2013.01); *H04L 1/1812* (2013.01);
(Continued)

(58) Field of Classification Search
None
See application file for complete search history.

(56) References Cited

U.S. PATENT DOCUMENTS 9,119,132 B2   8/2015  Luo et al.
9,560,635 B2   1/2017  Wei et al.
(Continued)

FOREIGN PATENT DOCUMENTS

CN    105656597 A    6/2016
EP      3264829 A1    1/2018
(Continued)

OTHER PUBLICATIONS

Alcatel-Lucent Shanghai Bell: "Considerations of TDD NB-IoT" [online], 3GPP TSG RAN WG1 adhoc_LTE_NB-IoT_1601 R1-160181, Nov. 8, 2016, 4 Pages, Internet URL:http://www.3gpp.org/ftp/tsg_ran/WG1_RL1/TSGR1_AH/LTE_NB-IoT_1601/Docs/R1-160181.zip.

(Continued)

*Primary Examiner* — Hong S Cho
(74) *Attorney, Agent, or Firm* — Arent Fox LLP; Nerrie M. Zohn

(57) ABSTRACT

There is a need to support TDD frame structure for narrowband communications. The present disclosure provides a solution by supporting one or more TDD frame structure(s) for narrowband communications. In an aspect of the disclosure, a method, a computer-readable medium, and an apparatus are provided. The apparatus may determine to receive a narrowband physical downlink channel in a first subframe in a TDD frame structure of a plurality of TDD frame structures for narrowband communications. The TDD frame structures may include one or more special subframes, and the first subframe may be a downlink subframe. The apparatus may receive the narrowband physical downlink channel in a special subframe of the narrowband TDD frame (Continued)

structure, if the number of downlink OFDM symbols in the special subframe is greater than a predetermined threshold.

18 Claims, 33 Drawing Sheets

(51) Int. Cl.
| | | |
|---|---|---|
| H04L 1/00 | (2006.01) | |
| H04L 5/14 | (2006.01) | |
| H04L 1/18 | (2006.01) | |
| H04W 72/14 | (2009.01) | |
| H04W 88/08 | (2009.01) | |
| H04W 88/02 | (2009.01) | |

(52) U.S. Cl.
CPC ............ *H04L 1/1819* (2013.01); *H04L 5/001* (2013.01); *H04L 5/0044* (2013.01); *H04L 5/0048* (2013.01); *H04L 5/0053* (2013.01); *H04L 5/0055* (2013.01); *H04L 5/0092* (2013.01); *H04L 5/14* (2013.01); *H04L 5/1469* (2013.01); *H04W 72/042* (2013.01); *H04W 72/0413* (2013.01); *H04W 72/14* (2013.01); *H04L 5/0094* (2013.01); *H04W 88/02* (2013.01); *H04W 88/08* (2013.01)

(56) References Cited

U.S. PATENT DOCUMENTS

| | | | |
|---|---|---|---|
| 9,713,026 | B2 | 7/2017 | Gaal et al. |
| 10,104,651 | B2 * | 10/2018 | Chen ............... H04L 5/0048 |
| 10,165,423 | B2 | 12/2018 | Rico Alvarino et al. |
| 2009/0093257 | A1 | 4/2009 | Rinne et al. |
| 2011/0310856 | A1 | 12/2011 | Hariharan et al. |
| 2012/0100847 | A1 | 4/2012 | Rahman |
| 2013/0083749 | A1 | 4/2013 | Xu et al. |
| 2013/0250882 | A1 | 9/2013 | Dinan |
| 2013/0272215 | A1 | 10/2013 | Khoryaev et al. |
| 2013/0315159 | A1 | 11/2013 | Xia et al. |
| 2014/0029568 | A1 | 1/2014 | Wang et al. |
| 2014/0119332 | A1 | 5/2014 | Kim et al. |
| 2014/0204961 | A1 | 7/2014 | Hooli et al. |
| 2014/0307685 | A1 | 10/2014 | Takano et al. |
| 2015/0078220 | A1 | 3/2015 | Hu et al. |
| 2015/0124663 | A1 | 5/2015 | Chen et al. |
| 2015/0327324 | A1 | 11/2015 | Wei et al. |
| 2016/0315752 | A1 | 10/2016 | Chen et al. |
| 2016/0345118 | A1 | 11/2016 | Oh |
| 2017/0041122 | A1 * | 2/2017 | Li ..................... H04W 52/242 |
| 2017/0070968 | A1 | 3/2017 | Kim et al. |
| 2017/0163396 | A1 | 6/2017 | Blankenship |
| 2017/0180086 | A1 | 6/2017 | Xiong et al. |
| 2017/0187563 | A1 | 6/2017 | Shin et al. |
| 2017/0195102 | A1 | 7/2017 | Xiong et al. |
| 2017/0202025 | A1 | 7/2017 | Ouchi et al. |
| 2017/0273059 | A1 * | 9/2017 | You ..................... H04L 5/0094 |
| 2017/0279472 | A1 | 9/2017 | Wong et al. |
| 2017/0311276 | A1 | 10/2017 | Tsai et al. |
| 2017/0373900 | A1 | 12/2017 | Adhikary et al. |
| 2018/0007667 | A1 | 1/2018 | You et al. |
| 2018/0014284 | A1 | 1/2018 | Yi et al. |
| 2018/0049047 | A1 | 2/2018 | Lin et al. |
| 2018/0049151 | A1 | 2/2018 | Yoon et al. |
| 2018/0062699 | A1 | 3/2018 | Horiuchi et al. |
| 2018/0069593 | A1 | 3/2018 | Yi |
| 2018/0077703 | A1 | 3/2018 | Sun et al. |
| 2018/0124789 | A1 | 5/2018 | Yerramalli et al. |
| 2018/0176893 | A1 * | 6/2018 | Zhang ............... H04W 74/0833 |
| 2018/0234169 | A1 | 8/2018 | Sridharan et al. |
| 2018/0234170 | A1 | 8/2018 | Sridharan et al. |
| 2018/0234171 | A1 | 8/2018 | Sridharan et al. |
| 2018/0234173 | A1 | 8/2018 | Sridharan et al. |
| 2018/0234219 | A1 | 8/2018 | Sridharan et al. |
| 2018/0234229 | A1 | 8/2018 | Somichetty et al. |
| 2018/0234951 | A1 | 8/2018 | Somichetty et al. |
| 2018/0234966 | A1 | 8/2018 | Somichetty et al. |
| 2018/0241495 | A1 | 8/2018 | Xue et al. |
| 2018/0248671 | A1 | 8/2018 | Bhattad et al. |
| 2018/0316464 | A1 * | 11/2018 | Stern-Berkowitz ........................ H04L 1/1657 |
| 2018/0317244 | A1 | 11/2018 | Um et al. |
| 2019/0013984 | A1 | 1/2019 | Liang et al. |
| 2019/0124663 | A1 | 4/2019 | Liu et al. |
| 2019/0150164 | A1 | 5/2019 | Nam et al. |
| 2019/0182021 | A1 * | 6/2019 | Shokri Razaghi ...... H04L 67/10 |
| 2019/0319698 | A1 | 10/2019 | Sridharan et al. |
| 2019/0327735 | A1 | 10/2019 | Somichetty et al. |
| 2019/0349138 | A1 | 11/2019 | Hosseini et al. |
| 2020/0084770 | A1 | 3/2020 | Somichetty et al. |
| 2020/0112955 | A1 | 4/2020 | Somichetty et al. |

FOREIGN PATENT DOCUMENTS

| | | |
|---|---|---|
| EP | 3300287 A1 | 3/2018 |
| JP | 2018533877 A | 11/2018 |
| JP | 2020507277 A | 3/2020 |
| KR | 20170012150 A | 2/2017 |
| WO | WO-2009049167 A2 | 4/2009 |
| WO | 2014165838 A2 | 10/2014 |
| WO | WO-2014186456 A1 | 11/2014 |
| WO | 2015018368 A1 | 2/2015 |
| WO | 2016119162 A1 | 8/2016 |
| WO | 2016123292 A1 | 8/2016 |
| WO | 2016154835 A1 | 10/2016 |
| WO | WO-2016159697 A1 | 10/2016 |
| WO | WO-2016172293 A1 | 10/2016 |
| WO | 2016182639 A1 | 11/2016 |
| WO | 2016190537 A1 | 12/2016 |
| WO | 2016190620 A1 | 12/2016 |
| WO | WO-2016209833 A1 | 12/2016 |
| WO | WO-2017011093 A1 | 1/2017 |
| WO | WO-2017011105 A1 | 1/2017 |
| WO | 2017078802 A1 | 5/2017 |
| WO | 2017136003 A1 | 8/2017 |
| WO | WO-2017167839 A1 | 10/2017 |
| WO | 2018026199 A1 | 2/2018 |
| WO | 2018030936 A1 | 2/2018 |

OTHER PUBLICATIONS

Intel Corporation: "On Layer 1 Design and Procedures for NB-IoT Downlink", 3GPP TSG RAN WG1 Meeting #83 R1-156529, Nov. 7, 2015, 8 pages.

Nokia Networks Alcatel-Lucent, Alcatel-Lucent Shanghai Bell: "Synchronization Signal Design for NB-IoT" [online], 3GPP TSG-RAN WG1 # 84 R1-160449, Feb. 5, 2016, 7 pages, Retrieved from the Internet URL: http://www.3gpp.org/ftp/tsg_ran/WG1_RL1/TSGR1_84/Docs/R1-160449.zip.

WI Rapporteur (Ericsson): "RAN1 Agreements for Rel-13 NB-IoT" [online], 3GPP TSG-RAN WG1 NB-IoT Ad-Hoc Meeting R1-162038, Mar. 24, 2016, 19 Pages, URL:http://www.3gpp.org/ftp/tsg_ran/WG1_RL1/TSGR1_AH/LTE_NB-IoT_1603/Docs/R1-162038.zip.

"3rd Generation Partnership Project; Technical Specification Group Radio Access Network; Evolved Universal Terrestrial Radio Access (EUTRA); Physical Channels and Modulation (Release 14)", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V14.1.0, Jan. 2, 2017 (Jan. 2, 2017), XP051230335, pp. 140-175, [retrieved on Jan. 2, 2017].

Huawei, et al., "TS 36300 Section 5 for NB-IoT up to RAN1#84," 3GPP Draft; R1-161554, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016, Mar. 2, 2016, XP051079463, Retrieved from the Internet: URL: http://www.3gpp.org/ftp/tsg_ran/WG1_RL1/TSGR1_84/Docs/ [retrieved on Mar. 2, 2016], 16 pages.

Huawei et al., "DCI for NB-IoT," 3GPP Draft; R1-160032, 3rd Generation Partnership Project (3GPP), Mobile Competence Cen-

(56) References Cited

OTHER PUBLICATIONS tre, 650, Route Des Lucioles, F-06921 Sophia-Antipolis Cedex, France vol. RAN WG1, No. Budapest, HU, Jan. 18, 2016-Jan. 20, 2016 Jan. 17, 2016 (Jan. 17, 2016). XP051053355, Retrieved from the Internet: URL:http://www.3gpp.org/ftp/Meetings_3GPP_SYNC/RAN1/Docs/ [retrieved on Jan. 17, 2016] sections 2. 2.1, 3, 3 pages.
Huawei et al., "On Multi-PRB Operation", 3GPP Draft; R1-161039, 3rd Generation Partnership Project (3GPP), Mobile Competence Centre, 650, Route Des Lucioles, F-06921, Sophia-Antipolis Cedex, France, vol. RAN WG1, No. St Julian's, Malta; Feb. 15, 2016-Feb. 19, 2016 Feb. 14, 2016, XP051054343, Retrieved from the Internet: URL:http://www.3gpp.org/ftp/Meetings_3GPP_SYNC/RAN1/Docs/ [retrieved on Feb. 14, 2016], 3 pages.
Huawei, et al., "TDD Support for NB-IoT in Rel-15", 3GPP draft; RP-162161, 3rd Generation Partnership Project (3GPP), Mobile Competence Centre; 650, Route Des Lucioles; F-06921 Sophia-Antipolis Cedex; France, vol. TSG RAN, No. Vienna, Austria; Dec. 5, 2016-Dec. 8, 2016, Dec. 4, 2016 (Dec. 4, 2016), XP051183589, pp. 1-9, Retrieved from the Internet:URL:http://www.3gpp.org/ftp/Meetings_3GPP_SYNC/RAN/Docs/ [retrieved on Dec. 4, 2016].
Huawei., et al., "Synchronization Signal Design," 3GPP Draft; R1-160311, 3rd Generation Partnership Project (3GPP), Mobile Competence Centre; 650, Route Des Lucioles; F-06921 Sophia-Antipolis Cedex; France; vol. RAN WG1, No. St Julian's, Malta; Feb. 15, 2016-Feb. 19, 2016; Feb. 14, 2016 (Feb. 14, 2016), 10 pages, XP051053651, Retrieved from the Internet: URL:http://www.3gpp.org/ftp/Meetings_3GPP_SYNC/RAN1/Docs/ [retrieved on Feb. 14, 2016], the whole document.
International Search Report and Written Opinion—PCT/US2018/017626—ISA/EPO—dated May 23, 2018.
LG Electronics: "Discussion on Multiple PRB Operation for SIB1 Transmission", 3GPP Draft; R1-160615 NB-SIB, 3rd Generation Partnership Project (3GPP), Mobile Competence Centre, 650, Route Des Lucioles, F-06921, Sophia-Antipolis Cedex, France, vol. RAN WG1, No. St. Julian's, Malta; Feb. 15, 2016-Feb. 19, 2016 Feb. 14, 2016, XP051053944, Retrieved from the Internet: URL:http://www.3gpp.org/ftp/Meetings_3GPP_SYNC/ RAN1/Docs/ [retrieved on Feb. 14, 2016], 3 pages.
Nokia, et al., "Existing Downlink Signals for OTDOA Positioning in NB-IoT," 3GPP Draft; R1-1608881, 3rd Generation Partnership Project (3GPP), Mobile Competence Centre; 650, Route Des Lucioles; F-06921 Sophia-Antipolis Cedex; France vol. RAN WG1, No. Lisbon, Portugal; Oct. 10, 2016-Oct. 14, 2016, Oct. 9, 2016, 3 pages, XP051148935, Retrieved from the Internet: URL:http://www.3gpp.org/ftp/Meetings_3GPP_SYNC/RAN1/Docs/ [retrieved on Oct. 9, 2016].
Nokia Networks, et al., "Synchronization Signal Design for NB-IoT", 3GPP Draft; R1-161104, 3rd Generation Partnership Project (3GPP), vol. RAN WG1, No. St Julian's, Malta; Feb. 15, 2016-Feb. 19, 2016, Feb. 24, 2016 (Feb. 24, 2016), XP051079077, Retrieved from the Internet: URL: http://www.3gpp.org/ftp/tsg_ran/WG1_RL1/TSGR1_84/Docs/ [retrieved on Feb. 24, 2016].
Nokia Networks: "On the TDD Support for NB-IoT," 3GPP Draft; R1-160011, 3rd Generation Partnership Project (3GPP), Mobile Competence Centre; 650, Route Des Lucioles; F-06921 Sophia-Antipolis Cedex; France, vol. RAN WG1, No. Budapest, HU; Jan. 17, 2016, XP051053334, Retrieved from the Internet: URL: http://www.3gpp.org/ftp/Meetings_3GPP_SYNC/RAN1/Docs/ [retrieved on Jan. 17, 2016].
Nokia Networks: "On the Synchronization Signal Design for NB-IoT", 3GPP Draft; R1-157274, 3rd Generation Partnership Project (3GPP), Mobile Competence Centre, 650, Route Des Lucioles, F-06921, Sophia-Antipolis Cedex, France, vol. RAN WG1, No. Anaheim, USA; Nov. 15, 2015-Nov. 22, 2015 Nov. 15, 2015, XP051003479, Retrieved from the Internet: URL:http://www.3gpp.org/ftp/Meetings_3GPP_SYNC/RAN1/Docs/ [retrieved on Nov. 15, 2015], 9 pages.
Qualcomm Incorporated: "Physical Channel Time and Frequency Relationship", 3GPP Draft, R1-155704, Physical Channel Time and Frequency Relationship, 3rd Generation Partnership Project (3GPP), Mobile Competence Centre, 650, Route Des Lucioles, F-06921, Sophia-Antipolis Cedex, vol. RAN WG1, No. Malmo, Sweden, Oct. 5, 2015-Oct. 9, 2015, Oct. 4, 2015 (Oct. 4, 2015), XP051002533,Retrieved from the Internet: URL:http://www.3gpp.org/ftp/Meetings_3GPP_SYNC/RAN1/Docs/.
Samsung: "Discussion on Forward Compatibility for NR," 3GPP Draft; R1-166743, Forward Compatibility Final, 3rd Generation Partnership Project (3GPP), Mobile Competence Centre; 650, Route Des Lucioles; F-06921, Sophia-Antipolis Cedex; France vol. RAN WG1, No. Gothenburg, Sweden; Aug. 22, 2016-Aug. 26, 2016, Aug. 21, 2016, pp. 1-4, XP051125541, Retrieved from the Internet: URL: http://www.3gpp.org/ftp/Meetings_3GPP_SYNC/RAN1/Docs/ [retrieved on Aug. 21, 2016].
WI Rapporteur (Ericsson): "RAN2 Agreements for Rel-13 eMTC sorted and Edited by Topic," 3GPP Draft; R1-161546 RAN1 Agreements for Rel-13 eMTC Sorted by Topic with SPEC Impacts—with Change Tracking, 3rd Generation Partnership Project (3GPP), Mobile Competence Centre; 650, Route Des Luc, vol. RAN WG1, No. St Julian's, Malta; Feb. 15, 2016-Feb. 19, 2016, Feb. 24, 2016, XP051079451, 44 pages, Retrieved from the Internet: URL: http://www.3gpp.org/ftp/tsg_ran/WG1_RL1/TSGR1_84/Docs/ [retrieved on Feb. 24, 2016].
WI Rapporteur (Ericsson): "RAN1 agreements for Rel-13 NB-IoT",3GPP Draft; R1-165977, 3rd Generation Partnership Project (3GPP), Mobile Competence Centre, 650, Route Des Lucioles, F-06921, Sophia-Antipolis Cedex, France, vol. RAN WG1, No. Nanjing, China; Aug. 11, 2016, XP051141850, Retrieved from the Internet: URL:http://www.3gpp.org/ftp/tsg_ran/WG1_RL1/TSGR1_85/Docs/ [retrieved on Aug. 11, 2016], 33 pages.
3GPP TS 36.211: "3rd Generation Partnership Project; Technical Specification Group Radio Access Network; Evolved Universal Terrestrial Radio Access (E-UTRA); Physical channels and modulation (Release 14)", V14.1.0 (Dec. 2016), Jan. 2, 2017, pp. 75-88, 97-101, 117-119, 150-168, URL: http://www.3gpp.org/ftp/Specs/archive/36_series/36.211/36211-e10.zip.
3GPP TS 36.213: "3rd Generation Partnership Project; Technical Specification Group Radio Access Network; Evolved Universal Terrestrial Radio Access (E-UTRA); Physical layer procedures (Release 14)", V14.1.0 (Dec. 2016), Jan. 2, 2017, pp. 384-402, URL: http://www.3gpp.org/ftp/Specs/archive/36_series/36.213/36213-e10.zip.
Ericsson: "Power Consumption and Latency Reduction by Increasing the Maximum NPUSCH Transport Block Size", 3GPP TSG RAN1#86bis, R1-1610399, Oct. 10-14, 2016, pp. 1-4.
Ericsson: "NB-IoT—Synchronization Channel Design", 3GPP TSG-RAN WG1 NB-IOT AdHoc, R1-160079, Jan. 18-22, 2016, Budapest, Hungary, pp. 1-6.
Lenovo., et al., "Views on TDD Downlink Aspect for R.15 NBIoT," 3GPP TSG RAN WG1 Meeting #90bis, R1-1717440, Prague, P.R. Czech Oct. 9-13, 2017 (Oct. 13, 2017), 5 pages.
Samsung: "Discussion on DL Common Channel/Signal for TDD NB-IoT," 3GPP TSG RAN WG1 Meeting #90bis, R1-1717570, Prague, CZ, Oct. 9-13, 2017 (Oct. 13, 2017), pp. 1-4.
ZTE: "Detailed Design on Downlink Aspects to Support TDD NB-IoT," 3GPP TSG RAN WG1 Meeting #90 bis, R1-1717202, Prague, Czech, Oct. 9-13, 2017 (Oct. 13, 2017), 7 pages.
Taiwan Search Report—TW107104685—TIPO—dated Jun. 10, 2020.
ZTE: "NB-PSS and NB-SSS Design for NB-IoT", 3GPP TSG RAN WG1 Meeting #84, 3GPP Draft; R1-161221 NB-PSS and NB-SSS_Updated, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016, Feb. 24, 2016 (Feb. 24, 2016), 9 Pages, XP051079157, Retrieved from the Internet: URL: http://www.3gpp.org/ftp/tsg_ran/WG1_RL1/TSGR1_84/Docs/ [retrieved on Feb. 24, 2016].

* cited by examiner

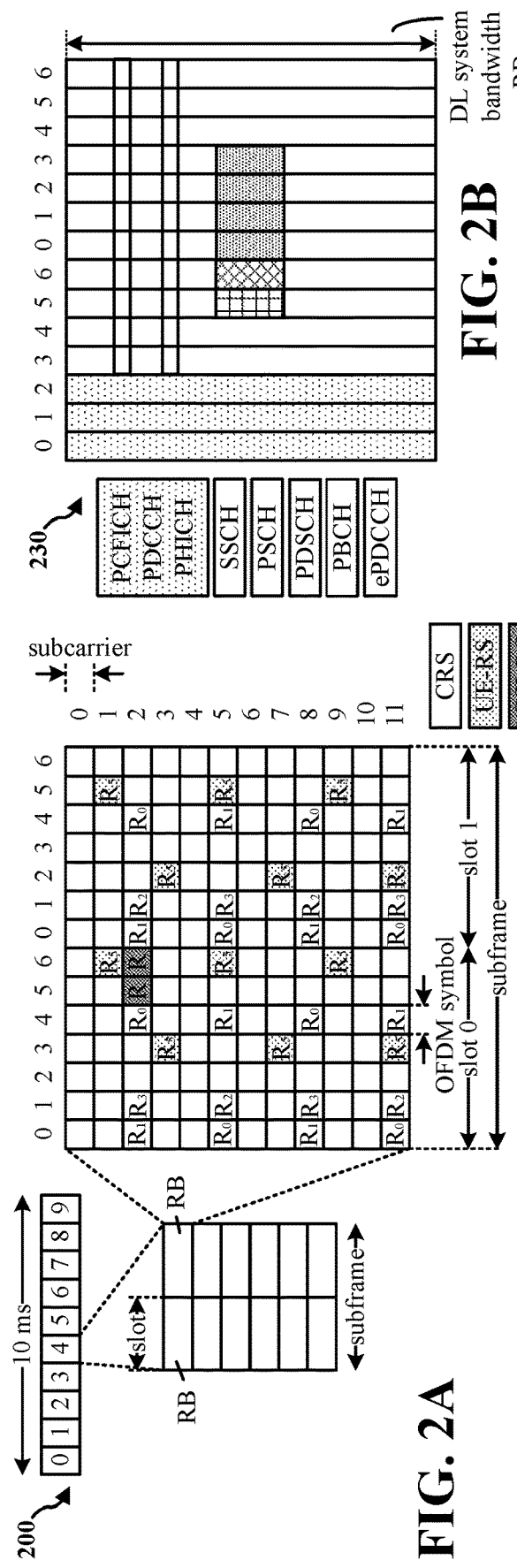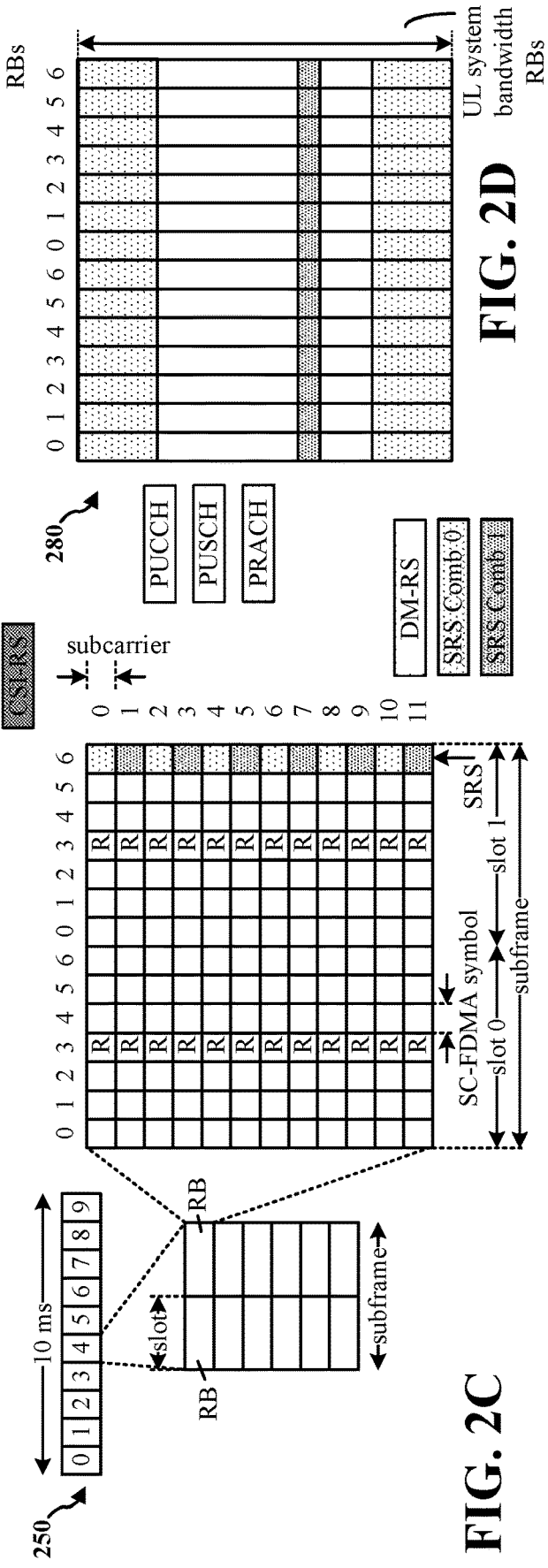
FIG. 2A  FIG. 2B  FIG. 2C  FIG. 2D

| Narrowband UL/DL Configuration | DL-to-UL Switch-Point Periodicity | Subframe Number |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| 0 | 5 ms  | D | S | U | U | U | D | S | U | U | D |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |
| 7 | >10 ms| D | D | D | D | F | F | D | D | D | F |
| 0 | >10 ms| F | F | F | F | F | F | F | S | F | F |

| D | DL Subframe |
| U | UL Subframe |
| S | Special Subframe |
| F | Flexible Subframe |

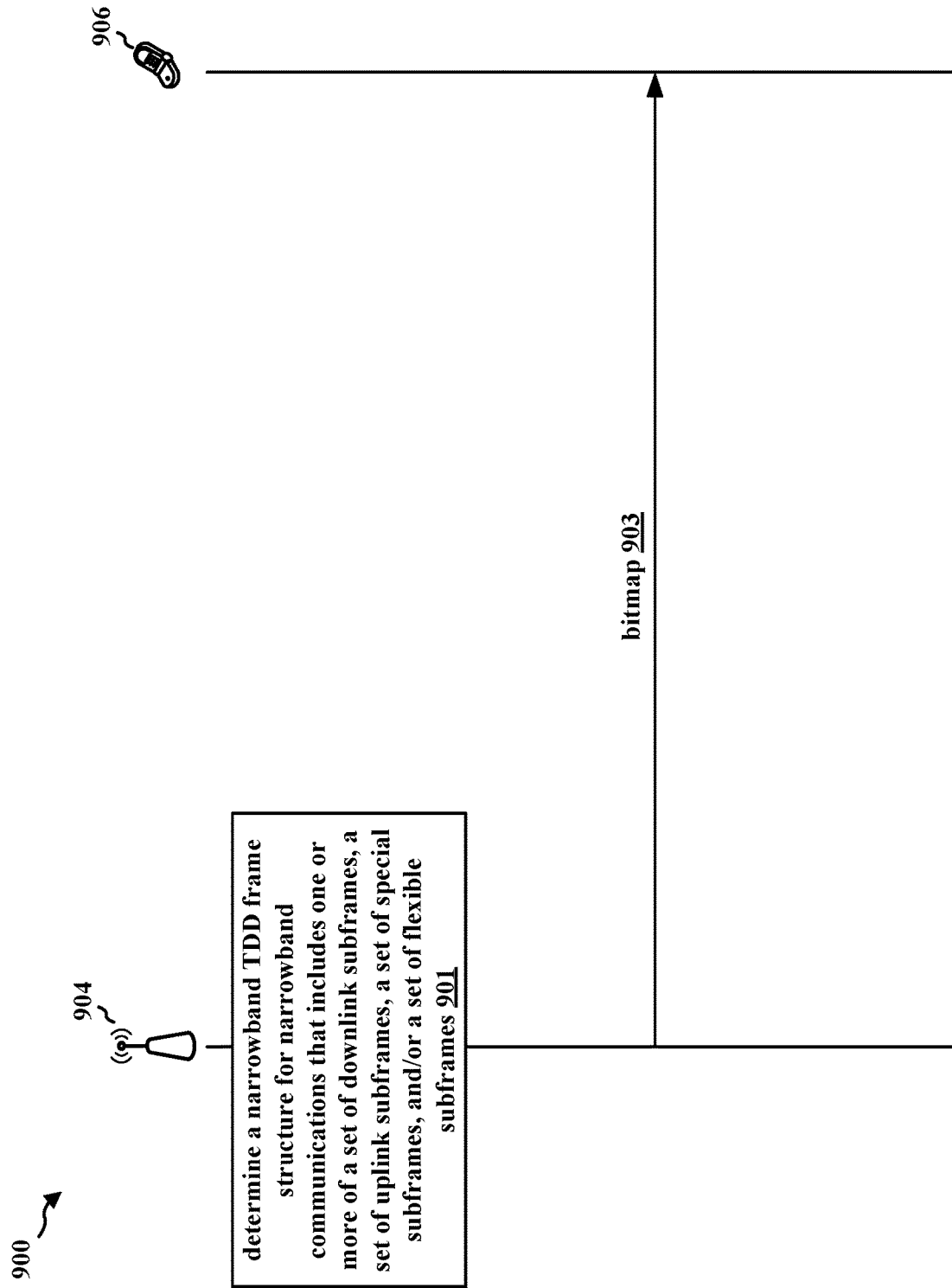

TIME-DIVISION DUPLEX FRAME STRUCTURE FOR NARROWBAND COMMUNICATIONS

CROSS-REFERENCE TO RELATED APPLICATION

This application is a continuation of U.S. patent application Ser. No. 15/724,164, entitled "NARROWBAND TIME-DIVISION DUPLEX FRAME STRUCTURE FOR NARROWBAND COMMUNICATIONS" and filed on Oct. 3, 2017, which claims the benefit of Indian Application Serial No. 201741005360, entitled "NARROWBAND TIME-DIVISION DUPLEX FRAME STRUCTURE FOR NARROWBAND COMMUNICATIONS" and filed on Feb. 15, 2017, the disclosures of which are expressly incorporated by reference herein in their entirety.

BACKGROUND

Field

The present disclosure relates generally to communication systems, and more particularly, to a time-division duplex (TDD) frame structure for narrowband communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Narrowband communications involve communicating with a limited frequency bandwidth as compared to the frequency bandwidth used for LTE communications. One example of narrowband communication is narrowband (NB) IoT (NB-IoT) communication, which is limited to a single resource block (RB) of system bandwidth, e.g., 180 kHz. Another example of narrowband communication is enhanced machine-type communication (eMTC), which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. Because the coverage provided by narrowband communications may include reaching challenging locations (e.g., a smart gas meter located in the basement of a building), there is an increased chance that one or more transmissions will not be properly received. Hence, repeated transmissions may be used in narrowband communication to increase the probability that a transmission will be properly decoded by a receiver device. A TDD frame structure may support repeated transmissions due to an increased number of contiguous downlink and/or uplink subframes, as compared to a frequency division-duplex (FDD) frame structure. Thus, there is a need to support narrowband TDD frame structure for narrowband communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband communications involve communicating with a limited frequency bandwidth as compared to the frequency bandwidth used for LTE communications. One example of narrowband communication is NB-IoT communication, which is limited to a single RB of system bandwidth, e.g., 180 kHz. Another example of narrowband communication is eMTC, which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. However, because the coverage provided by narrowband communications may include reaching challenging locations (e.g., a smart gas meter located in the basement of a building), there is an increased chance that one or more transmissions will not be properly decoded by a receiver device. Consequently, narrowband communication may include a predetermined number of repeated transmissions to increase the chance of having the transmission properly decoded by the receiver device. A TDD frame structure may be used by a narrowband communication system since certain TDD frame configurations may include a greater number of contiguous uplink and/or downlink subframes that may be used for the repeated transmissions, as compared to a FDD frame structure. Thus, there is a need to support the use of narrowband TDD frame structure for narrowband communication.

The present disclosure provides a mechanism to support one or more narrowband TDD frame structure(s) for narrowband communication.

In an aspect of the disclosure, a method, a computer-readable medium, and an apparatus are provided. The apparatus may determine to transmit a narrowband physical downlink channel in a subframe in a narrowband TDD frame structure of a plurality of narrowband TDD frame structures for narrowband communications. In addition, the apparatus may determine whether the subframe is a special subframe or a downlink subframe when the narrowband TDD frame structure includes one or more special subframes. Further, the apparatus may determine how to transmit a narrowband physical downlink channel based on the determination whether the subframe is a special subframe or a downlink subframe. Additionally, the apparatus may transmit the narrowband physical downlink channel.

In another aspect, the apparatus may determine a TDD frame structure of a group of narrowband TDD frame structures for narrowband communications. In addition, the apparatus may allocate at least one RB in the narrowband TDD frame structure for transmitting a narrowband physical downlink channel to a first UE. Further, the apparatus may map a UE-RS to the at least one RB allocated for transmitting the narrowband physical downlink channel. Additionally, the apparatus may transmit the UE-RS to the first UE based on the mapping.

In a further aspect, the apparatus may determine a narrowband TDD frame structure of a group of narrowband TDD frame structures for narrowband communications. In addition, the apparatus may determine a first set of subframes in the narrowband TDD frame structure used for transmitting a downlink control channel to a UE. In one aspect, a last subframe in the first set of subframes may be subframe n. Further, the apparatus may schedule a first uplink subframe in the narrowband TDD frame structure used by the UE for reporting a first ACK/NACK associated with the downlink control channel. In another aspect, the first uplink subframe may be delayed based on $k_0$ number of subframes after the subframe n. Additionally, the apparatus may signal information associated with the $k_0$ number of subframes to the UE in a first delay field in a DCI transmission.

In another aspect, the apparatus may receive information indicating a narrowband TDD frame structure of a group of narrowband TDD frame structures for narrowband communications. In addition, the apparatus may monitor one or more downlink subframes in a first radio frame that includes the narrowband TDD frame structure for a downlink transmission from a base station. Further, the apparatus may delay at least one uplink transmission to an uplink subframe in a second radio frame that is subsequent to the first radio frame.

In still another aspect, the apparatus may receive information indicating a narrowband TDD frame structure of a group of narrowband TDD frame structures for narrowband communications. Further, the apparatus may receive a downlink grant associated with a narrowband physical downlink channel. The apparatus may also receive the narrowband physical downlink channel associated with the downlink grant over a plurality of subframes, the plurality of subframes including uplink subframes, downlink subframes, and special subframes. Still further, the apparatus may receive an uplink grant associated with a narrowband physical uplink channel. In another aspect, the apparatus may transmit the narrowband physical uplink channel associated with the uplink grant using one or more uplink subframes located at least one of before the plurality of subframes or after the plurality of subframes.

In still another aspect, the apparatus may receive information indicating a narrowband TDD frame structure of a group of narrowband TDD frame structures for narrowband communications. In addition, the apparatus may receive an uplink grant associated with a narrowband physical uplink channel. The apparatus may also transmit the narrowband physical uplink channel associated with the uplink grant over a plurality of subframes. In an aspect, the plurality of subframes may include uplink subframes, downlink subframes, and special subframes. Further, the apparatus may receive a downlink grant associated with a narrowband physical downlink channel. Further still, the apparatus may receive the narrowband physical downlink channel associated with the downlink grant in one or more downlink subframes located at least one of before the plurality of subframes or after the plurality of subframes.

In another aspect, the apparatus may determine a narrowband TDD frame structure for narrowband communications. In one aspect, the narrowband TDD frame structure may include one or more of a set of downlink subframes, a set of uplink subframes, a set of special subframes, or a set of flexible subframes. In addition, the apparatus may transmit a bitmap associated with the narrowband TDD frame structure to a UE. In an aspect, the bitmap may include the one or more of the set of downlink subframes, the set of uplink subframes, the set of special subframes, or the set of flexible subframes.

In a further aspect, the apparatus may determine a narrowband TDD frame structure of a group of narrowband TDD frame structures for narrowband communications. The apparatus may also transmit a series of repetitions of a narrowband physical downlink channel using the narrowband TDD frame structure. In one aspect, a first portion of repetitions from the series of repetitions may be transmitted in a first set of downlink subframes using a first scrambling sequence. In another aspect, a second portion of repetitions from the series of repetitions may be transmitted in a second set of downlink subframes using a second scrambling sequence.

In still another aspect, the apparatus may determine a narrowband TDD frame structure of a group of narrowband TDD frame structures for narrowband communications. In addition, the apparatus may transmit a first redundancy version of a narrowband physical downlink channel and a second redundancy version of the narrowband physical downlink channel using the narrowband TDD frame structure. In one aspect, a number of repetitions of either redundancy version may be transmitted before switching between the first redundancy version and a second redundancy version may be based on a number of contiguous downlink subframes in the determined narrowband TDD frame structure and a predetermined maximum number of repetitions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIG. 9 illustrates a data flow that may be used to support narrowband communications using narrowband TDD frame structures in accordance with certain aspects of the disclosure.

DETAILED DESCRIPTION

Figure 1:
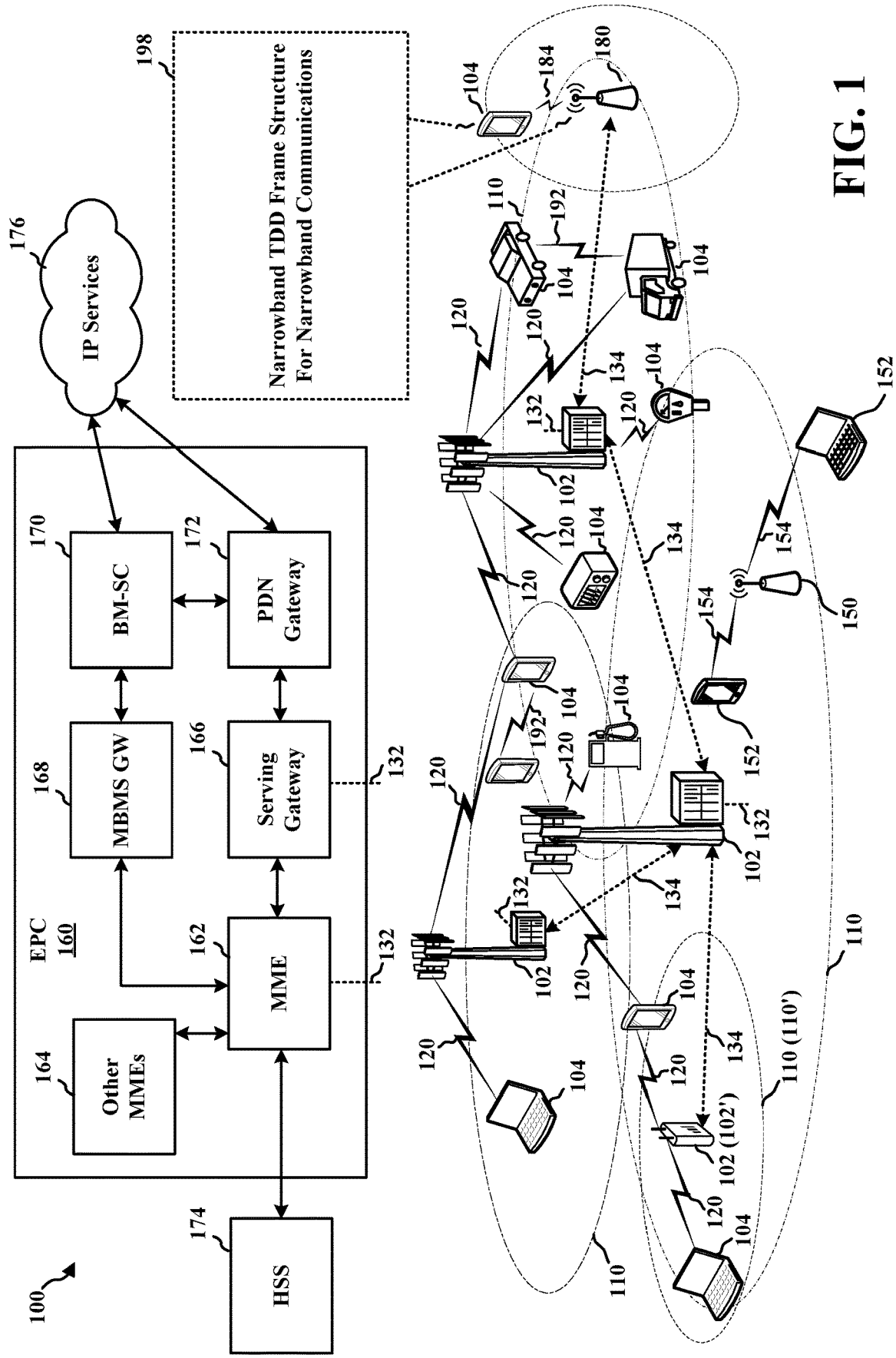
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station may be configured to support one or more narrowband TDD frame structure(s) for narrowband communications (198), e.g., corresponding to FIGS. 4-24.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a PSS that is used by a UE to determine subframe timing and a physical layer identity. The secondary synchronization channel (SSCH) is within symbol 5 of slot 0 within subframes 0 and 5 of a frame, and carries an SSS that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
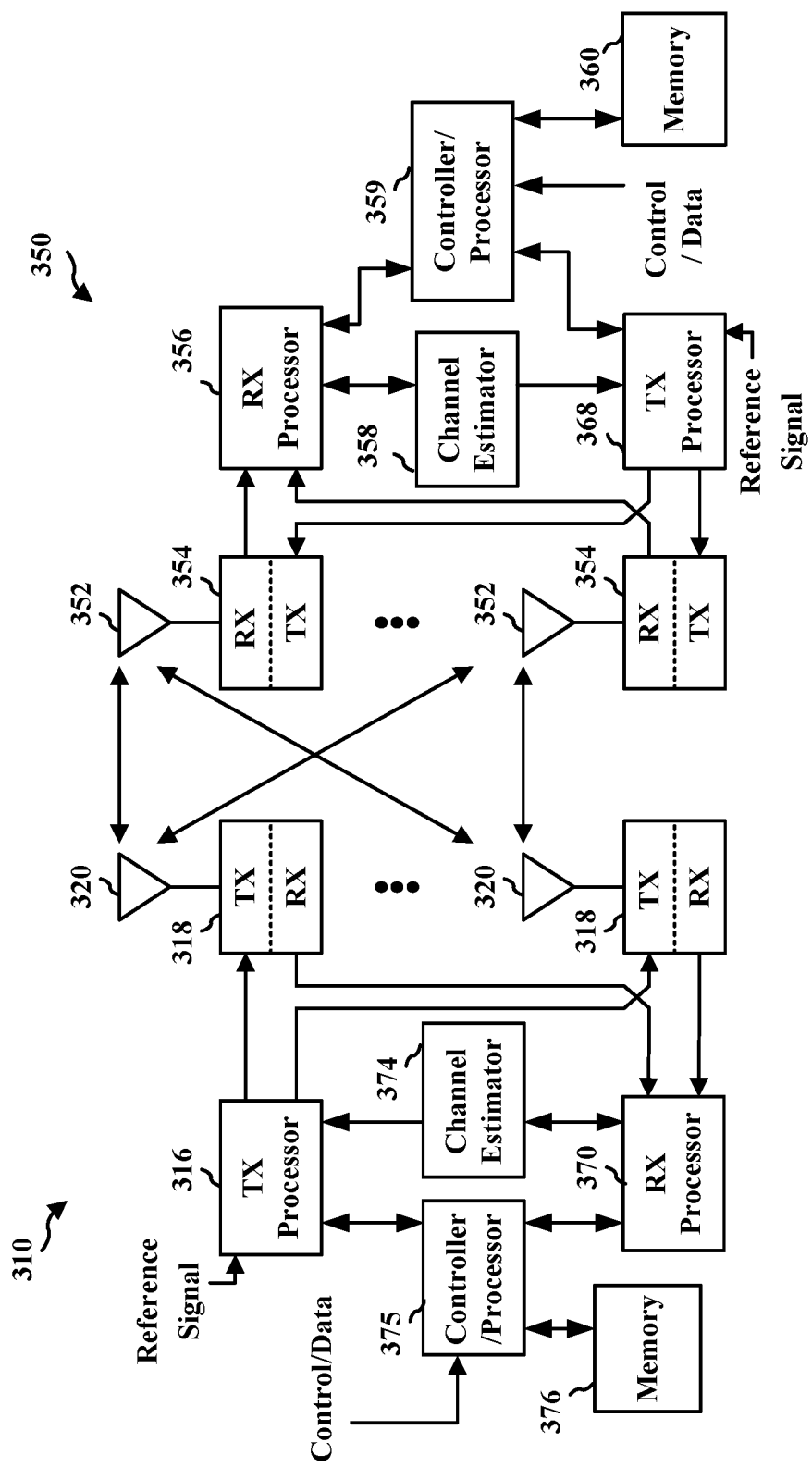
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband communications involve communicating with a limited frequency bandwidth as compared to the frequency bandwidth used for LTE communications. One example of narrowband communication is NB-IoT communication, which is limited to a single RB of system bandwidth, e.g., 180 kHz. Another example of narrowband communication is eMTC, which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. However, because the coverage provided by narrowband communications may include reaching challenging locations (e.g., a smart gas meter located in the basement of a building), there is an increased chance that one or more transmissions will not be properly decoded by a receiver device. Consequently, narrowband communication may include a predetermined number of repeated transmissions to increase the chance of having the transmission properly decoded by the receiver device. A TDD frame structure may be used by a narrowband communication system since certain TDD frame configurations may include a greater number of contiguous uplink and/or downlink subframes that may be used for the repeated transmissions, as compared to a FDD frame structure. There is a need to support the use of narrowband TDD frame structure for narrowband communication.

The present disclosure provides a solution by supporting NPDCCH, NPDSCH, NPUCCH, and/or NPUSCH transmissions that use a narrowband TDD frame structure, e.g., as described below with reference below to FIGS. 5-24.

Figure 4:
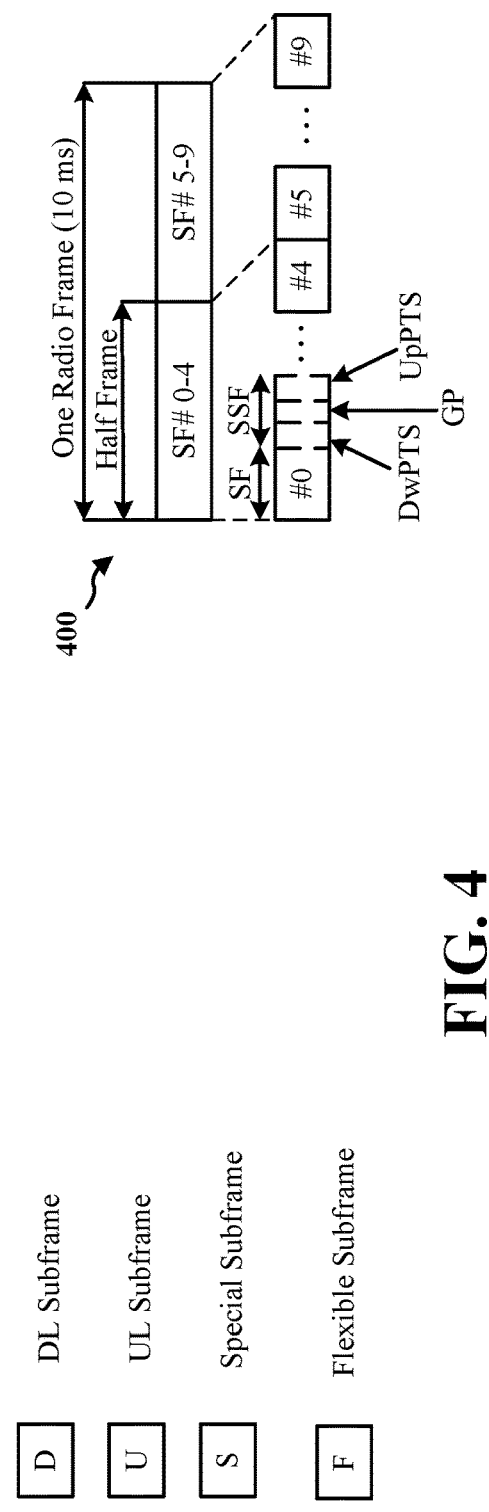
FIG. 4 is a diagram illustrating example narrowband TDD frame structures in accordance with certain aspects of the disclosure.

FIG. 4 is a diagram illustrating a narrowband TDD frame structure 400 that may be determined for narrowband communications in accordance with certain aspects of the disclosure. In certain aspects, the narrowband TDD frame structure 400 may be determined from the group of narrowband TDD frame structures (e.g., configuration 0—configuration o) listed in table 410. For example, a base station may determine the narrowband TDD frame structure based on higher layer signaling (e.g., RRC messaging) received from the network. Additionally and/or alternatively, the base station may determine the narrowband TDD frame structure based on channel conditions.

In one aspect, the narrowband TDD frame structure 400 may include a 10 ms frame split into two half frames, each 5 ms long. The half-frames may be further split into five subframes, each 1 ms long. The narrowband TDD frame structure 400 may include any one of the narrowband configurations listed in table 410.

Switching periodicity refers to the time a UE may use to switch between monitoring a downlink subframe (e.g., for downlink transmissions from a base station) and sending a transmission using an uplink subframe, or vice versa. Depending on the determined narrowband TDD frame structure 400, the switching periodicity may be 5 ms, 10 ms, or more than 10 ms (e.g., 20 ms). For narrowband TDD frame structures 412 (e.g., configurations 0-2 and 6) with a 5 ms switching periodicity, a special subframe (SSF) may exist in both half frames of the narrowband TDD frame structure 400. For narrowband TDD frame structures 414 (e.g., configurations 3-5) with a 10 ms switching periodicity, the special subframe may exist in the first half frame but not in the second half frame. For narrowband TDD frame structures 416 (e.g., configurations 1 and o) with more than a 10 ms switching periodicity, no special subframes may be needed since more than an entire frame may be used to perform the switch. In the narrowband TDD frame structures 412, 414 that include a special subframe (e.g., configurations 0, 1, 2, 3, 4, 5, and 6), subframes 0 and 5, as well as the Downlink Pilot Time Slot (DwPTS) in the special subframe, may be reserved for downlink transmissions. Additionally and/or alternatively, in the narrowband TDD frame structures 412, 414 that include a special subframe, the Uplink Pilot Time Slot (UpPTS) in the special subframe and the subframe immediately following the special subframe may be reserved for the uplink transmission.

When operating in in-band mode and/or guard-band mode, the narrowband TDD frame structure 400 may reuse certain LTE TDD frame structures (e.g., see configurations 0, 1, 2, 3, 4, 5, 6 in FIG. 4). Additionally and/or alternatively, some subframes in the narrowband TDD frame structure 400 may be marked as flexible subframes (e.g., see configuration 1 and o in FIG. 4). A UE may use a flexible subframe as either a downlink subframe or an uplink subframe depending on the current grant received from the base station.

In certain aspects, a subset of the narrowband TDD configurations listed in table 410 in FIG. 4 may be used to support narrowband communications. For example, configuration 0 may not be suitable for narrowband communications because configuration 0 only has two downlink subframes. In one configuration, narrowband communications that use a narrowband TDD frame structure may be supported in in-band mode and/or guard-band mode (e.g., but not standalone mode). In another configuration, narrowband communications that use a narrowband TDD frame structure may support in-band mode, guard-band mode, and standalone mode.

In addition, multiple narrowband downlink carriers and multiple narrowband uplink carriers may be used to enhance narrowband communication between a base station and a UE. Among the carriers, a narrowband anchor carrier may be used to provide synchronization, system information, paging, data and control for multi-carrier enabled UEs. Hence, overhead narrowband system information may be reduced when a narrowband anchor carrier is used. Synchronization and paging for a certain cell may not be not provided on all narrowband carriers. Narrowband carriers that do not provide synchronization and/or paging may be referred to narrowband non-anchor carriers. Coordination between base stations for selecting anchor carriers that mitigate interference and for transmit power control for non-anchor carriers provide further network performance advantages.

NPDCCH and/or NPDSCH on Special Subframes

While narrowband FDD frame structures may include resources for downlink transmissions in downlink subframes, certain narrowband TDD frame structures may include resources for downlink transmissions in both downlink subframes and special subframes. For example, the DwPTS portion of a special subframe includes resources that may be allocated for downlink transmissions. In some scenarios, there is a need to determine if the resources in the DwPTS portion of special subframes may be allocated for the NPDCCH and/or NPDSCH to efficiently use the available resources in the narrowband TDD frame structure.

Figure 5:
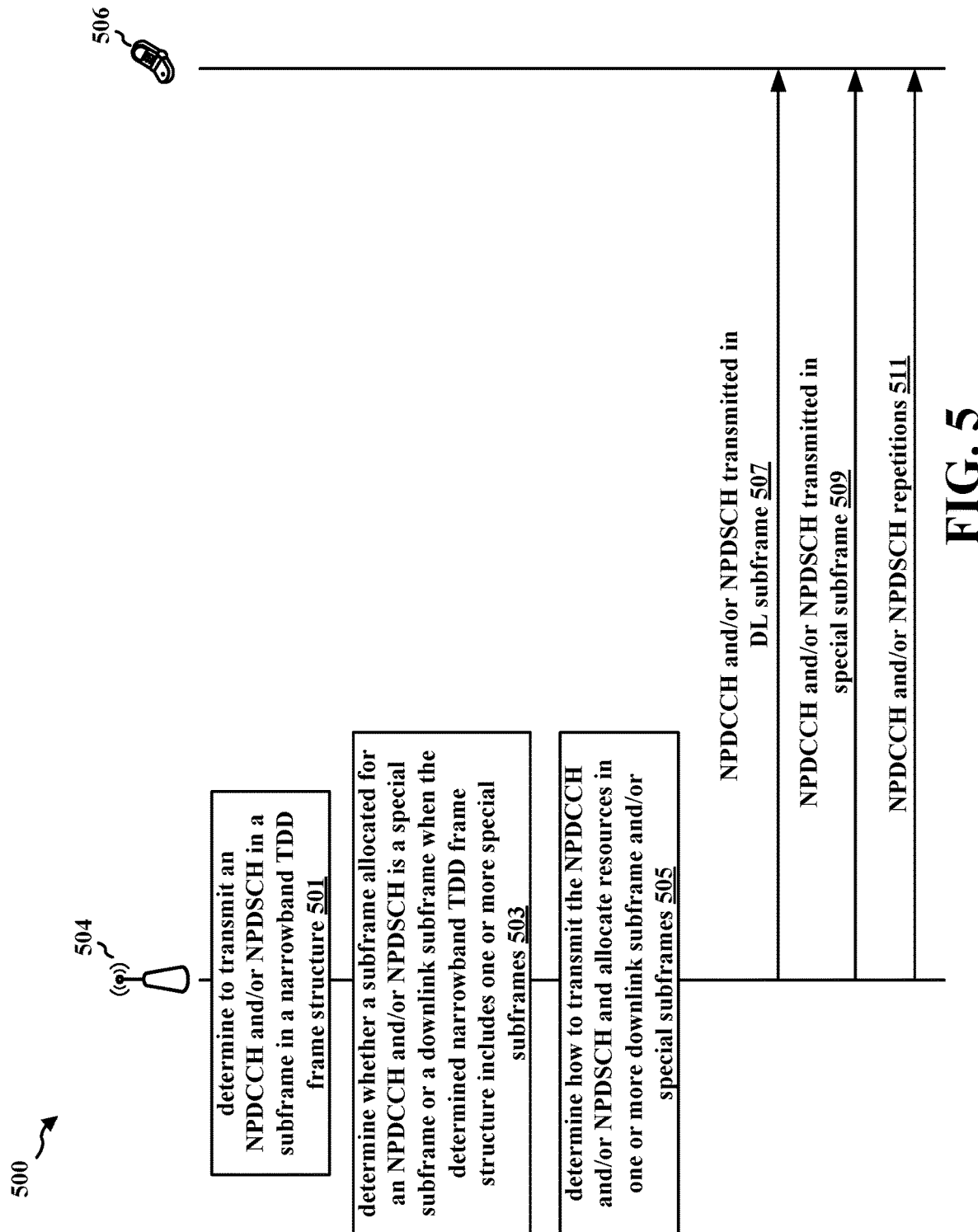
FIG. 5 illustrates a data flow that may be used to support narrowband communications using narrowband TDD frame structures in accordance with certain aspects of the disclosure.

FIG. 5 illustrates a data flow 500 that may be used to allocate resources for the NPDCCH and/or NPDSCH in downlink subframes as well as special subframes in accordance with certain aspects of the disclosure. Base station 504 may correspond to, e.g., base station 102, 180, 604, 704, 804, 904, 1004, 1104, 2350, eNB 310, apparatus 1802/1802'. UE 506 may correspond to, e.g., UE 104, 350, 606, 706, 806, 906, 1006, 1106, 1850, apparatus 2302/2302'. In addition, the base station 504 and the UE 506 may be configured to communicate using narrowband communications (e.g., NB-IoT and/or eMTC). For example, the UE 506 may be an NB-IoT device and/or an eMTC device, and base station 504 may be able to transmit a NPDCCH and/or NPDSCH in one or more downlink subframes as well as special subframes (e.g., in the DwPTS portion of the special subframes).

In one aspect, base station 504 may determine 501 to transmit an NPDCCH and/or NPDSCH in a subframe in a narrowband TDD frame structure. For example, the base station 504 may determine 501 the narrowband TDD frame structure is one of configuration 0, 1, 2, 3, 4, 5, 6, 1, or o from table 410 in FIG. 4.

In addition, base station 504 may determine 503 whether a subframe allocated for an NPDCCH and/or NPDSCH is a special subframe or a downlink subframe when the determined narrowband TDD frame structure includes one or more special subframes (e.g., configurations 0, 1, 2, 3, 4, 5, 6, and n in FIG. 4).

In another aspect, base station 504 may determine 505 how to transmit the NPDCCH and/or NPDSCH, and how to allocate resources in one or more downlink subframe and/or special subframes. In one aspect, the base station 504 may allocate resources for the NPDCCH and/or NPDSCH in all available downlink subframes (e.g., downlink subframes not being used for switching). However, the allocation of resources on a special subframe by base station 504 may be a function of a special subframe configuration (e.g., how many resources are available in the DwPTS portion) and/or the determined narrowband TDD frame.

In a first configuration, base station 504 may determine 505 to transmit the NPDCCH and/or NPDSCH in downlink subframes and not special subframes. In the first configuration, base station 504 may not allocate resources for the NPDCCH and/or NPDSCH on special subframes. If a repetition of the NPDCCH and/or NPDSCH is configured at the base station 504, an allocation of resources may be postponed at special subframes in the narrowband TDD frame structure until the next possible downlink subframe. Assuming configuration 2 is used as the narrowband TDD frame structure, resources may be allocated for the NPDCCH and/or NPDSCH on subframe 0 and postponed at subframe 1 until subframe 3 (e.g., resource allocation is postposed at special subframe 1 until the next downlink subframe 3). Hence, the base station 504 may transmit the NPDCCH 507 and/or NPDSCH 507 in subframe 0, and a repetition of the NPDCCH 511 and/or NPDSCH 511 may be transmitted in subframe 3 (e.g., the next downlink subframe in configuration 2).

In a second configuration, base station 504 may determine 505 to transmit the NPDCCH 507, 509 and/or NPDSCH 507, 509 in downlink subframes (e.g., NPDCCH 507 and/or NPDSCH 509) and special subframes (e.g., NPDCCH 509 and/or NPDSCH 509). In the second configuration, the base station 504 may allocate resources for the NPDCCH and/or NPDSCH in downlink subframes as well as the DwPTS portion of one or more special subframes.

In a first aspect of the second configuration, base station 504 may puncture the OFDM symbols in the UpPTS portion of the one or more special subframes.

In a second aspect of the second configuration, base station 504 may puncture the OFDM symbols in the DwPTS portion and the UpPTS portion of the one or more special subframes. By puncturing the OFDM symbols in the DwPTS portion and the UpPTS portion of the one or more special subframes, UE 506 may ignore (e.g., not monitor or discard) the special subframes while receiving NPDCCH and/or NPDSCH in a radio frame.

In a third aspect of the second configuration, base station 504 may rate match the NPDCCH and/or NPDSCH in the subframe (e.g., downlink subframe or special subframe) based on the number of downlink OFDM symbols in the subframe. A special subframe may have a fewer number of OFDM symbols than a downlink subframe because only the DwPTS portion of the special subframe is dedicated for an NPDCCH and/or NPDSCH. Hence, the rate matching for a special subframe may be different than the rate matching for a downlink subframe.

In a third configuration, base station 504 may determine 505 to transmit the NPDCCH 509 and/or NPDSCH 509 in a special subframe when a number of OFDM symbols in the DwPTS special subframe is greater than a predetermined threshold. Otherwise, base station 504 may transmit a repetition of the NPDCCH 511 and/or NPDCCH 511 in the next downlink subframe. As an illustrative example, assume configuration 2 is used for the narrowband TDD frame structure, that special subframe 1 has ten OFDM symbols, and that the predetermined threshold is five OFDM symbols. Here, base station 504 may transmit the NPDCCH 509 and/or NPDSCH 509 in subframe 0 and a repetition of the NPDCCH 511 and/or NPDSCH 511 in special subframe 1.

In a fourth configuration, base station 504 may determine 505 to transmit the NPDCCH 509 and/or NPDSCH 509 in the special subframe irrespective of the number of OFDM symbols in DwPTS. In the fourth configuration, base station 504 may puncture the NPDCCH 509 and/or NPDSCH 509 with a subset of OFDM symbols (e.g., a subset of the OFDM symbols in the DwPTS portion and/or the UpPTS portion) in the special subframe when number of OFDM symbols in DwPTS is less than a predetermined threshold. As an illustrative example, assume configuration 2 is used for the narrowband TDD frame structure, that special subframe 1 has five OFDM symbols, and that the predetermined threshold is ten OFDM symbols. Here, base station 504 may transmit the NPDCCH 509 and/or NPDSCH 509 in subframe 0 and transmit a repetition of the NPDCCH 511 and/or NPDSCH 511 in special subframe 1 with a subset of the OFDM symbols in special subframe 1 punctured.

In a fifth configuration, base station 504 may determine 505 to refrain from transmitting the NPDCCH and/or NPDSCH in a special subframe when a number of OFDM symbols in the special subframe is less than a predetermined threshold. In the fifth configuration, base station 504 may transmit the NPDCCH 511 and/or NPDSCH 511 in the next available downlink subframe. As an illustrative example, assume configuration 2 is used for the narrowband TDD frame structure, that special subframe 1 has five OFDM symbols, and that the predetermined threshold is ten OFDM symbols. Here, base station 504 may transmit the NPDCCH 509 and/or NPDSCH 509 in subframe 0 and wait until the next downlink subframe 3 to transmit a repetition of the NPDCCH 511 and/or NPDSCH 511.

In a sixth configuration, base station 504 may determine 505 to drop the transmission of the NPDCCH and/or NPDSCH in a special subframe when a number of OFDM symbols in the special subframe is less than a predetermined threshold.

UE-RS

Channel reciprocity may occur when a downlink channel and an uplink channel are transmitted on the same channel or bandwidth. Using a narrowband TDD frame structure, downlink channel transmissions and uplink channel transmissions may occur on the same narrowband, and hence channel reciprocity may be applicable. Channel reciprocity may be exploited to enable UE-specific beamforming that may be unavailable when a narrowband FDD frame structure is used.

Beamforming may be desirable in narrowband communication to compensate for path loss that may occur when a UE is in a location that is difficult for a signal to reach. For example, heavy attenuation may occur when a signal needs to reach a UE located deep inside a building due to the presence of obstacles (e.g., walls, furniture, people, etc.) that may block the propagation of the signal. As such, propagation characteristics in narrowband communications may benefit from directional beamforming that focuses the transmit energy in specific spatial directions corresponding to the dominant spatial scatterers, reflectors, and/or diffraction paths to overcome the signal loss at the UE. Beamforming may be implemented via an array of antennas (e.g., phased arrays) cooperating to beamform a high frequency signal in a particular direction of the UE, and therefore, extend the range of the signal.

Figure 6A:
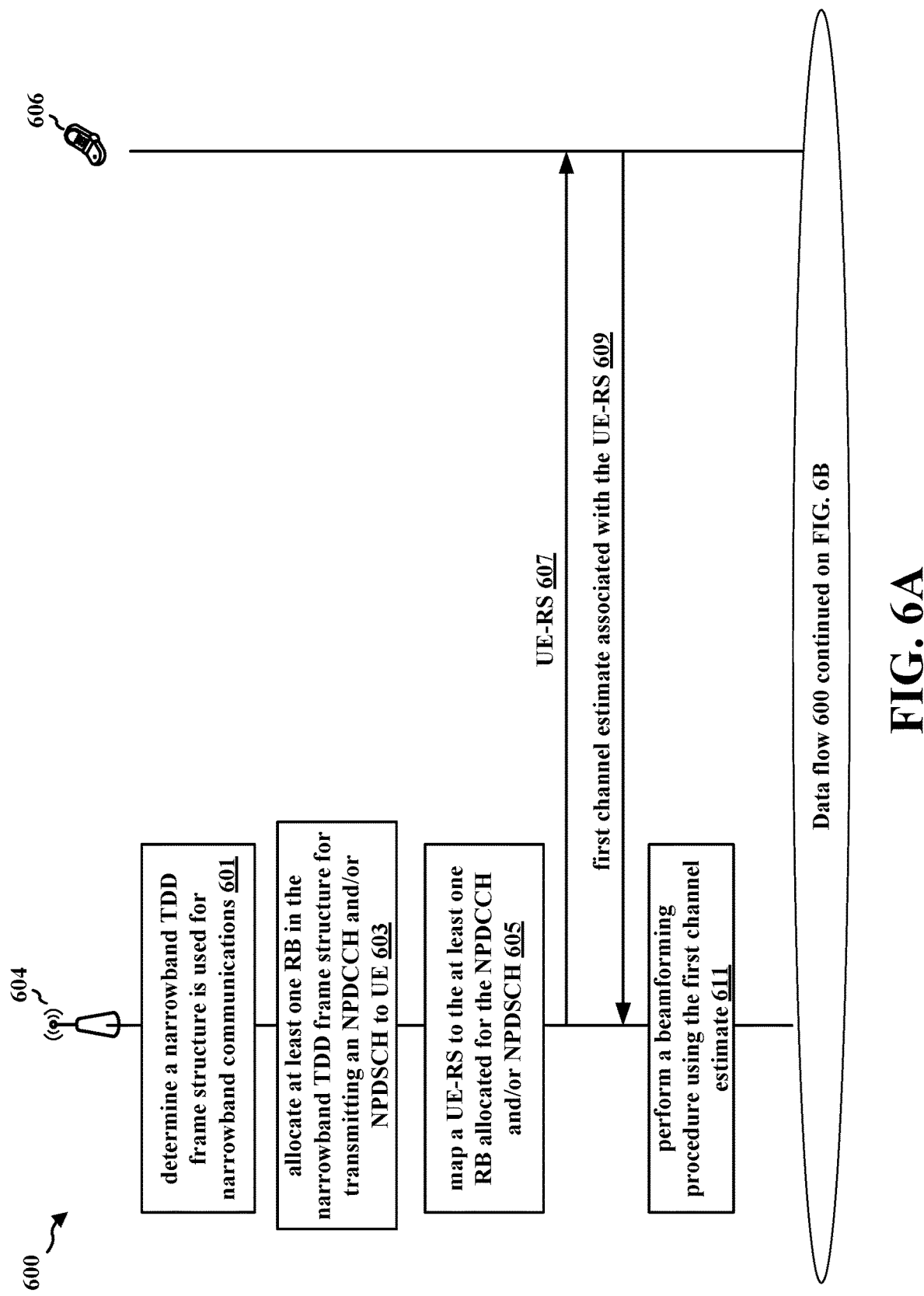
FIGS. 6A and 6B illustrate a data flow that may be used to support narrowband communications using narrowband TDD frame structures in accordance with certain aspects of the disclosure.
Figure 6B:
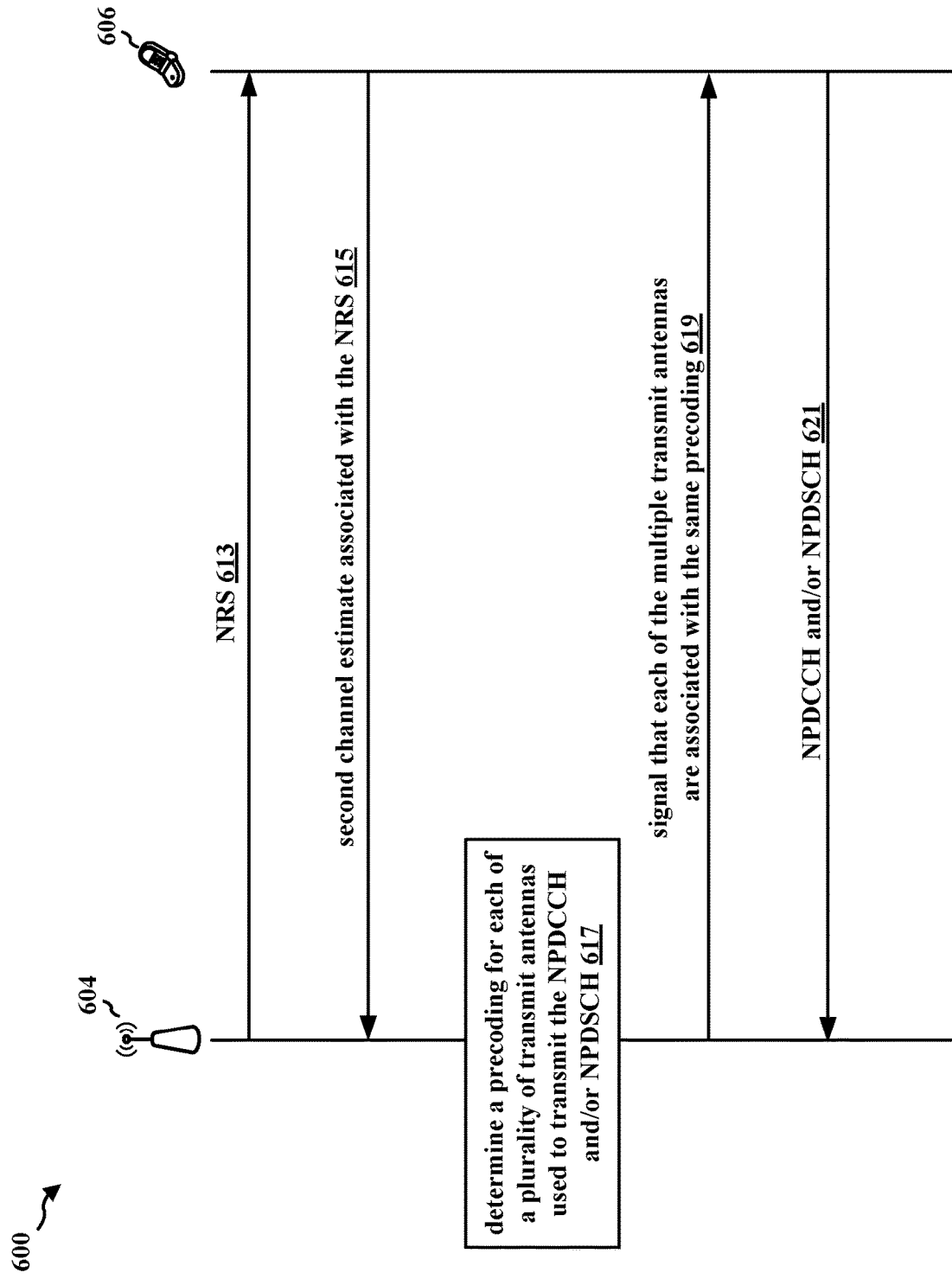

FIGS. 6A and 6B illustrate a data flow 600 that may be used to support UE-specific beamforming in accordance with certain aspects of the disclosure. Base station 604 may correspond to, e.g., base station 102, 180, 504, 704, 804, 904, 1004, 1104, 2350, eNB 310, apparatus 1802/1802'. UE 606 may correspond to, e.g., UE 104, 350, 506, 706, 806, 906, 1006, 1106, 1850, apparatus 2302/2302'. In addition, the base station 604 and the UE 606 may be configured to communicate using narrowband communications (e.g., NB-IoT and/or eMTC), beamforming, and/or precoding. For example, the UE 606 may be an NB-IoT device and/or an eMTC device.

Referring to FIG. 6A, base station 604 may determine 601 a narrowband TDD frame structure (e.g., configuration 0, 1, 2, 3, 4, 5, 6, l, or o listed in table 410 in FIG. 4.) is used for narrowband communications with UE 606.

To perform beamforming, base station 604 may allocate 603 at least one RB in the narrowband TDD frame structure for transmitting an NPDCCH and/or NPDSCH to UE 606, map 605 a UE-RS to the at least one RB allocated for the NPDCCH and/or NPDSCH, and transmit the UE-RS 607 to the UE 606 based on the mapping (at 605). In one aspect, base station 604 may use a legacy pilot structure (e.g., legacy port 5 pilot structure, modified legacy port 107/108 pilot structure, modified legacy port 109/110 pilot structure, etc.) to populate the UE-RS 607.

In certain configurations, the UE-RS 607 may not share resources with a narrowband reference signal (NRS) 613 (e.g., seen in FIG. 6B) in the legacy pilot structure. For example, the network (e.g., higher layers) may indicate certain downlink subframes that do not include NRS 613. If the NPDCCH and/or NPDSCH is transmitted in subframes that do not include NRS 613, base station 604 may transmit UE-RS 607 in the same REs as the NRS 613. Optionally, SRS may be used by the network to further support measurements for channel reciprocity. If multi-user MIMO capability is supported (e.g. if two UEs are allocated by base station 604 to the same RB for NPDCCH and/or NPDSCH), the legacy port 107/108 pilot structure or legacy port 109/110 pilot structure may be reused.

In one aspect, UE 606 may use the UE-RS 607 to perform channel estimation (e.g., of the channel used to transmit the UE-RS 607 by base station 604). Based on a result of the channel estimation, base station 604 may receive a first channel estimate 609 associated with the UE-RS 607 transmitted from the UE 606. In one aspect, base station 604 may perform 611 a beamforming procedure using the first channel estimate 609 received from the UE 606.

Referring to FIG. 6B, base station 604 may transmit an NRS 613 to UE 606, and receive a second channel estimate 615 associated with the NRS 613 from UE 606. In addition, UE 606 may combine the NRS 613 transmitted from each transmit antenna (e.g., port) at the base station 604 to enhance channel estimation (e.g. the second channel estimate 615).

Base station 604 may use the second channel estimate to determine 617 a precoding for each of a plurality of transmit antennas used to transmit the NPDCCH and/or NPDSCH.

In one configuration, base station 604 may signal 619 that each of the multiple transmit antennas are associated with the same precoding. In certain configurations, the signal 619 may indicate that the NRS 613 uses the same precoding for a predetermined number of radio frames (e.g., ten 10 radio frames) before switching to another precoding. In one aspect, the signal 619 may be sent as DCI or RRC messaging. In one configuration, the signal 619 may indicate that the NPDCCH is transmitted using a first number of antennas (e.g., one, two, three, etc.) and the NPDSCH is transmitted from a second number of antennas (e.g., one, two, three, etc.).

In one configuration, the NPDCCH 621 and/or NPDSCH 621 may be transmitted by base station 604 using a data stream from each of the transmit antennas based on the beamforming and/or precoding. The precoding may be applied to a narrowband carrier (e.g., non-anchor carrier) specific to UE 606.

ACK/NACK

Figure 7A:
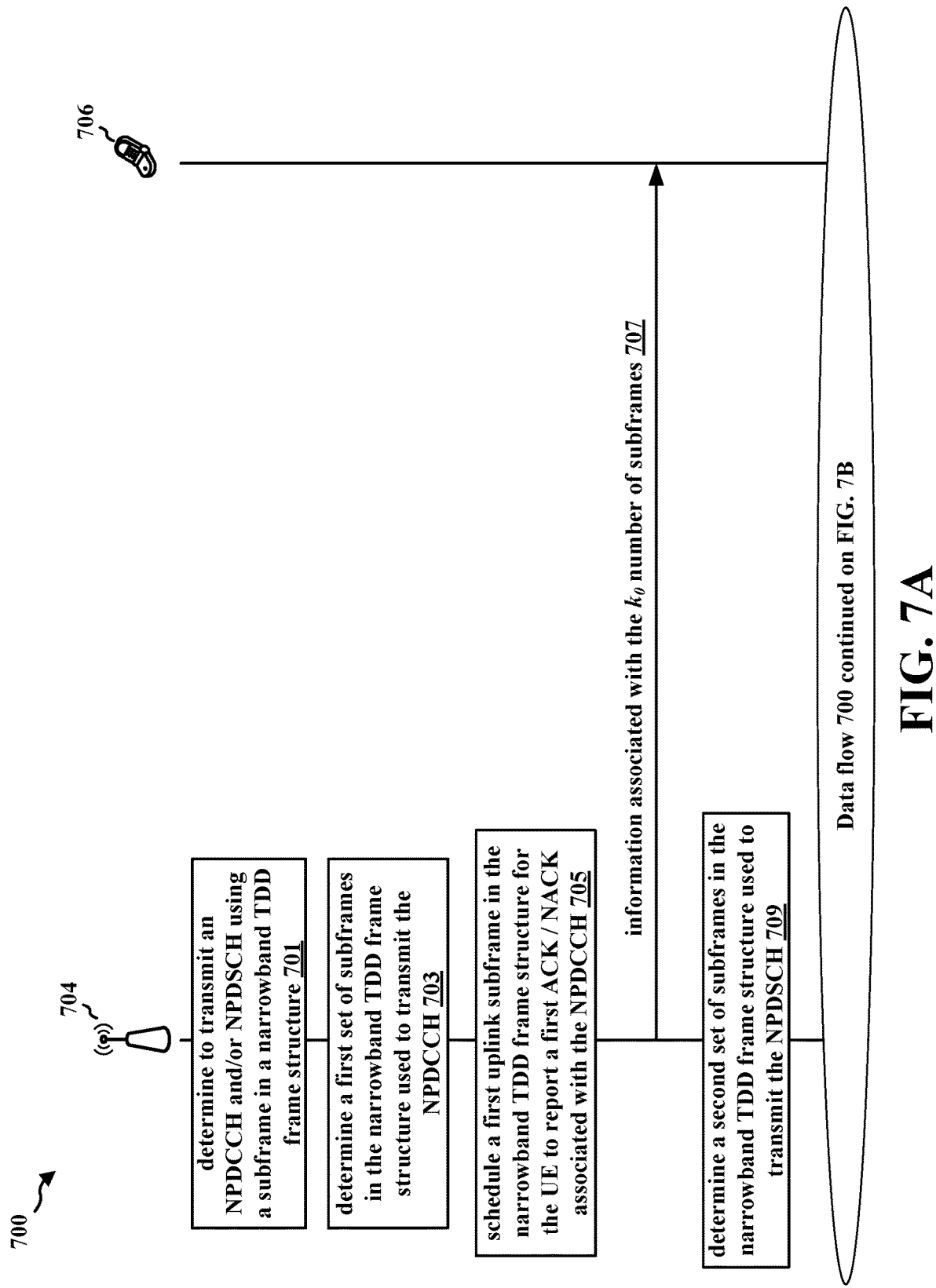
FIGS. 7A and 7B illustrate a data flow that may be used to support narrowband communications using narrowband TDD frame structures in accordance with certain aspects of the disclosure.
Figure 7B:
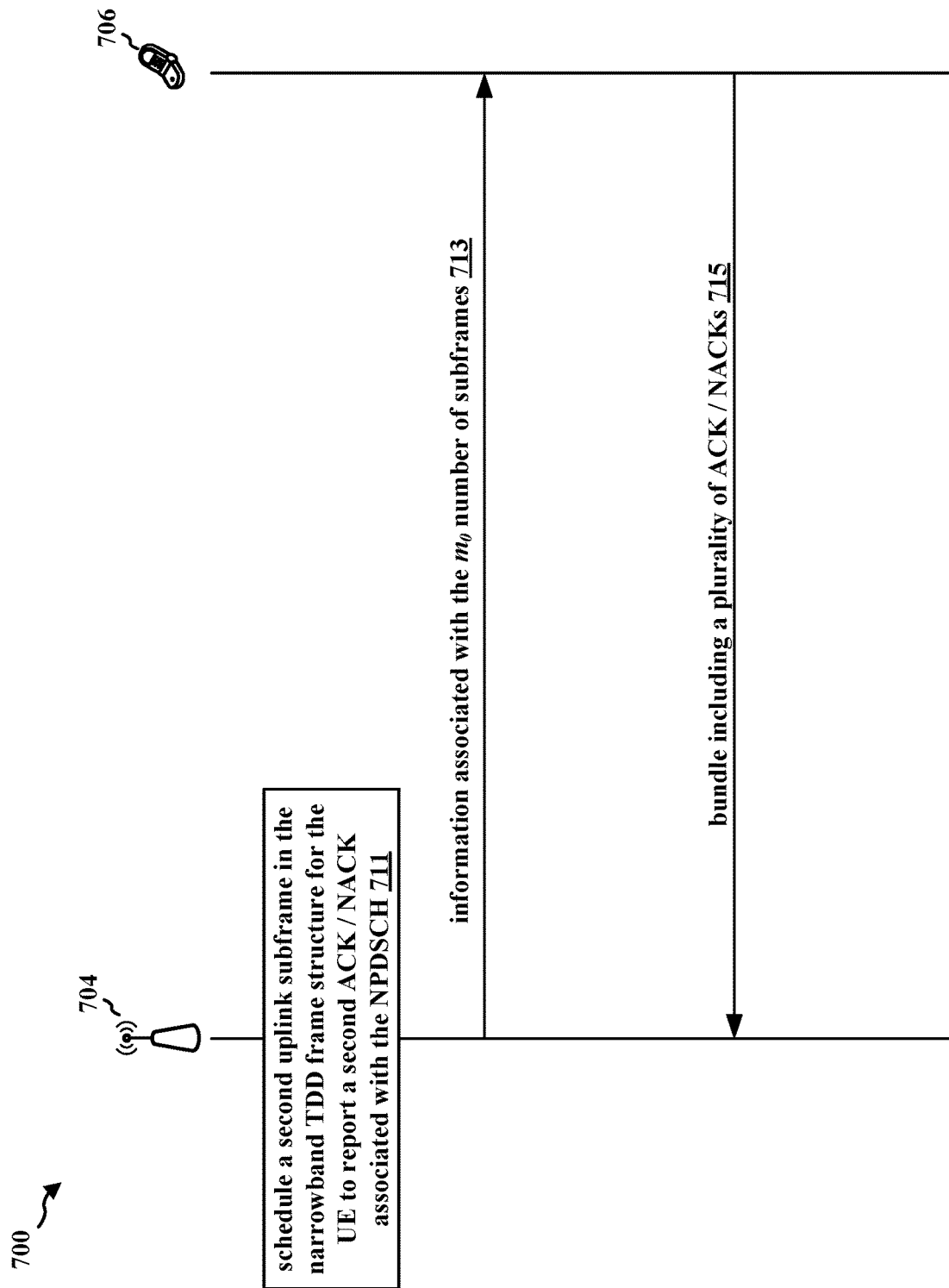

FIGS. 7A and 7B illustrate a data flow 700 that may be used to accommodate ACK/NACK transmissions when a narrowband TDD frame structure is in accordance with certain aspects of the disclosure. Base station 704 may correspond to, e.g., base station 102, 180, 504, 604, 804, 904, 1004, 1104, 2350, eNB 310, apparatus 1802/1802'. UE 706 may correspond to, e.g., UE 104, 350, 506, 606, 806, 906, 1006, 1106, 1850, apparatus 2302/2302'. In addition, the base station 704 and the UE 706 may be configured to communicate using narrowband communications (e.g., NB-IoT and/or eMTC). For example, the UE 706 may be an NB-IoT device and/or an eMTC device.

Referring to FIG. 7A, base station 704 may determine 701 to transmit an NPDCCH and/or NPDSCH using a subframe in a narrowband TDD frame structure. For example, the base station 704 may determine 701 the narrowband TDD frame structure is one of configuration 0, 1, 2, 3, 4, 5, 6, l, or o from table 410 in FIG. 4.

In one configuration, base station 704 may determine 703 a first set of subframes in the narrowband TDD frame structure used to transmit the NPDCCH to UE 706. For example, a last subframe in the first set of subframes may be subframe n. In addition, base station 704 may schedule 705 a first uplink subframe in the narrowband TDD frame structure for the UE 706 to report a first ACK/NACK associated with the NPDCCH. In one configuration, the first uplink subframe may be delayed based on $k_0$ number of subframes (e.g., UL subframes, valid subframes, valid UL subframes, etc.) after the last subframe n. In other words, UE 706 may transmit the first ACK/NACK in subframe $n+k_0$. Information 707 associated with the $k_0$ number of subframes may be signaled to UE 706 in a first delay field in a DCI transmission (e.g. not shown in FIGS. 7A and 7B).

As an illustrative example, assume that configuration 2 (e.g., see table 410 in FIG. 4) is used as the narrowband TDD frame structure. In addition, assume that the first set of subframes used to transmit the NPDCCH includes subframes 0 and 1 (e.g., n is equal to 1), and that $k_0$ is equal to 1. Hence in the illustrative example, the first ACK/NACK associated with the NPDCCH may be transmitted by UE 706 in subframe 2 (e.g., 1+1=2) of the narrowband TDD frame structure.

In addition, base station 704 may determine 709 a second set of subframes in the narrowband TDD frame structure used to transmit the NPDSCH to UE 706. In one aspect, a first subframe in the second set of subframes may be located x number of subframes after the subframe allocated for the first ACK/NACK transmission. For example, the first subframe in the second set of subframes is subframe $n+k_0+x$. A last subframe in the second set of subframes may be y subframes after the first subframe in the second set. For example, the last subframe in the second set of subframes may be subframe $n+k_0+x+y$. Both x and y may be positive integers.

Referring to FIG. 7B, base station 704 may schedule 711 a second uplink subframe in the narrowband TDD frame structure for the UE 706 to report a second ACK/NACK associated with the NPDSCH. In one aspect, the second uplink subframe may be delayed $m_0$ number of subframes after the last subframe used to transmit the NPDSCH (e.g., subframe $n+k_0+x+y$), and the $m_0$ number of subframes may include at least one of a number of downlink subframes and/or a number of uplink subframes. Information 713 associated with the $m_0$ number of subframes may be signaled to UE 706 in a second delay field in the DCI transmission. In one configuration, the information 707, 713 may be signaled in the same DCI transmission. In another configuration, the information 707, 713 may be signaled in different DCI transmissions.

Referring again to the illustrative example discussed above for FIGS. 7A and 7B, further assume that the second set of subframes are subframes 3, 4, and 5 in configuration 2. In the example, x is equal to 1 and y is equal to 2. In a first scenario, assume $m_0$ is equal to 3 when only downlink subframes are included in the delayed number of subframes. In a second scenario, assume $m_0$ is equal to 4 when downlink subframes and uplink subframes are included in the delayed number of subframes. In either scenario, the second ACK/NACK associated with the NPDSCH may be transmitted by UE 706 in subframe 2 in the next radio frame after the radio frame in which the NPDSCH is received by UE 706. Additionally and/or alternatively, $m_0$ may only include valid uplink subframes and/or downlink subframes (e.g., subframes available for transmission and not switching).

In certain configurations, base station 704 may receive a bundle 715 including a plurality of ACK/NACKs from UE 706. In one aspect, each ACK/NACK in the bundle may be associated with a different hybrid automatic repeat request (HARQ) process associated with one or more NPDCCH transmissions and/or NPDSCH transmissions.

Uplink and Downlink Transmission Interlacing

Figure 8A:
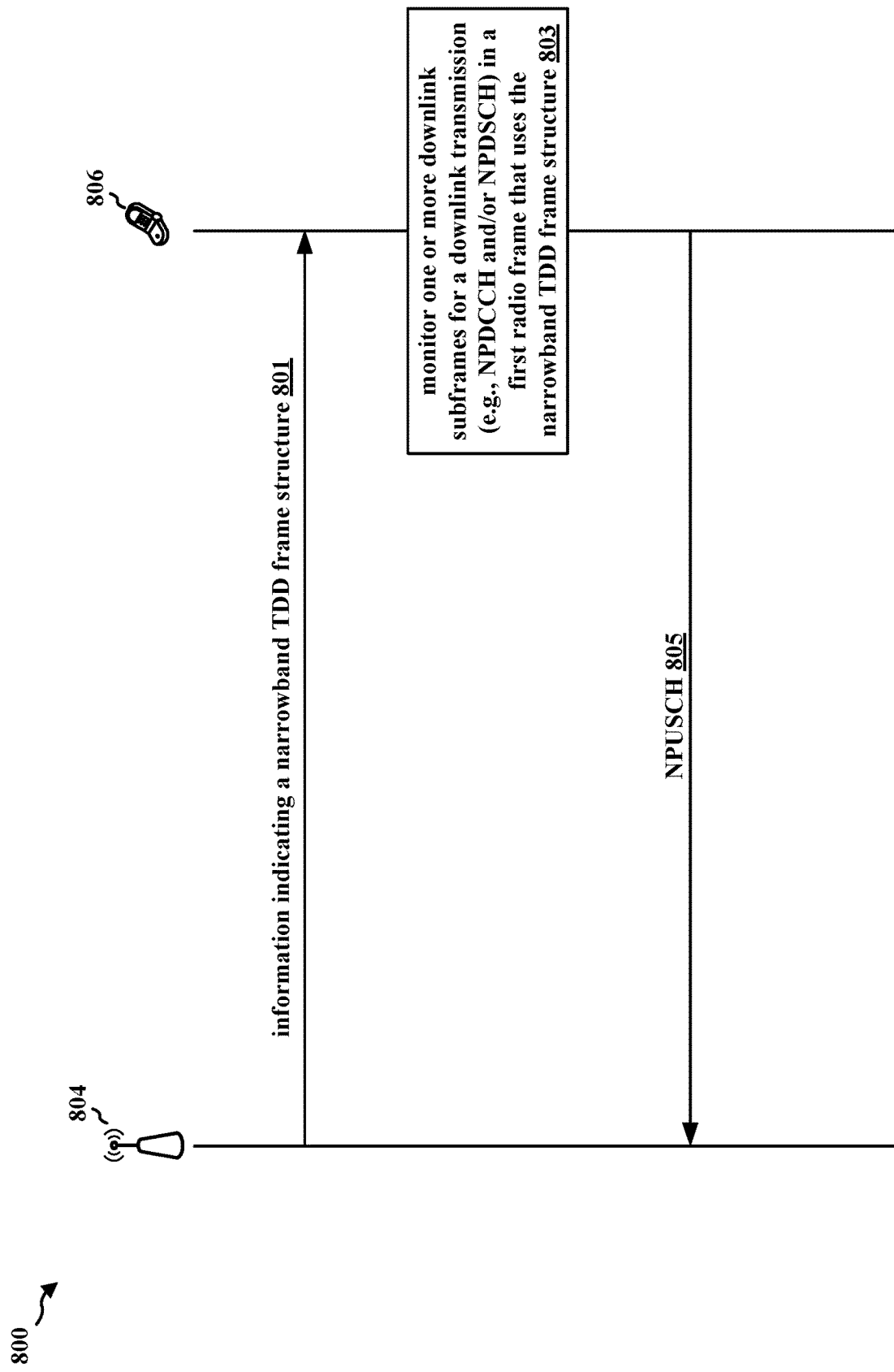
FIG. 8A illustrates a data flow that may be used to support narrowband communications using narrowband TDD frame structures in accordance with certain aspects of the disclosure.
Figure 8B:
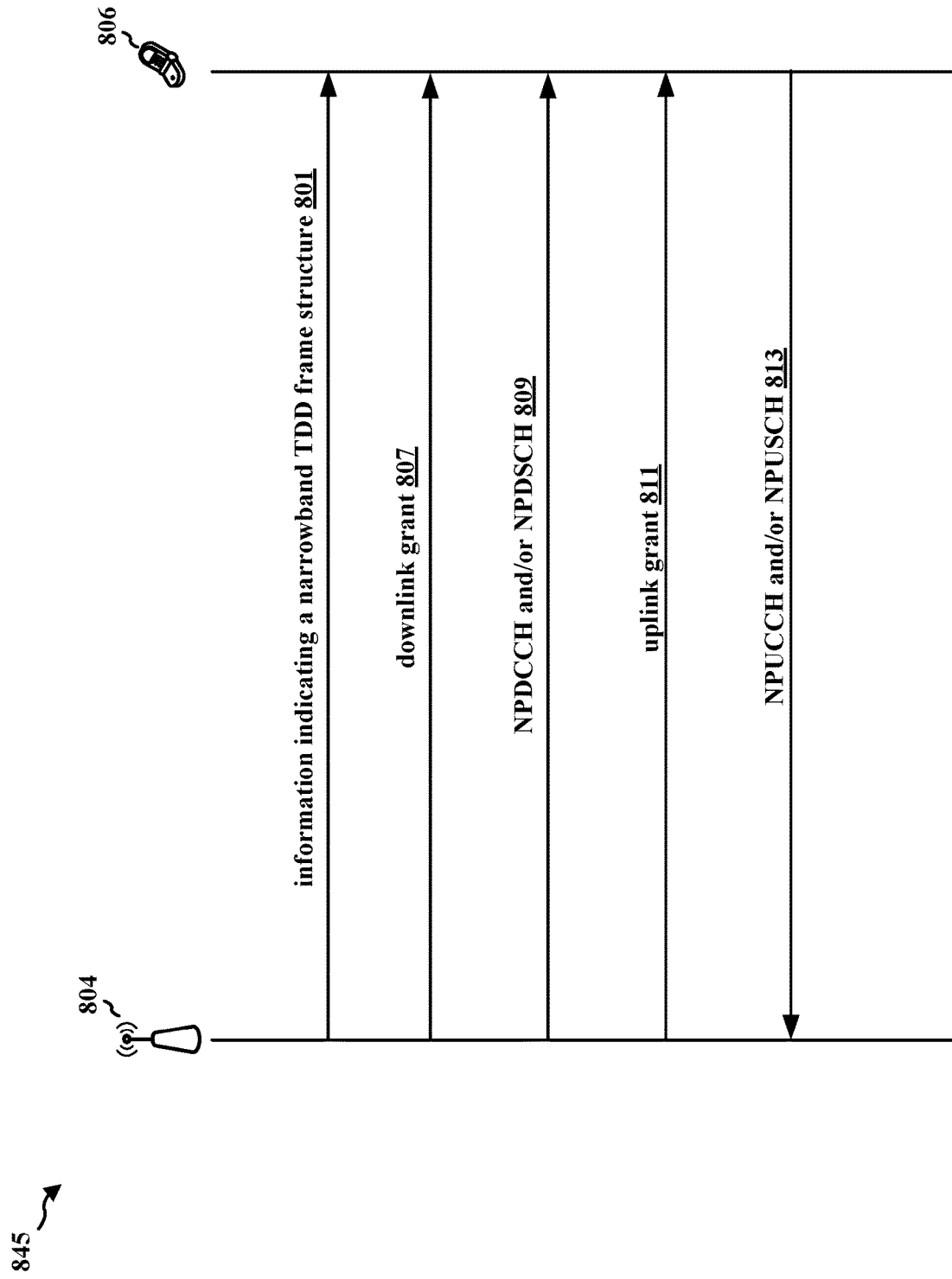
FIG. 8B illustrates a data flow that may be used to support narrowband communications using narrowband TDD frame structures in accordance with certain aspects of the disclosure.
Figure 8C:
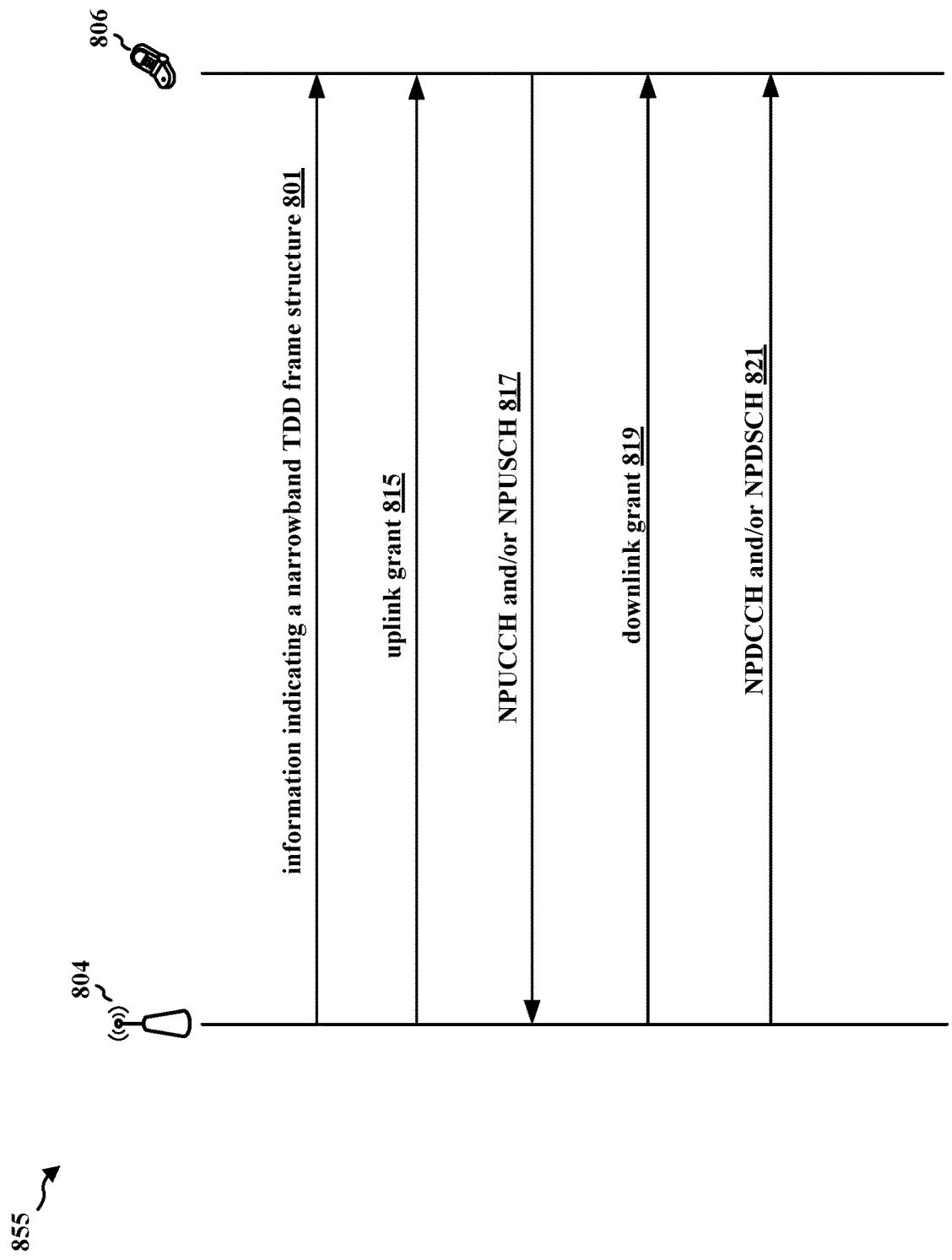
FIG. 8C illustrates a data flow that may be used to support narrowband communications using narrowband TDD frame structures in accordance with certain aspects of the disclosure.

FIGS. 8A-8C illustrate a data flows 800, 854, 855 that may enable interlacing of uplink subframes and downlink subframes during NPDSCH and/or narrowband physical uplink shared channel (NPUSCH) transmissions. For example, FIG. 8A illustrates a data flow 800 in which interlacing is not enabled. FIG. 8B illustrates a data flow 845 in which interlacing may be enabled and NPUSCH transmissions may be restricted to certain subframes. FIG. 8C illustrates a data flow 855 in which interlacing may be enabled and monitoring for NPDSCH transmissions may be restricted to certain subframes.

Base station 804 may correspond to, e.g., base station 102, 180, 504, 604, 704, 904, 1004, 1104, 2350, eNB 310, apparatus 1802/1802'. UE 806 may correspond to, e.g., UE 104, 350, 506, 606, 706, 906, 1006, 1106, 1850, apparatus 2302/2302'. In addition, the base station 804 and the UE 806 may be configured to communicate using narrowband communications (e.g., NB-IoT and/or eMTC). For example, the UE 806 may be an NB-IoT device and/or an eMTC device.

Referring to FIG. 8A, UE 806 may receive information 801 indicating a narrowband TDD frame structure from base station 804. For example, the information 801 may indicate that the narrowband TDD frame structure is one of configuration 0, 1, 2, 3, 4, 5, 6, 1, or o from table 410 in FIG. 4.

In addition, UE 806 may monitor 803 one or more downlink subframes for a downlink transmission (e.g., NPDCCH and/or NPDSCH) in a first radio frame that uses the narrowband TDD frame structure. Further, UE 806 may delay an NPUSCH transmission 805 to an uplink subframe located in a second radio frame that is subsequent to the first radio frame. In other words, interlacing is not enabled, and UE 806 may only monitor downlink subframes or transmit using uplink subframes but not both.

Referring to FIG. 8B, UE 806 may receive information 801 indicating a narrowband TDD frame structure for narrowband communications from base station 804. For example, the information 801 may indicate that the narrowband TDD frame structure is one of configuration 0, 1, 2, 3, 4, 5, 6, 1, or o from table 410 in FIG. 4.

In addition, UE 806 may receive a downlink grant 807 that allocates a first set of subframes for the NPDCCH 809 and/or NPDSCH 809. For example, the downlink grant 807 may indicate that downlink subframes p to q are allocated for the NPDCCH 809 and/or NPDSCH 809. Further, UE 806 may receive the NPDCCH 809 and/or NPDSCH 809 associated with the downlink grant 807 in at least one subframe in the set of subframes p to q. In a first illustrative example, assume the narrowband TDD frame structure is configuration 1, and subframes 3, 4, and 5 (e.g., p is equal to 3 and q is equal to 5) are allocated in the downlink grant 807 for the NPDCCH 809 and/or NPDSCH 809. In one aspect, the plurality of subframes may include one or more of uplink subframes, downlink subframes, and special subframes.

In addition, UE 806 may receive an uplink grant 811 that allocates a second set of subframes for the NPUCCH 813 and/or NPUSCH 813. For example, the second set of subframes may be located before the first set of subframes, located after the first set of subframes, and/or partially overlap with the first set of subframes. In addition, UE 806 may be restricted to transmit the NPUCCH 813 and/or NPUSCH 813 using a subset of subframes in the second set. In one aspect, the UE 806 may be restricted to a subset of subframes to accommodate switching from receiving the NPDCCH 809 and/or NPDSCH 809 to transmitting the NPUCCH 813 and/or NPUSCH 813. In certain configurations, the downlink grant 807 and the uplink grant 811 may be received in the same search space. In one aspect, a NPUCCH (ACK) and a NPDSCH may not be interlaced.

Referring to the first illustrative example discussed above, assume the uplink grant 811 indicates that the UE 806 may transmit the NPUCCH 813 and/or NPUSCH 813 in uplink subframes located in the set of subframes 1, 2, 3, 4, 5, 6, 7, and 8. In addition, assume the UE 806 is restricted to subframes that are located a number of subframes before the first subframe allocated for the NPDCCH 809 and/or NPDSCH 809 (e.g., subframe p−a). In addition, assume UE 806 is restricted to subframes that are located b number of subframes after the last subframe allocated for the NPDCCH 809 and/or NPDSCH 809 (e.g., subframe q+b). Furthermore, assume that a is equal to 1 and that b is equal to two. Hence in the first illustrative example, UE 806 may transmit the NPUCCH 813 and/or NPUSCH 813 using subframes 1, 2, and 8 because subframe 3 is restricted (e.g., 4−1=3) for switching and subframes 6 and 7 are also restricted (e.g., 5+2=7) for switching.

Alternatively, UE 806 may not use an entire subframe to switch from uplink transmission to downlink monitoring. Therefore, the UE 806 may be restricted to transmit before or after the downlink subframes by a certain number of symbols rather than subframes. The restricted symbols may be punctured at the beginning or end of the restricted subframes depending on whether NPDSCH and/or NPDCCH is being transmitted. In scenarios when special subframes are included in the first set of subframes, the special subframe configuration may support switching time and no additional switching time (e.g., symbols or subframes) may be used by UE 806.

Referring to FIG. 8C, UE 806 may receive information 801 indicating a TDD frame structure for narrowband communications from base station 804. For example, the information 801 may indicate that the narrowband TDD frame structure is one of configuration 0, 1, 2, 3, 4, 5, 6, 1, or o from table 410 in FIG. 4.

In addition, UE 806 may receive an uplink grant 815 that allocates a first set of subframes for the NPUCCH 817 and/or NPUSCH 817. For example, the uplink grant 815 may indicate that downlink subframes p to q are allocated for the NPUCCH 817 and/or NPUSCH 817. Further, UE 806 may transmit the NPUCCH 817 and/or NPUSCH 817 associated with the uplink grant 815 in at least one subframe in the set of subframes p to q. As an illustrative example, assume narrowband TDD frame structure is configuration 1, and subframes 6 and 7 (e.g., p is equal to 6 and q is equal to 7) are allocated in the uplink grant 815 for the NPUCCH 817 and/or NPUSCH 817. In the illustrative example, the first set of subframes include a special subframe 6 and uplink subframe 7.

In addition, UE 806 may receive a downlink grant 819 that allocates a second set of subframes for the NPDCCH 821 and/or NPDSCH 821, and UE 806 may receive the NPDCCH 821 and/or NPDSCH 821 in the second set of subframes. In certain configurations, the second set of subframes may be located before the first set of subframes, located after the first set of subframes, and/or partially overlap with the first set of subframes. In addition, UE 806 may be restricted to monitor a subset of subframes in the second set for the NPDCCH 821 and/or NPDSCH 821. In one aspect, the UE 806 may be restricted to monitor a set of the allocated downlink subframes to accommodate switching from transmitting the NPUCCH 817 and/or NPUSCH 817 to monitoring for the NPDCCH 821 and/or NPDSCH 821 that may be received in the second set of subframes.

Referring to the illustrative example discussed above with respect to FIG. 8C, assume the downlink grant 819 indicates that the UE 806 that downlink subframes located between subframes 4, 5, 6, 7, 8, and 9 are allocated for the NPDCCH 821 and/or NPDSCH 821. In addition, assume the UE 806 is restricted to subframes that are located c number of subframes before the first subframe allocated for the NPUCCH 817 and/or NPUSCH 817 (e.g., subframe p−c). In addition, assume UE 806 is restricted to subframes that are located d number of subframes after the last subframe allocated for the NPUCCH 817 and/or NPUSCH 817 (e.g., subframe q+d). Furthermore, assume that c is equal to 1 and that d is equal to one. Hence in the illustrative example discussed with reference to FIG. 8C, UE 806 may monitor downlink subframes 4 and 9 and not subframe 5 because subframe 5 is restricted (e.g., 6−1=5) for switching. There are no downlink subframes located after subframe 7, and thus no downlink subframes after subframe 7 are restricted for switching.

Bitmap

FIG. 9 illustrates a data flow 900 that may be used for communicating a bitmap associated with a narrowband TDD frame structure in accordance with certain aspects of the disclosure. Base station 904 may correspond to, e.g., base station 102, 180, 504, 604, 704, 804, 1004, 1104, 2350, eNB 310, apparatus 1802/1802'. UE 906 may correspond to, e.g., UE 104, 350, 506, 606, 706, 806, 1006, 1106, 1850, apparatus 2302/2302'. In addition, the base station 904 and the UE 906 may be configured to communicate using narrowband communications (e.g., NB-IoT and/or eMTC). For example, the UE 906 may be an NB-IoT device and/or an eMTC device.

In one aspect, base station 904 may determine 901 a narrowband TDD frame structure for narrowband communications that includes one or more of a set of downlink subframes, a set of uplink subframes, a set of special subframes, and/or a set of flexible subframes. For example, base station 904 may determine 901 that the narrowband TDD frame structure is one of configuration 0, 1, 2, 3, 4, 5, 6, 1, or o from table 410 in FIG. 4.

In another aspect, base station 904 may transmit a bitmap 903 associated with the narrowband TDD frame structure to UE 906. Bitmap 903 may indicate the set of downlink subframes, the set of uplink subframes, the set of special subframes, and/or the set of flexible subframes in the determined narrowband TDD frame structure.

In one aspect, when base station 904 operates in in-band mode, a single bitmap 903 indicating the set of downlink subframes, the set of uplink subframes, the set of special subframes, and/or the set of flexible subframes may be transmitted to UE 906. Alternatively, when base station 904 operates in standalone mode, a first bitmap 903 that indicates the set of downlink subframes, a second bitmap 903 that indicates the set of uplink subframes, a third bitmap 903 that indicates the set of special subframes, and/or a fourth bitmap 903 that indicates the set of flexible subframes may be separately transmitted to UE 806.

In one configuration, a first length of the bitmap 903 associated with the determined narrowband TDD frame structure may be longer than a second length of a different bitmap associated with a narrowband FDD frame structure. For example, a single bitmap of length N (e.g., N=60) be used to indicate or more of downlink subframes and/or uplink subframes in a narrowband FDD frame structure. In certain configurations, the length N of bitmap 903 used to indicate the available downlink subframes, uplink subframes, special subframes, and/or flexible subframes in the narrowband TDD frame structure may be larger (e.g., N=80) than the bitmap used to indicate the narrowband FDD frame structure. The length of the narrowband TDD frame structure bitmap may be larger than the narrowband FDD frame structure bitmap because there may be more types of subframes available for allocation using a narrowband TDD frame structure as compared to a narrowband FDD frame structure.

When base station 904 allocates one or more flexible subframes for the NPDCCH and/or the NPDSCH, UE 906 may decode NRS and the NPDCCH and/or NPDSCH transmitted on the allocated flexible subframe(s). When base station 904 allocates one or more flexible subframes for the NPUCCH and/or the NPUSCH, UE 906 may use the allocated flexible subframes to transmit the NPUCCH and/or the NPUSCH. When flexible subframes are not allocated for the NPDCCH, NPDSCH, NPUCCH, or NPUSCH, UE 906 may ignore the flexible subframes. For example, the UE 906 may not perform NRS detection on the flexible subframes when flexible subframes are not allocated for the NPDCCH, NPDSCH, NPUCCH, or NPUSCH.

Data Scrambling

Data scrambling may be used to transpose and/or invert signals or otherwise encode the NPDCCH and/or NPDSCH with a predetermined scrambling sequence. The scrambling sequence may be unintelligible to a UE not equipped with an appropriately set descrambling device, and hence only an intended UE may properly decode the NPDCCH and/or NPDSCH.

Using a narrowband FDD frame structure, the scrambling sequence for the NPDCCH and/or NPDSCH may remain the same for a predetermined number of repeated transmissions (e.g., at least four repeated transmissions) across a set of downlink subframes. To increase the chance of properly decoding the NPDCCH and/or NPDSCH, a legacy UE may combine the scrambling sequence of the NPDCCH and/or NPDSCH across each of the repeated transmissions as long as the channel does not vary across the repeated transmissions. As an illustrative example, assume that the scrambling sequence for repeated transmissions of the NPDSCH using a narrowband FDD frame structure remains the same across four downlink subframes. In addition, assume that the NPDSCH is repeated on subframes {5, 6, 8, 10, 13, 15, 16 17} across two radio frames that include subframes 0-19. The scrambling sequence of the NPDSCH on subframes {5, 6, 8, 10} may be based on the scrambling sequence associated with subframe 5, and the scrambling sequence of the NPDSCH on subframes {13, 14, 15, 17} may be based on the scrambling sequence associated with subframe 13.

Using a narrowband TDD frame structure, uplink subframes and/or unused flexible subframes may be located in between downlink subframes and/or special subframes used to transmit the NPDCCH and/or NPDSCH. Consequently, the duration over which repeated transmission of the NPDCCH and/or NPDSCH using a narrowband TDD frame structure may be increased as compared to a duration of the same number of repetitions transmitted using an FDD frame structure. The likelihood that channel conditions may change over the repeated transmissions using a narrowband TDD frame structure may therefore be increased as compared to repeated transmissions using a narrowband FDD frame structure, and hence the UE may be less likely to combine the repeated transmission.

There is a need for a technique that enables a UE to combine repeated transmissions that have the same scrambling sequence in a narrowband TDD frame structure.

Figure 10:
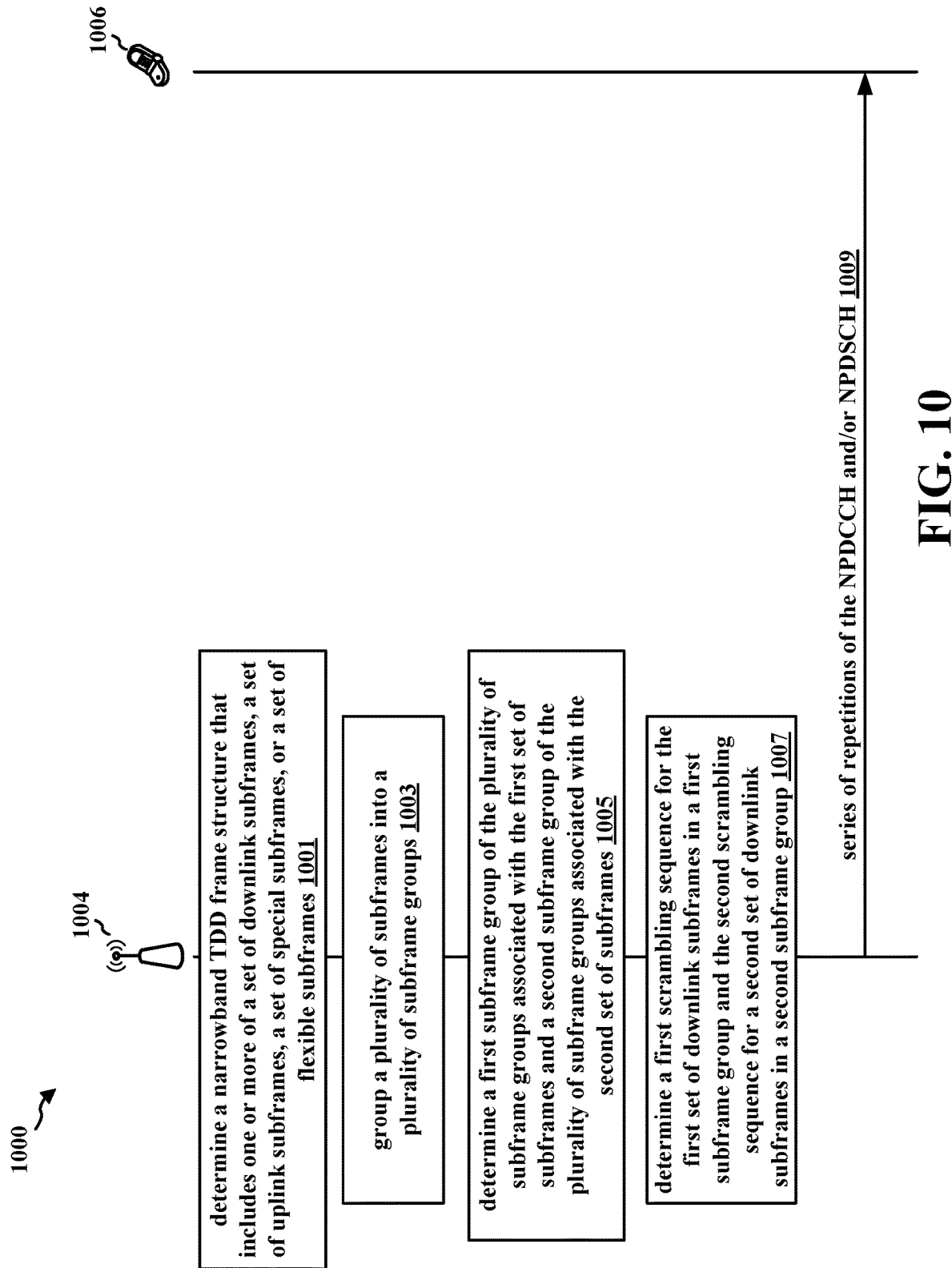
FIG. 10 illustrates a data flow that may be used to support narrowband communications using narrowband TDD frame structures in accordance with certain aspects of the disclosure.

FIG. 10 illustrates a data flow 100 that that may enable data scrambling of an NPDCCH and/or NPDSCH that is transmitted using a narrowband TDD frame structure in accordance with certain aspects of the disclosure. Base station 1004 may correspond to, e.g., base station 102, 180, 504, 604, 704, 804, 904, 1104, 2350, eNB 310, apparatus 1802/1802'. UE 906 may correspond to, e.g., UE 104, 350, 506, 606, 706, 806, 906, 1106, 1850, apparatus 2302/2302'. In addition, the base station 1004 and the UE 1006 may be configured to communicate using narrowband communications (e.g., NB-IoT and/or eMTC). For example, the UE 1006 may be an NB-IoT device and/or an eMTC device.

In one aspect, base station 1004 may determine 1001 a narrowband TDD frame structure that includes one or more of a set of downlink subframes, a set of uplink subframes, a set of special subframes, or a set of flexible subframes. For example, base station 1004 may determine 1001 that the narrowband TDD frame structure is one of configuration 0, 1, 2, 3, 4, 5, 6, 1, or o from table 410 in FIG. 4.

In addition, base station 1004 may group 1003 a plurality of subframes into a plurality of subframe groups. In one aspect, each of the plurality of subframe groups may be associated with a particular scrambling sequence, and each subframe group may be determined based on a downlink subframe and a predetermined number of following subframes.

In a first example of FIG. 10, a scrambling sequence generator for the NPDCCH and/or NPDSCH at base station 1004 may be reinitialized after every min(RepetitionSize, M) absolute subframes. Absolute subframes may be a predetermined M number of subframes that include all subframes within a range (e.g. four subframes) regardless of whether the subframes are used to transmit the NPDCCH and/or NPDSCH.

In a second example of FIG. 10, base station 1004 may use predefined boundaries of subframes, and all NPDCCH and/or NPDSCH transmissions that fall within a boundary may have the same scrambling based on the lowest subframe index in that boundary. In one aspect, the boundaries may be defined as mod(sub-frame-index−i_Delta, i_M)=0.

Further, base station 1004 may determine 1005 a first subframe group of the plurality of subframe groups associated with the first set of subframes and a second subframe group of the plurality of subframe groups associated with the second set of subframes. In both the first example and the second example of FIG. 10, assume M is equal to four, and that the NPDSCH is repeated on subframes {5, 6, 8, 10, 13, 14, 15, 17} across two radio frames with subframes 0-19.

In the first example discussed above with respect to FIG. 10, the range of subframes (e.g., four subframes) starting with subframe 5 includes subframes 5, 6, 7, 8. The range of subframes (e.g., four subframes) starting with subframe 10 (e.g., the first subframe after the last subframe in the first group) includes subframes 10, 11, 12, 13. Further, the range of subframes (e.g., four subframes) starting with subframe 14 (e.g., the first subframe after the last subframe in the second group) includes subframes 14, 15, 16, 17. Thus, base station 1004 may group subframes {5, 6, 8} into a first group, subframes {10, 13} into a second group, and subframes {14, 15, 17} into a third group.

In a second example discussed above with respect to FIG. 10, the boundaries of the subframes would be {[0-3] [4-7] [8-11] [12-15] [16-19]}. Thus, base station 1004 may group subframes {0, 1, 2, 3} into a first group, subframes {4, 5, 6, 7} into a second group, subframes {8, 9, 10, 11} into a third group, subframes {12, 13, 14, 15} into a fourth group, and subframes {16, 17, 18, 19} into a fifth group.

Additionally, base station 1004 may determine 1007 a first scrambling sequence for the first set of downlink subframes in a first subframe group and the second scrambling sequence for a second set of downlink subframes in a second subframe group.

Referring to the first example discussed above with respect to FIG. 10, the scrambling sequence used by base station 1004 for the NPDSCH transmitted in subframes {5, 6, 8} may be based on the scrambling sequence of subframe of subframe 5. In addition, scrambling sequence used by base station 1004 for the NPDSCH transmitted in subframes {10, 13} may be based on the scrambling sequence of subframe 10. Further, the scrambling sequence used by base station 1004 for the NPDSCH transmitted in subframes {14, 15, 17} may be based on subframe 14.

Referring to the second example discussed above with respect to FIG. 10, the scrambling sequence used by base station 1004 for the NPDSCH transmitted in subframes {5, 6} may be based on subframe 4, the scrambling sequence used by base station 1004 for the NPDSCH transmitted in subframes {8, 10} may be based on subframe 8, the scrambling sequence used by base station 1004 for the NPDSCH transmitted in subframes {13, 14, 15} may be based on subframe 12, and the scrambling sequence used by base station 1004 for the NPDSCH transmitted in subframe {17} may be based on subframe 16.

Base station 1004 may transmit 1009 a series of repetitions of the NPDCCH and/or NPDSCH based on either the first example or the second example described above with respect to FIG. 10.

Redundancy Version and Cycling Pattern

Different redundancy versions of the NPDCCH and/or NPDSCH may be transmitted using a cycling pattern in addition to or instead of the data scrambling sequences discussed above with respect to FIG. 10. Because a narrowband TDD frame structure may not include a large number of contiguous downlink subframes, a UE may not be able to combine the redundancy versions if channel conditions change over one or more repetition cycles. Thus, there is a need for a redundancy version cycling pattern that may increase the chance of a UE properly combining redundancy versions transmitted by a base station using a narrowband TDD frame structure.

Figure 11:
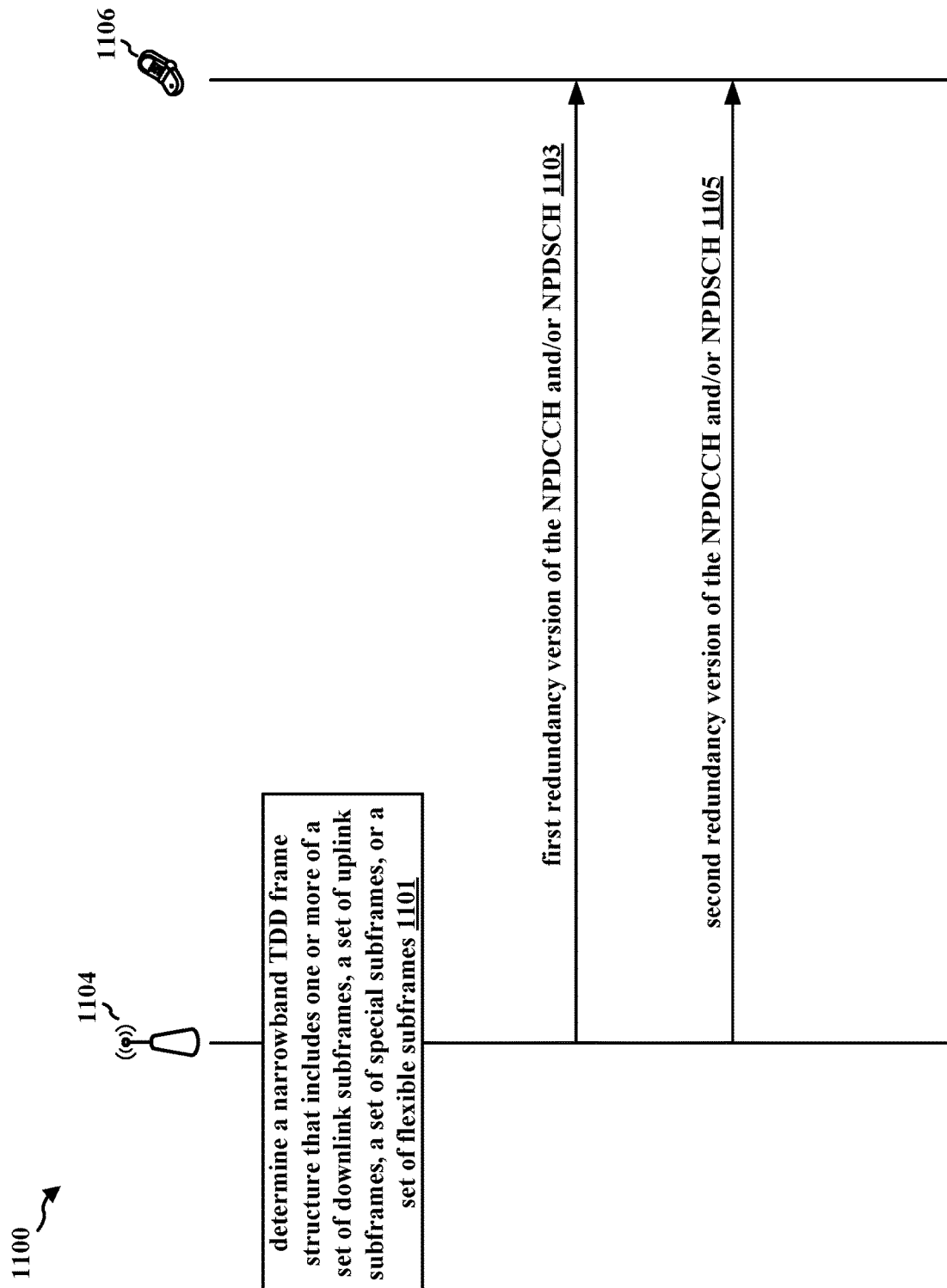
FIG. 11 illustrates a data flow that may be used to support narrowband communications using narrowband TDD frame structures in accordance with certain aspects of the disclosure.

FIG. 11 illustrates a data flow 1100 that may enable a redundancy version cycling pattern used for an NPDCCH and/or NPDSCH in accordance with certain aspects of the disclosure. Base station 1104 may correspond to, e.g., base station 102, 180, 504, 604, 704, 804, 904, 1004, 2350, eNB 310, apparatus 1802/1802'. UE 1106 may correspond to, e.g., UE 104, 350, 506, 606, 706, 806, 906, 1006, 1850, apparatus 2302/2302'. In addition, the base station 1104 and the UE 1106 may be configured to communicate using narrowband communications (e.g., NB-IoT and/or eMTC). For example, the UE 1106 may be an NB-IoT device and/or an eMTC device.

In one aspect, base station 1104 may determine 1101 a narrowband TDD frame structure that includes one or more of a set of downlink subframes, a set of uplink subframes, a set of special subframes, or a set of flexible subframes. For example, base station 1104 may determine 1101 that the narrowband TDD frame structure is one of configuration 0, 1, 2, 3, 4, 5, 6, l, or o from table 410 in FIG. 4.

In addition, base station 1104 may transmit a first redundancy version (RV0) of the NPDCCH 1103 and/or NPDSCH 1103 and a second redundancy version (RV1) 1105 of the NPDCCH 1105 and/or NPDSCH 1105 using the narrowband TDD frame structure. In one aspect, a number of repetitions of RV0 may be transmitted in a repetition cycle before switching to RV1, and vice versa. The number of repetitions in a repetition cycle may be based on a number of contiguous downlink subframes in the determined narrowband TDD frame structure and a predetermined maximum number of repetitions.

As an illustrative example, assume configuration 1 is used for the narrowband TDD frame structure, that sixteen repetitions of the NPDCCH 1103 and/or NPDSCH 1103 are configured, that two versions of repetition are configured, and that the maximum number of repetitions in a repetition cycle is two. Hence in the illustrative example, the sequence transmitted by base station 1104 is {RV0RV0 RV1RV1 RV0RV0 RV1RV1 RV0RV0 RV1RV1 RV0RV0 RV1RV1 RV0RV0 RV1RV1 RV0RV0 RV1RV1 RV0RV0 RV1RV1 RV0RV0 RV1RV1)}.

In certain configurations, a redundancy version (e.g., RV0 or RV1) may change whenever data scrambling changes. As an illustrative example, assume the NPDSCH 1105 is transmitted on subframes {5, 6, 8, 10, 13, 14, 15, 17}. Here, if scrambling on subframes {5, 6, 8} is based on the scrambling sequence of subframe 5, scrambling on subframes {10, 13} is based on the scrambling sequence of subframe 10, and if scrambling on subframes {14, 15, 17} is based the scrambling sequence of subframe 14, then subframes {5, 6, 8} may use RV0, subframes {10, 13} may use RV1, and subframes {14, 15, 17} may use RV0 (e.g., or a repetition version that is different than RV1).

Figure 12A:
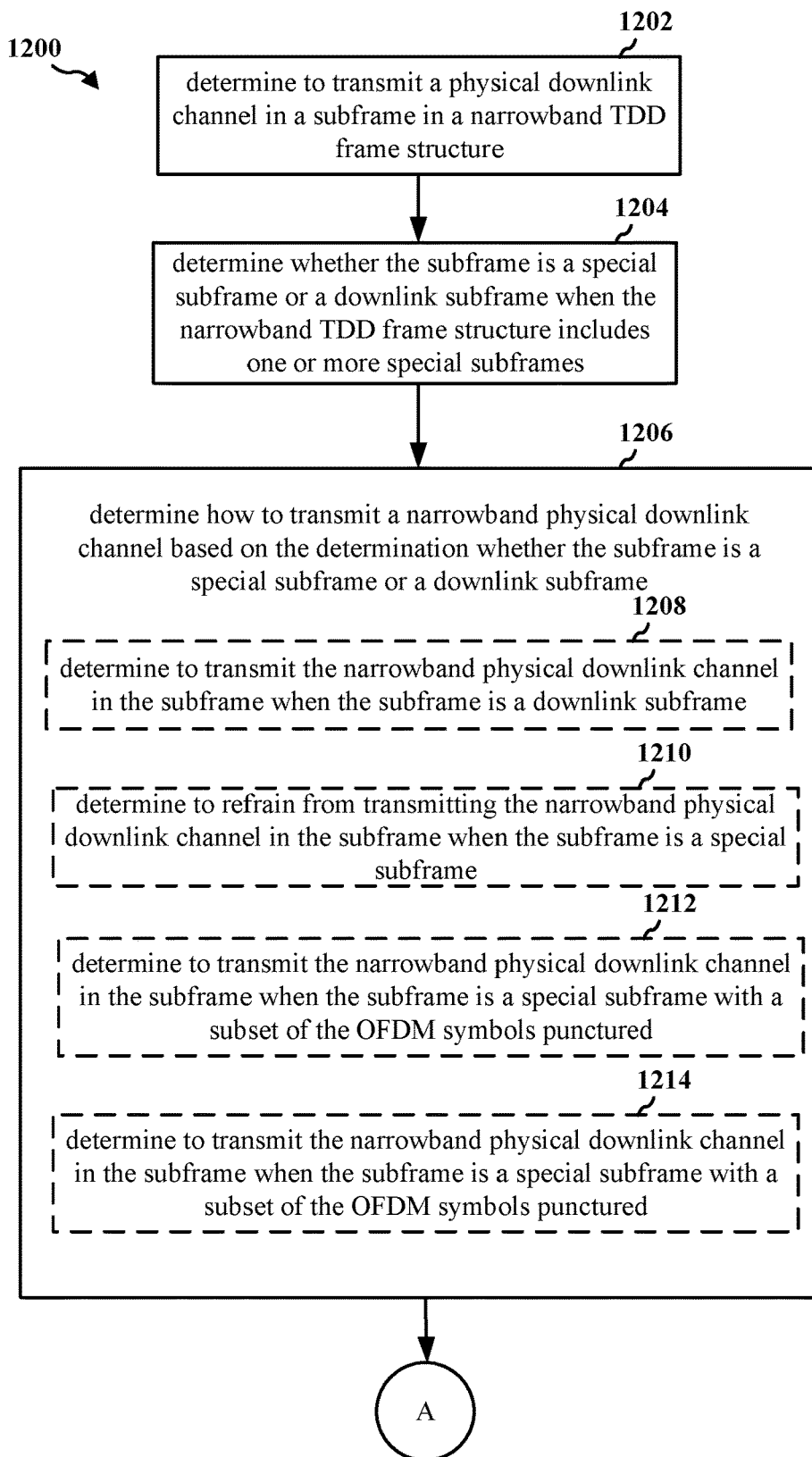
FIGS. 12A-12C are a flowchart of a method of wireless communication.
Figure 12B:
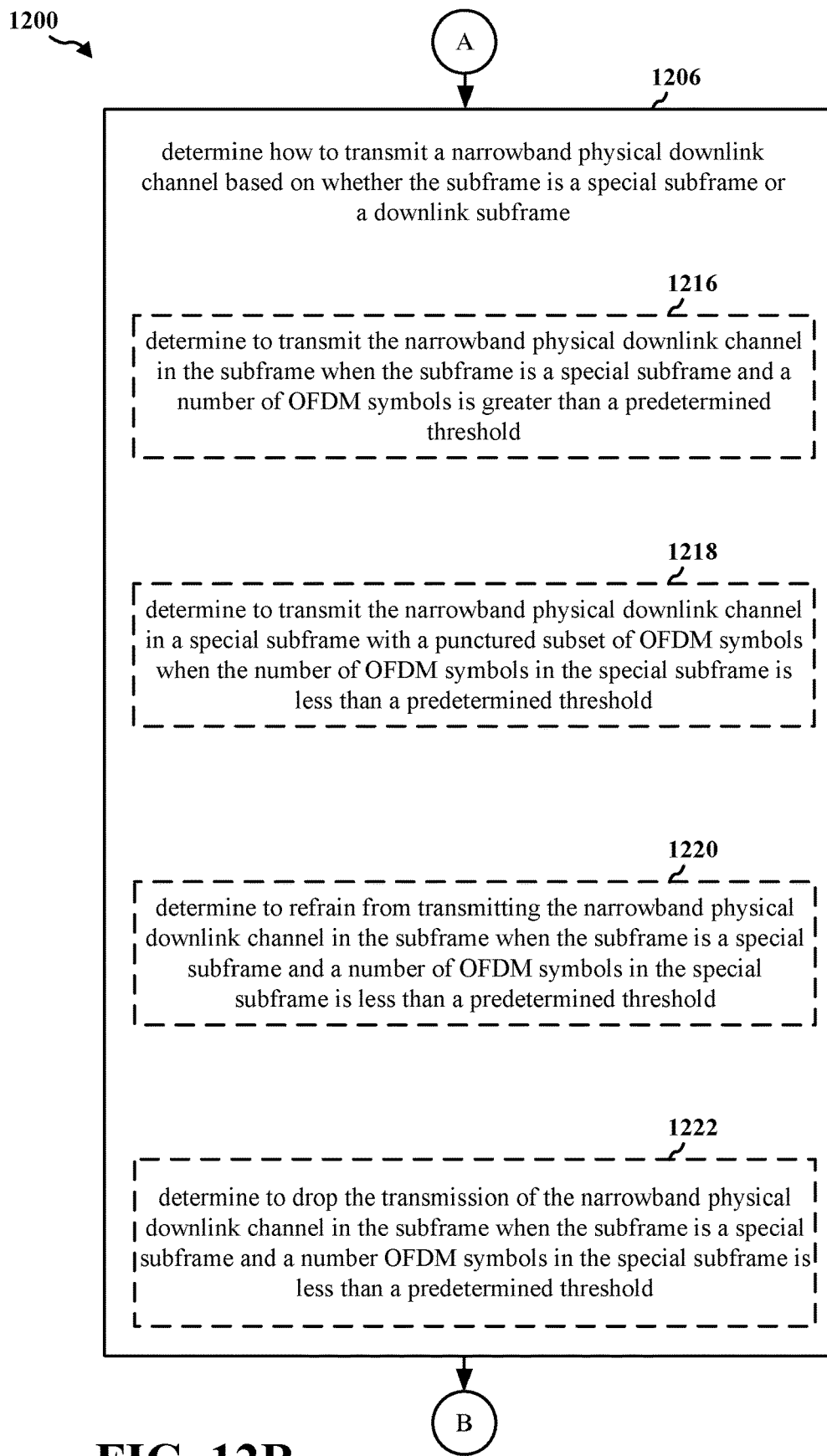
Figure 12C:
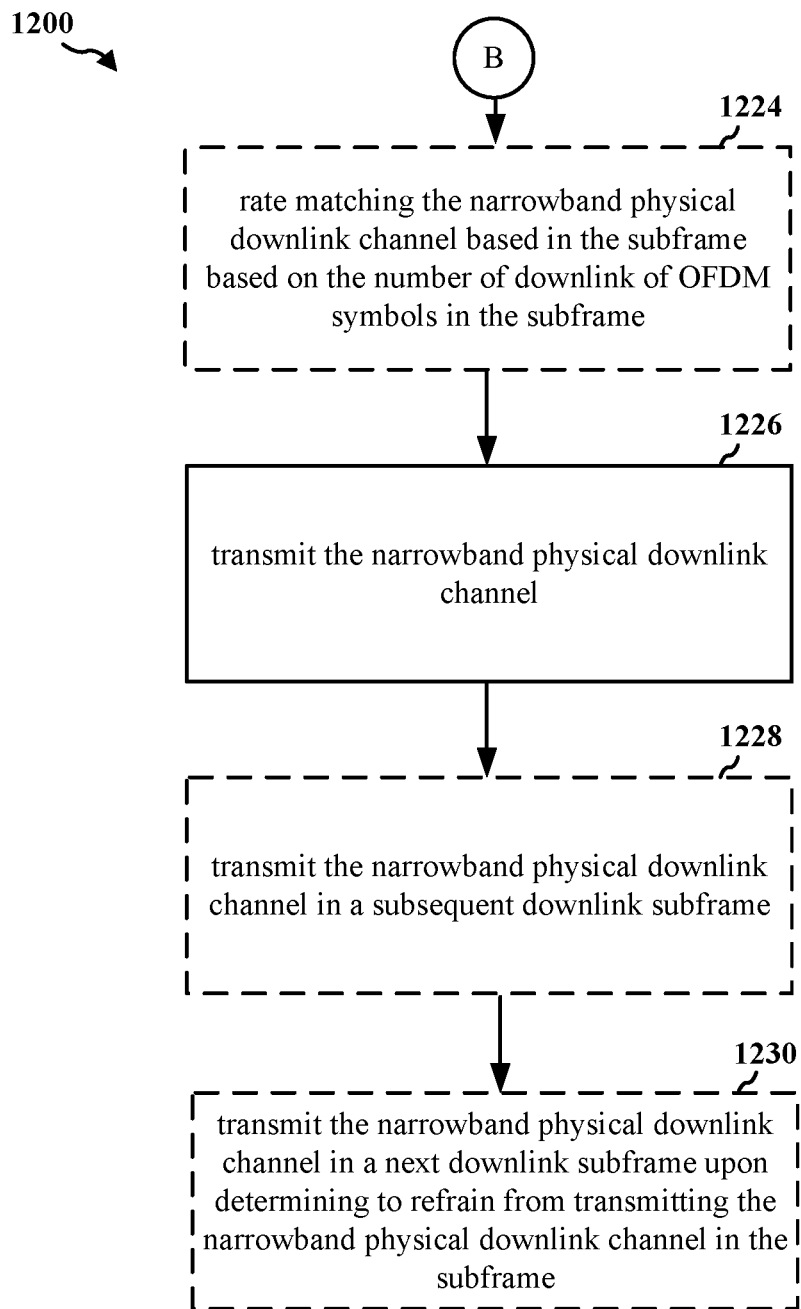

FIGS. 12A-12C are a flowchart 1200 of a method of wireless communication. The method may be performed by a base station (e.g., the base station 102, 180, 504, 604, 704, 804, 904, 1004, 1104, 2350, eNB 310, the apparatus 1102/1102'). In FIGS. 12A-12C, operations with dashed lines indicate optional operations.

In FIG. 12A, at 1202, the base station may determine to transmit a physical downlink channel in a subframe in a narrowband TDD frame structure of a plurality of narrowband TDD frame structures for narrowband communications. In one aspect, the physical downlink channel may include at least one of a NPDSCH or a NPDCCH. For example, referring to FIG. 5, base station 504 may determine 501 to transmit an NPDCCH and/or NPDSCH in a subframe in a narrowband TDD frame structure. For example, the base station 504 may determine 501 the narrowband TDD frame structure is one of configuration 0, 1, 2, 3, 4, 5, 6, l, or o from table 410 in FIG. 4.

In FIG. 12A, at 1204, the base station may determine whether the subframe is a special subframe or a downlink subframe when the narrowband TDD frame structure includes one or more special subframes. For example, referring to FIG. 5, base station 504 may determine 503 whether a subframe allocated for an NPDCCH and/or NPDSCH is a special subframe or a downlink subframe when the determined narrowband TDD frame structure includes one or more special subframes (e.g., configurations 0, 1, 2, 3, 4, 5, 6, and n in FIG. 4).

In FIG. 12A, at 1206, the base station may determine how to transmit a narrowband physical downlink channel based on the determination whether the subframe is a special subframe or a downlink subframe. For example, referring to FIG. 5, base station 504 may determine 505 how to transmit the NPDCCH and/or NPDSCH and allocate resources in one or more downlink subframe and/or special subframes. In one aspect, the base station 504 may allocate resources for the NPDCCH and/or NPDSCH in all available downlink subframes (e.g., downlink subframes not being used for switching). However, the allocation of resources on a special subframe by base station 504 may be a function of a special subframe configuration (e.g., how many resources are available in the DwPTS portion) and/or the determined narrowband TDD frame.

In FIG. 12A, at 1208, the base station may determine how to transmit a narrowband physical downlink channel based on the determination whether the subframe is a special subframe or a downlink subframe by determining to transmit the narrowband physical downlink channel in the subframe when the subframe is a downlink subframe. For example, referring to FIG. 5, the base station 504 may allocate resources for the NPDCCH and/or NPDSCH in all available downlink subframes (e.g., downlink subframes not being used for switching).

In FIG. 12A, at 1210, the base station may determine how to transmit a narrowband physical downlink channel based on the determination whether the subframe is a special subframe or a downlink subframe by determining to refrain from transmitting the narrowband physical downlink channel in the subframe when the subframe is a special subframe. For example, referring to FIG. 5, in a first configuration, base station 504 may determine 505 to transmit the NPDCCH and/or NPDSCH in downlink subframes and not special subframes. In the first configuration, base station 504 may not allocate resources for the NPDCCH and/or NPDSCH on special subframes.

In FIG. 12A, at 1212, the base station may determine how to transmit a narrowband physical downlink channel based on the determination whether the subframe is a special subframe or a downlink subframe by determining to transmit the narrowband physical downlink channel in the subframe with a subset of OFDM symbols in the special subframe punctured when the subframe is a special subframe. In an aspect, the narrowband physical downlink channel may be transmitted. For example, referring to FIG. 5, in a second configuration, base station 504 may determine 505 to transmit the NPDCCH 509 and/or NPDSCH 509 in special subframes as well as downlink subframes. In the second configuration, the base station 504 may allocate resources for the NPDCCH and/or NPDSCH in downlink subframes as well as the DwPTS portion of one or more special subframes. In a first aspect of the second configuration, base station 504 may puncture the OFDM symbols in the UpPTS portion of the one or more special subframes.

In FIG. 12A, at 1214, the base station may determine how to transmit a narrowband physical downlink channel based on the determination whether the subframe is a special subframe or a downlink subframe by determining to transmit the narrowband physical downlink channel in the subframe with at least OFDM symbols in the downlink portion of the special subframe punctured when the subframe is a special subframe. For example, referring to FIG. 5, in a second aspect of the second configuration, base station 504 may puncture the OFDM symbols in the DwPTS portion and the UpPTS portion of the one or more special subframes. By puncturing the OFDM symbols in the DwPTS portion and the UpPTS portion of the one or more special subframes, UE 506 may ignore (e.g., not monitor or discard) the special subframes while receiving NPDCCH and/or NPDSCH in a radio frame.

In FIG. 12B, at 1216, the base station may determine how to transmit a narrowband physical downlink channel based on the determination whether the subframe is a special subframe or a downlink subframe by determining to transmit the narrowband physical downlink channel in the subframe when the subframe is a special subframe and a number of OFDM symbols in the special subframe is greater than a predetermined threshold. For example, referring to FIG. 5, in a third configuration, base station 504 may determine 505 to transmit the NPDCCH 509 and/or NPDSCH 509 in a special subframe when a number of OFDM symbols in the special subframe is greater than a predetermined threshold. Otherwise, base station 504 may transmit a repetition of the NPDCCH 511 and/or NPDCCH 511 in the next downlink subframe. As an illustrative example, assume configuration 2 is used for the narrowband TDD frame structure, that special subframe 1 has ten OFDM symbols, and that the predetermined threshold is five OFDM symbols. Here, base station 504 may transmit the NPDCCH 509 and/or NPDSCH 509 in subframe 0 and a repetition of the NPDCCH 511 and/or NPDSCH 511 in special subframe 1.

In FIG. 12B, at 1218, the base station may determine how to transmit a narrowband physical downlink channel based on the determination whether the subframe is a special subframe or a downlink subframe by determining to transmit the narrowband physical downlink channel in the subframe with a subset of OFDM symbols punctured in the special subframe when the subframe is a special subframe and a number of OFDM symbols in the special subframe is less than a predetermined threshold. For example, referring to FIG. 5, base station 504 may determine 505 to transmit the NPDCCH 509 and/or NPDSCH 509 in the special subframe when a number of OFDM symbols in the special subframe is less than a predetermined threshold. In the fourth configuration, base station 504 may transmit the NPDCCH 509 and/or NPDSCH 509 with a subset of OFDM symbols (e.g., a subset of the OFDM symbols in the DwPTS portion and/or the UpPTS portion) punctured in the special subframe. As an illustrative example, assume configuration 2 is used for the narrowband TDD frame structure, that special subframe 1 has five OFDM symbols, and that the predetermined threshold is ten OFDM symbols. Here, base station 504 may transmit the NPDCCH 509 and/or NPDSCH 509 in subframe 0 and transmit a repetition of the NPDCCH 511 and/or NPDSCH 511 in special subframe 1 with a subset of the OFDM symbols in special subframe 1 punctured.

In FIG. 12B, at 1220, the base station may determine how to transmit a narrowband physical downlink channel based on the determination whether the subframe is a special subframe or a downlink subframe by determining to refrain from transmitting the narrowband physical downlink channel in the subframe when the subframe is a special subframe and a number of OFDM symbols in the special subframe is less than a predetermined threshold. For example, referring to FIG. 5, in a fifth configuration, base station 504 may determine 505 to refrain from transmitting the NPDCCH and/or NPDSCH in a special subframe when a number of OFDM symbols in the special subframe is less than a predetermined threshold. In the fifth configuration, base station 504 may transmit the NPDCCH 511 and/or NPDSCH 511 in the next available downlink subframe. As an illustrative example, assume configuration 2 is used for the narrowband TDD frame structure, that special subframe 1 has five OFDM symbols, and that the predetermined threshold is ten OFDM symbols. Here, base station 504 may transmit the NPDCCH 509 and/or NPDSCH 509 in subframe 0 and wait until the next downlink subframe 3 to transmit a repetition of the NPDCCH 511 and/or NPDSCH 511.

In FIG. 12B, at 1222, the base station may determine how to transmit a narrowband physical downlink channel based on the determination whether the subframe is a special subframe or a downlink subframe by determining to drop the transmission of the narrowband physical downlink channel in the subframe when the subframe is a special subframe and a number of OFDM symbols in the special subframe is less than a predetermined threshold. For example, referring to FIG. 5, base station 504 may determine 505 to drop the transmission of the NPDCCH and/or NPDSCH in a special subframe when a number of OFDM symbols in the special subframe is less than a predetermined threshold.

In FIG. 12C, at 1224, the base station may rate match the narrowband physical downlink channel in the subframe based on the number of downlink of OFDM symbols in the subframe. For example, referring to FIG. 5, base station 504 may rate match the NPDCCH and/or NPDSCH in the subframe (e.g., downlink subframe or special subframe) based on the number of downlink OFDM symbols in the subframe. A special subframe may have a fewer number of OFDM symbols than a downlink subframe because only the DwPTS portion of the special subframe is dedicated for an NPDCCH and/or NPDSCH. Hence, the rate matching for a special subframe may be different than the rate matching for a downlink subframe.

In FIG. 12C, at 1226, the base station may transmit the narrowband physical downlink channel. For example, referring to FIG. 5, when configuration 2 is used as the narrowband TDD frame structure, the base station 504 may transmit the NPDCCH 507 and/or NPDSCH 507 in subframe 0, and a repetition of the NPDCCH 511 and/or NPDSCH 511 may be transmitted in subframe 3 (e.g., the next downlink subframe in configuration 2). In another configuration, base station 504 may determine 505 to transmit the NPDCCH 509 and/or NPDSCH 509 in special subframes and to transmit the NPDCCH 507 and/or NPDSCH 507 in downlink subframes.

In FIG. 12C, at 1228, the base station may transmit the narrowband physical downlink channel in a subsequent downlink subframe. For example, referring to FIG. 5, when configuration 2 is used as the narrowband TDD frame structure, the base station 504 may transmit the NPDCCH 507 and/or NPDSCH 507 in subframe 0, and a repetition of the NPDCCH 511 and/or NPDSCH 511 may be transmitted in subframe 3 (e.g., the next downlink subframe in configuration 2).

In FIG. 12C, at 1230, the base station may transmit the narrowband physical downlink channel in a next downlink subframe upon determining to refrain from transmitting the narrowband physical downlink channel in the subframe. For example, referring to FIG. 5, when configuration 2 is used as the narrowband TDD frame structure, the base station 504 may transmit the NPDCCH 507 and/or NPDSCH 507 in subframe 0, and a repetition of the NPDCCH 511 and/or NPDSCH 511 may be transmitted in subframe 3 (e.g., the next downlink subframe in configuration 2).

Figure 13A:
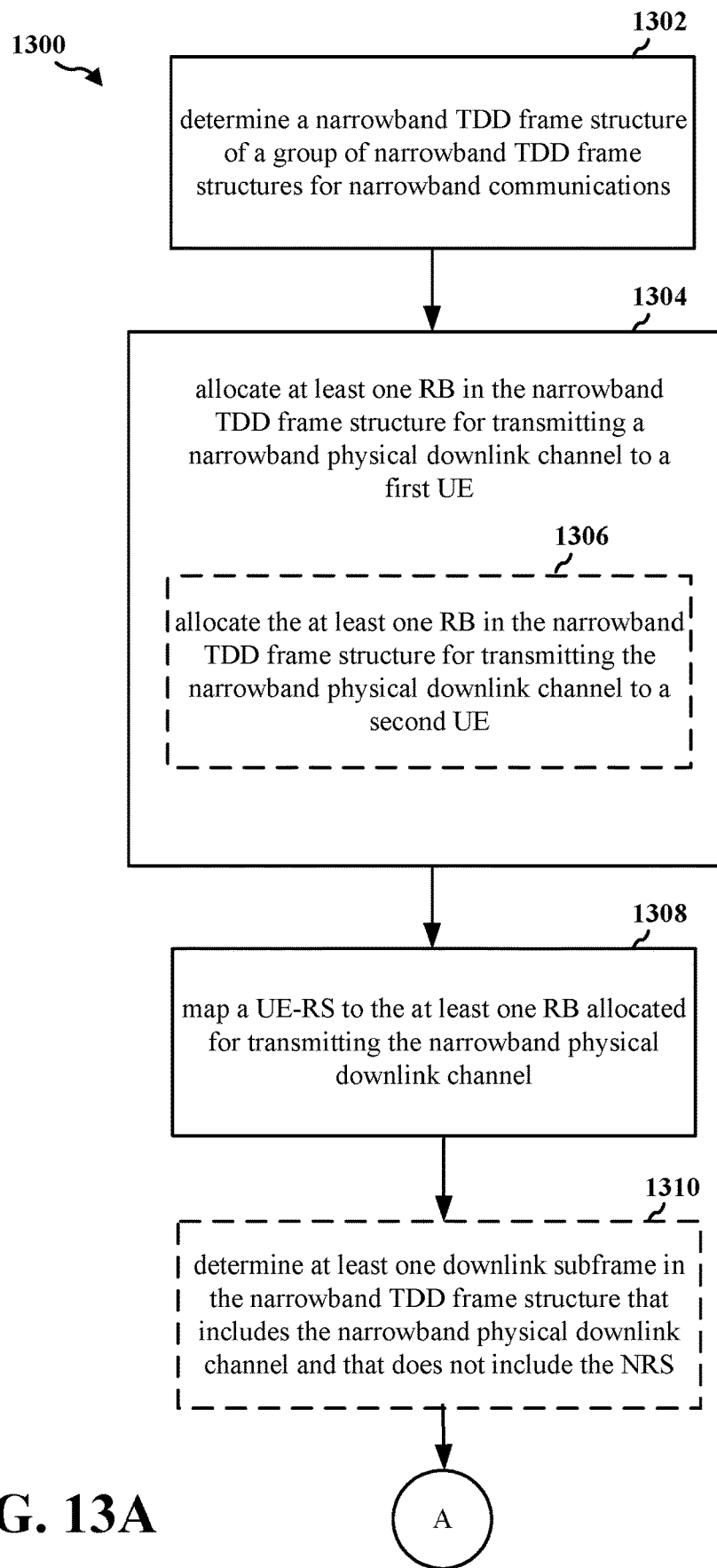
FIGS. 13A-13C are a flowchart of a method of wireless communication.
Figure 13B:
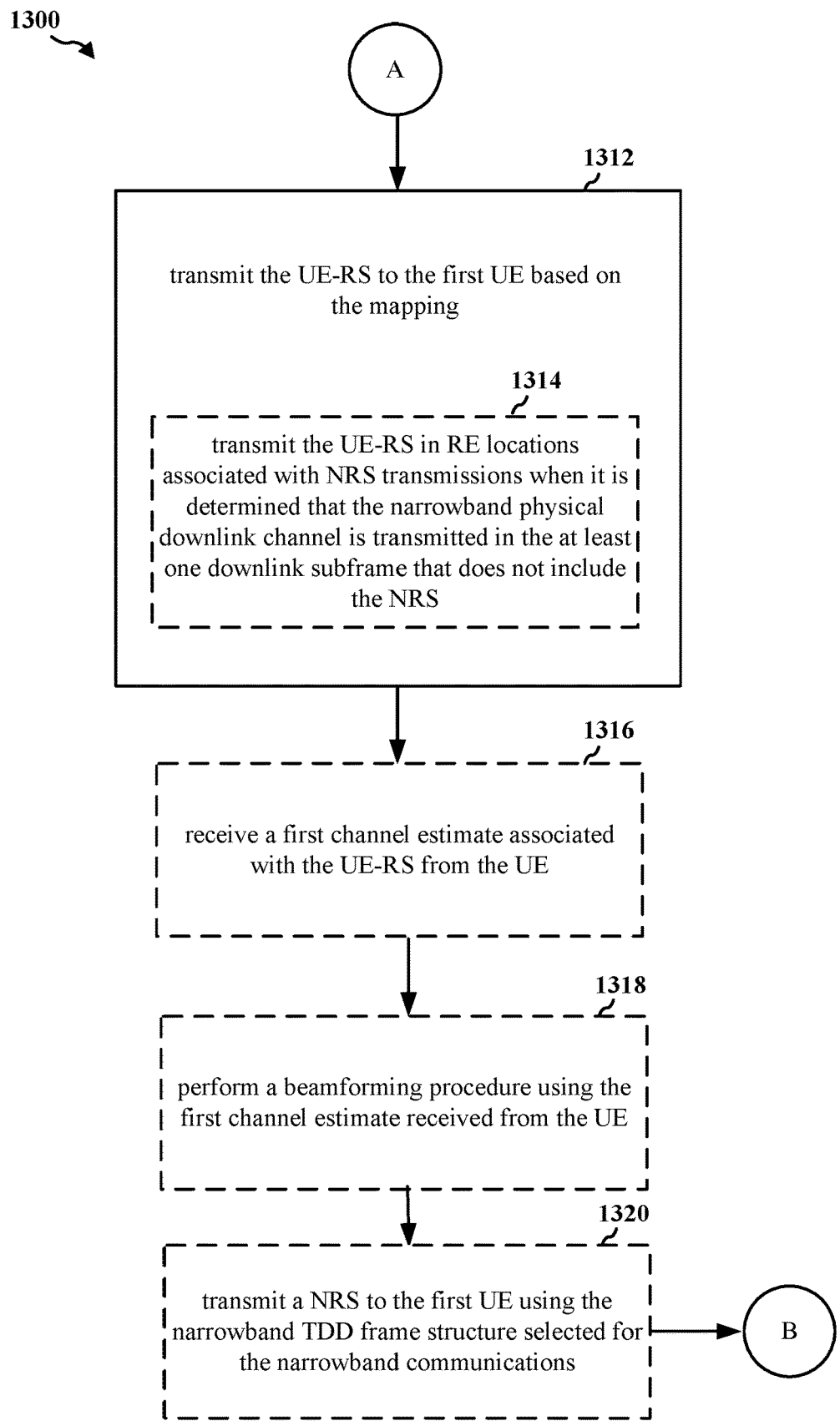
Figure 13C:
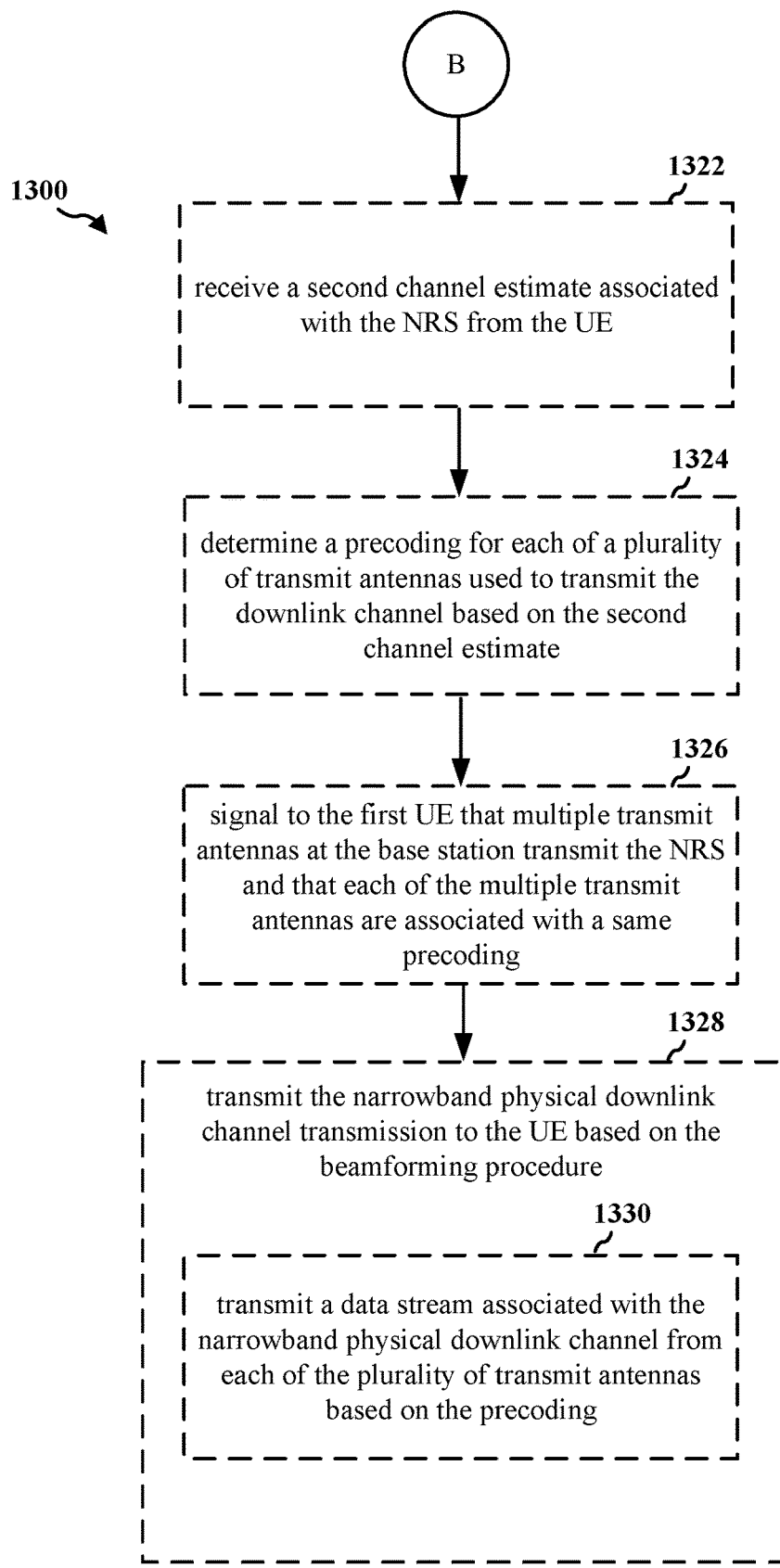

FIGS. 13A-13C are a flowchart 1300 of a method of wireless communication. The method may be performed by a base station (e.g., the base station 102, 180, 504, 604, 704, 804, 904, 1004, 1104, 2350, eNB 310, the apparatus 1102/1102'). In FIG. 13, operations with dashed lines indicate optional operations.

In FIG. 13A, at 1302, the base station may determine a narrowband TDD frame structure of a group of narrowband TDD frame structures for narrowband communications. For example, referring to FIGS. 6A and 6B, base station 604 may determine 601 a narrowband TDD frame structure (e.g., configuration 0, 1, 2, 3, 4, 5, 6, 1, or o listed in table 410 in FIG. 4.) is used for narrowband communications with UE 606.

In FIG. 13A, at 1304, the base station may allocate at least one RB in the narrowband TDD frame structure for transmitting a narrowband physical downlink channel to a first UE. For example, referring to FIGS. 6A and 6B, base station 604 may allocate 603 at least one RB in the narrowband TDD frame structure for transmitting an NPDCCH and/or NPDSCH to UE 606.

In FIG. 13A, at 1306, the base station may allocate at least one RB in the narrowband TDD frame structure for transmitting a narrowband physical downlink channel to a first UE by allocating the at least one RB in the narrowband TDD frame structure for transmitting the narrowband physical downlink channel to a second UE. In one aspect, a modified legacy pilot structure may be used to map the narrowband physical downlink channel to the UE-RS. In another aspect, the NRS and the UE-RS may not share resources in the modified legacy pilot structure. In a further aspect, a legacy pilot signal structure may be used to map the downlink channel to the UE-RS. In still another aspect, the NRS and the UE-RS may not share resources in the legacy pilot structure. For example, referring to FIGS. 6A and 6B, if multi-user MIMO capability is supported (e.g. if two UEs are allocated by base station 604 to the same RB for NPDCCH and/or NPDSCH), the legacy port 107/108 pilot structure or legacy port 109/110 pilot structure may be reused. In one aspect, the UE-RS 607 may not share resources with the NRS 613 in the legacy pilot structure.

In FIG. 13A, at 1308, the base station may map a UE-RS to the at least one RB allocated for transmitting the narrowband physical downlink channel. For example, referring to FIGS. 6A and 6B, base station 604 may map 605 a UE-RS to the at least one RB allocated for the NPDCCH and/or NPDSCH. In one aspect, base station 604 may use a legacy pilot structure (e.g., legacy port 5 pilot structure, modified legacy port 107/108 pilot structure, modified legacy port 109/110 pilot structure, etc.) to populate the UE-RS 607.

In FIG. 13A, at 1310, the base station may determine at least one downlink subframe in the narrowband TDD frame structure that includes the narrowband physical downlink channel and that does not include the NRS. For example, referring to FIGS. 6A and 6B, the UE-RS 607 may not share resources with a NRS 613 in the legacy pilot structure.

In FIG. 13B, at 1312, the base station may transmit the UE-RS to the first UE based on the mapping. For example, referring to FIGS. 6A and 6B, base station 604 may transmit the UE-RS 607 to the UE 606 based on the mapping. In one aspect, base station 604 may use a legacy pilot structure (e.g., legacy port 5 pilot structure, modified legacy port 107/108 pilot structure, modified legacy port 109/110 pilot structure, etc.) to populate the UE-RS 607.

In FIG. 13B, at 1314, the base station may transmit the UE-RS in RE locations associated with NRS transmissions when it is determined that the narrowband physical downlink channel is transmitted in the at least one downlink subframe that does not include the NRS. For example, referring to FIGS. 6A and 6B, the network (e.g., higher layers) may indicate certain downlink subframes that do not include NRS 613. If the NPDCCH and/or NPDSCH is transmitted in subframes that do not include NRS 613, base station 604 may transmit UE-RS 607 in the same REs as the NRS 613.

In FIG. 13B, at 1316, the base station may receive a first channel estimate associated with the UE-RS from the first UE. In one aspect, the first channel estimate may be received in the TDD frame structure selected for narrowband communications. For example, referring to FIGS. 6A and 6B, base station 604 may receive a first channel estimate 609 associated with the UE-RS (e.g., the channel used to transmit the UE-RS 607) transmitted from the UE 606.

In FIG. 13B, at 1318, the base station may perform a beamforming procedure using the first channel estimate received from the first UE. For example, referring to FIGS. 6A and 6B, base station 604 may perform 611 a beamforming procedure using the first channel estimate 609 received from the UE 606.

In FIG. 13B, at 1320, the base station may transmit a NRS to the first UE using the narrowband TDD frame structure selected for the narrowband communications. For example, referring to FIGS. 6A and 6B, base station 604 may transmit an NRS 613 to UE 606.

In FIG. 13C, at 1322, the base station may receive a second channel estimate associated with the NRS from the first UE. In one aspect, the second channel estimate may be received in the TDD frame structure selected for narrowband communications. For example, referring to FIGS. 6A and 6B, base station 604 may receive a second channel estimate 615 associated with the NRS 613 from UE 606.

In FIG. 13C, at 1324, the base station may determine a precoding for each of a plurality of transmit antennas used to transmit the downlink channel based on the second channel estimate. In one aspect, the precoding is constant across a predetermined number of subframes. In another aspect, the precoding is applied to a narrowband carrier specific to the first UE. In a further aspect, the narrowband carrier is a non-anchor carrier. For example, referring to FIGS. 6A and 6B, base station 604 may use the second channel estimate to determine 617 a precoding for each of a plurality of transmit antennas used to transmit the NPDCCH and/or NPDSCH.

In FIG. 13C, at 1326, the base station may signal to the first UE that multiple transmit antennas at the base station transmit the NRS and that each of the multiple transmit antennas are associated with a same precoding. In one aspect, the signaling may include DCI or RRC information. For example, referring to FIGS. 6A and 6B, base station 604 may signal 619 that each of the multiple transmit antennas are associated with the same precoding. In certain configurations, the signal 619 may indicate that the NRS 613 uses the same precoding for a predetermined number of radio frames (e.g., ten 10 radio frames) before switching to another precoding. In one aspect, the signal 619 may be sent as DCI or RRC messaging. In one configuration, the signal 619 may indicate that the NPDCCH is transmitted using a first number of antennas (e.g., one, two, three, etc.) and the NPDSCH is transmitted from a second number of antennas (e.g., one, two, three, etc.).

In FIG. 13C, at 1328, the base station may transmit the narrowband physical downlink channel transmission to the UE based on the beamforming procedure. For example, referring to FIGS. 6A and 6B, the NPDCCH 621 and/or NPDSCH 621 may be transmitted by base station 604 using a data stream from each of the transmit antennas based on the beamforming and/or precoding. The precoding may be applied to a narrowband carrier (e.g., non-anchor carrier) specific to UE 606.

In FIG. 13C, at 1330, the base station may transmit the narrowband physical downlink channel transmission to the UE based on the beamforming procedure by transmitting a data stream associated with the narrowband physical downlink channel from each of the plurality of transmit antennas based on the precoding. For example, referring to FIGS. 6A and 6B, the NPDCCH 621 and/or NPDSCH 621 may be transmitted by base station 604 using a data stream from each of the transmit antennas based on the beamforming and/or precoding. The precoding may be applied to a narrowband carrier (e.g., non-anchor carrier) specific to UE 606.

Figure 14A:
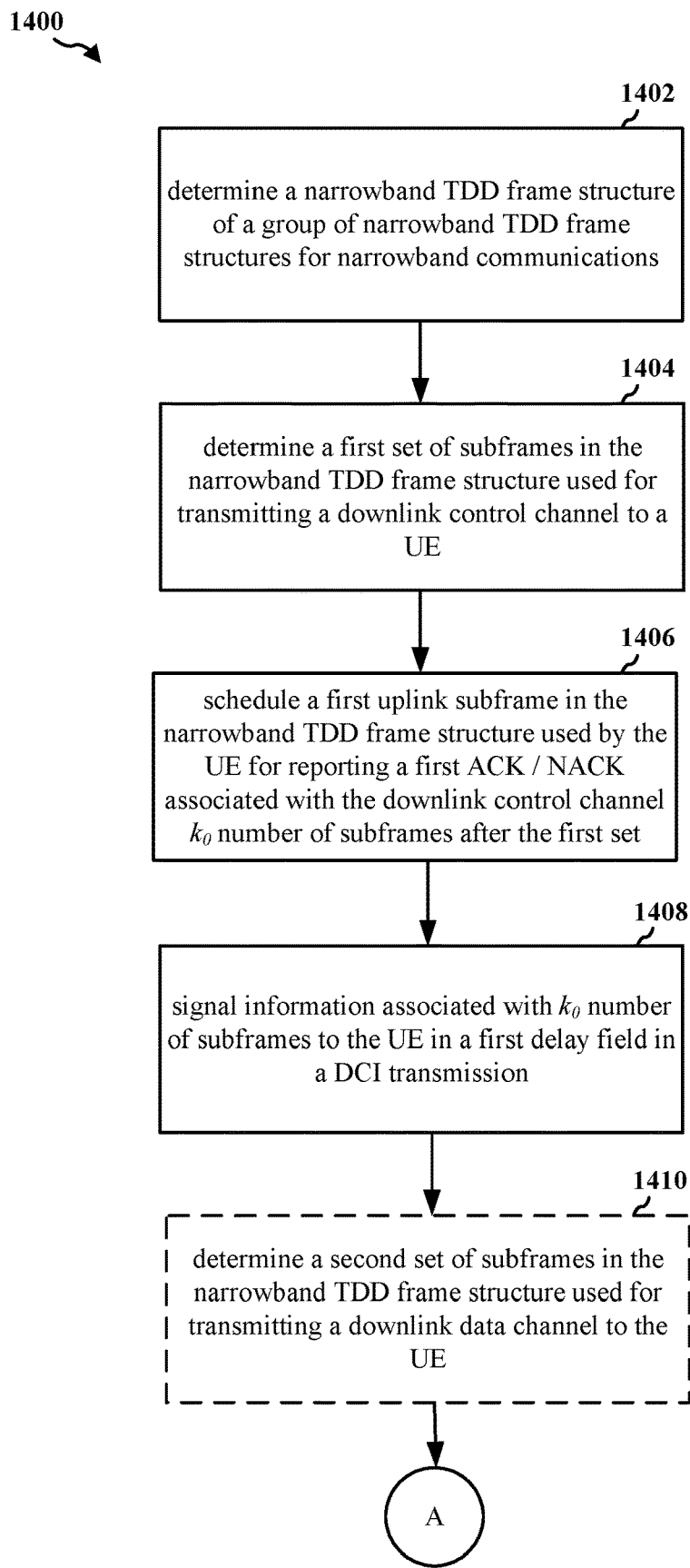
FIGS. 14A and 14B are a flowchart of a method of wireless communication.
Figure 14B:
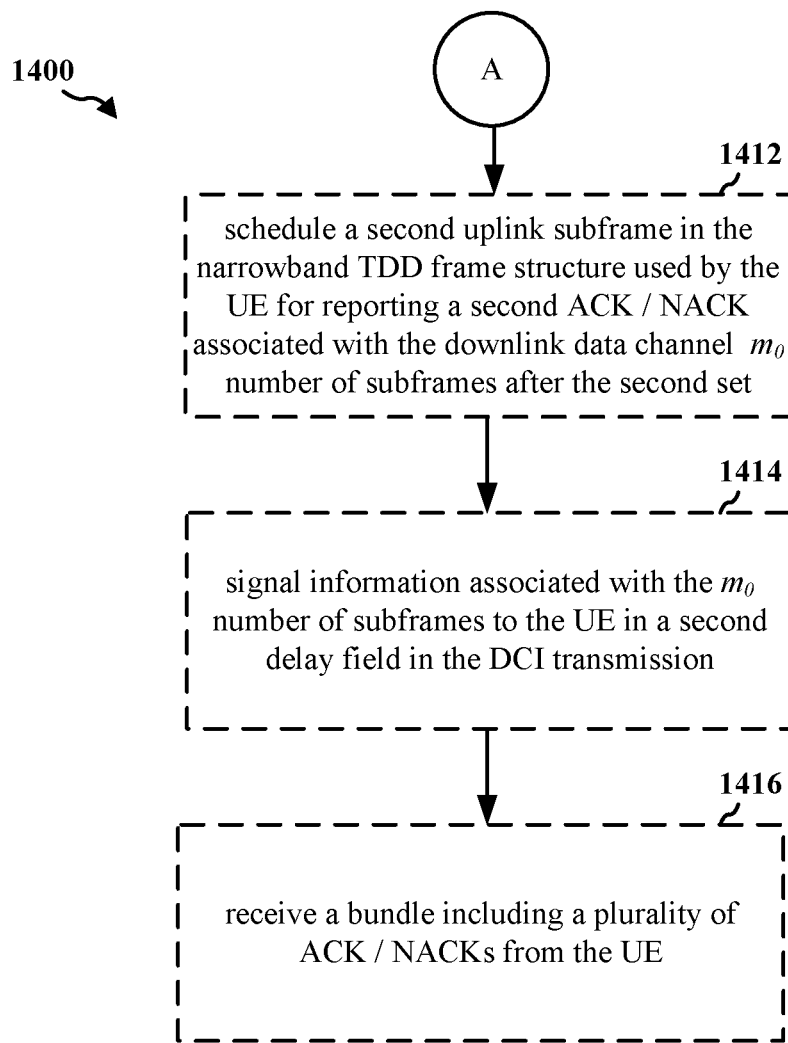

FIGS. 14A and 14B are a flowchart 1400 of a method of wireless communication. The method may be performed by a base station (e.g., the base station 102, 180, 504, 604, 704, 804, 904, 1004, 1104, 2350, eNB 310, the apparatus 1102/1102'). In FIG. 14, operations with dashed lines indicate optional operations.

In FIG. 14A, at 1402, the base station may determine a narrowband TDD frame structure of a group of narrowband TDD frame structures for narrowband communications. For example, referring to FIGS. 7A and 7B, base station 704 may determine 701 to transmit an NPDCCH and/or NPDSCH using a subframe in a narrowband TDD frame structure. For example, the base station 704 may determine 701 the narrowband TDD frame structure is one of configuration 0, 1, 2, 3, 4, 5, 6, 1, or o from table 410 in FIG. 4.

In FIG. 14A, at 1404, the base station may determine a first set of subframes in the narrowband TDD frame structure used for transmitting a downlink control channel to a UE. In one aspect, a last subframe in the first set of subframes may be subframe n. For example, referring to FIGS. 7A and 7B, base station 704 may determine 703 a first set of subframes in the narrowband TDD frame structure used to transmit the NPDCCH to UE 706. For example, a last subframe in the first set of subframes may be subframe n. In one example, assume that configuration 2 (e.g., see table 410 in FIG. 4) is used as the narrowband TDD frame structure. In addition, assume that the first set of subframes used to transmit the NPDCCH includes subframes 0 and 1 (e.g., n is equal to 1).

In FIG. 14A, at 1406, the base station may schedule a first uplink subframe in the narrowband TDD frame structure used by the UE for reporting a first ACK/NACK associated with the downlink control channel. In one aspect, the first uplink subframe may be delayed based on $k_0$ number of subframes after the subframe n. For example, referring to FIGS. 7A and 7B, base station 704 may schedule 705 a first uplink subframe in the narrowband TDD frame structure for the UE 706 to report a first ACK/NACK associated with the NPDCCH. In one configuration, the first uplink subframe may be delayed based on $k_0$ number of subframes after the subframe n. In other words, UE 706 may transmit the first ACK/NACK in subframe $n+k_0$. In one example associated with FIG. 7, assume that configuration 2 (e.g., see table 410 in FIG. 4) is used as the narrowband TDD frame structure. In addition, assume that the first set of subframes used to transmit the NPDCCH includes subframes 0 and 1 (e.g., n is equal to 1), and that $k_0$ is equal to 1. Hence, the first ACK/NACK associated with the NPDCCH may be transmitted by UE 706 in subframe 2 (e.g., 1+1=2) of the narrowband TDD frame structure.

In FIG. 14A, at 1408, the base station may signal information associated with the $k_0$ number of subframes to the UE in a first delay field in a DCI transmission. For example, referring to FIGS. 7A and 7B, information 707 associated with the $k_0$ number of subframes may be signaled to UE 706 in a first delay field in a DCI transmission.

In FIG. 14A, at 1410, the base station may determine a second set of subframes in the narrowband TDD frame structure used for transmitting a downlink data channel to the UE. In one aspect, a first subframe in the second set of subframes may be subframe $n+k_0+x$. In another aspect, a last subframe in the second set of subframes may be subframe $n+k_0+x+y$. In a further aspect, both x and y may be positive integers. For example, referring to FIGS. 7A and 7B, base station 704 may determine 709 a second set of subframes in the narrowband TDD frame structure used to transmit the NPDSCH to UE 706. In one aspect, a first subframe in the second set of subframes may be located x number of subframes after the subframe allocated for the first ACK/NACK transmission. For example, the first subframe in the second set of subframes is subframe $n+k_0+x$. A last subframe in the second set of subframes may be y subframes after the first subframe in the second set. For example, the last subframe in the second set of subframes may be subframe $n+k_0+x+y$. Both x and y may be positive integers. Referring again to the example discussed above with respect to FIG. 7, further assume that the second set of subframes are subframes 3, 4, and 5 in configuration 2. In the example, x is equal to 1 and y is equal to 2.

In FIG. 14B, at 1412, the base station may schedule a second uplink subframe in the narrowband TDD frame structure used by the UE for reporting a second ACK/NACK associated with the downlink data channel. In one aspect, the second uplink subframe may be delayed $m_0$ number of subframes after the subframe $n+k_0+x+y$. In another aspect, the $m_0$ number of subframes may include at least one of a number of downlink subframes or a number of uplink subframes. For example, referring to FIGS. 7A and 7B, base station 704 may schedule 711 a second uplink subframe in the narrowband TDD frame structure for the UE 706 to report a second ACK/NACK associated with the NPDSCH. In one aspect, the second uplink subframe may be delayed $m_0$ number of subframes after the last subframe used to transmit the NPDSCH (e.g., subframe $n+k_0+x+y$), and the $m_0$ number of subframes may include at least one of a number of downlink subframes and/or a number of uplink subframes. Referring again to the example discussed above with respect to FIG. 7, further assume that the second set of subframes are subframes 3, 4, and 5 in configuration 2. In the example, x is equal to 1 and y is equal to 2. In a first scenario, assume $m_0$ is equal to 3 when only downlink subframes are included in the delayed number of subframes. In a second scenario, assume $m_0$ is equal to 4 when downlink subframes and uplink subframes are included in the delayed number of subframes. In either scenario, the second ACK/NACK associated with the NPDSCH may be transmitted by UE 706 in subframe 2 in the next radio frame after the radio frame in which the NPDSCH is received by UE 706. Additionally and/or alternatively, $m_0$ may only include valid uplink subframes and/or downlink subframes (e.g., subframes available for transmission and not switching).

In FIG. 14B, at 1414, the base station may signal information associated with the $m_0$ number of subframes to the UE in a second delay field in the DCI transmission. For example, referring to FIGS. 7A and 7B, information 713 associated with the $m_0$ number of subframes may be signaled to UE 706 in a second delay field in the DCI transmission. In one configuration, the information 707, 713 may be signaled in the same DCI transmission. In another configuration, the information 707, 713 may be signaled in different DCI transmissions.

In FIG. 14B, at 1416, the base station may receive a bundle including a plurality of ACK/NACKs from the UE. In one aspect, each ACK/NACK in the bundle may be associated with a different HARQ process. For example, referring to FIGS. 7A and 7B, base station 704 may receive a bundle 715 including a plurality of ACK/NACKs from UE 706. In one aspect, each ACK/NACK in the bundle may be associated with a different HARQ process associated with one or more NPDCCH transmissions and/or NPDSCH transmissions.

Figure 15:
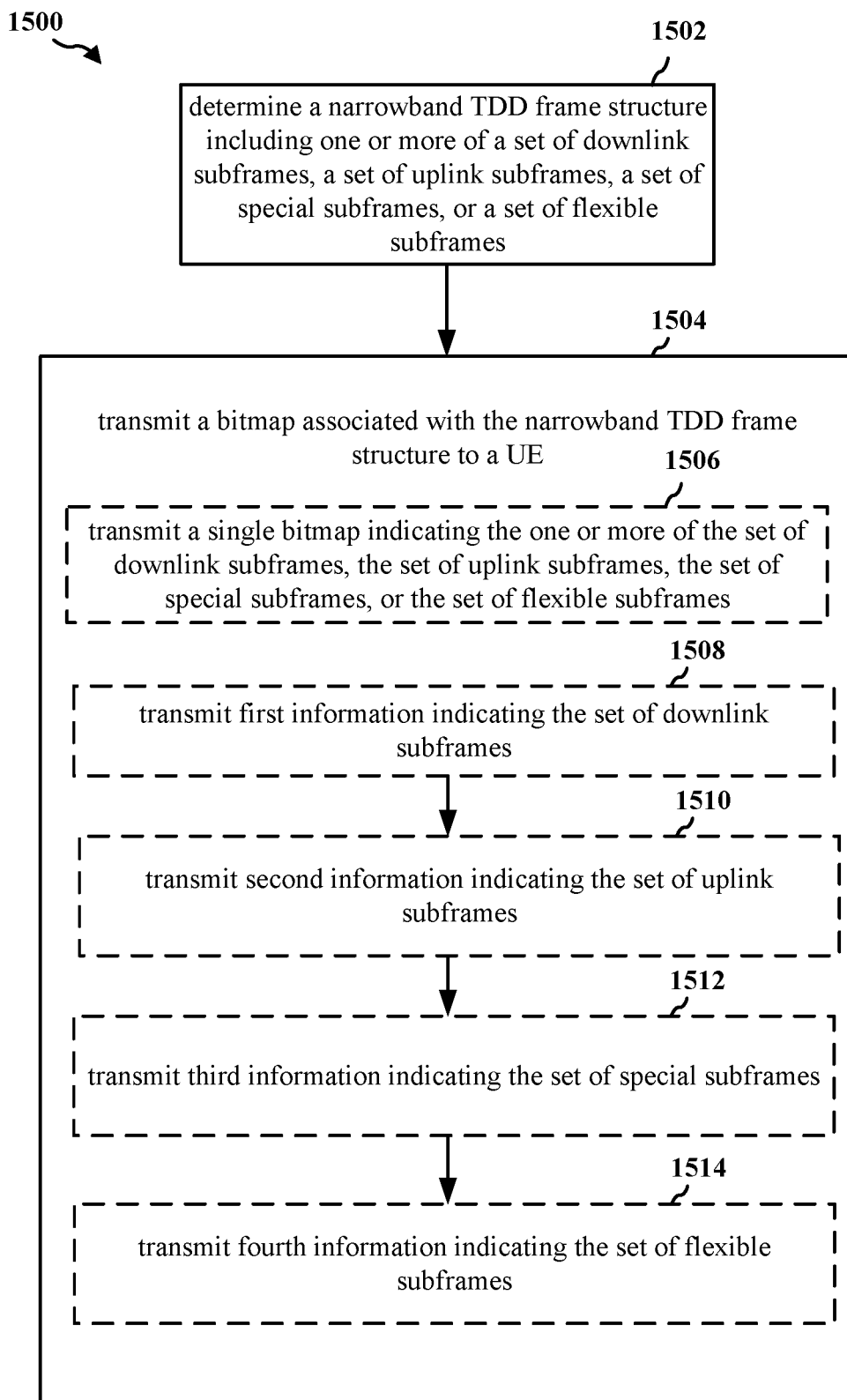
FIG. 15 is a flowchart of a method of wireless communication.

FIG. 15 is a flowchart 1500 of a method of wireless communication. The method may be performed by a base station (e.g., the base station 102, 180, 504, 604, 704, 804, 904, 1004, 1104, 2350, eNB 310, the apparatus 1102/1102'). In FIG. 15, operations with dashed lines indicate optional operations.

At 1502, the base station may determine a narrowband time TDD frame structure for narrowband communications. In one aspect, the narrowband TDD frame structure may include one or more of a set of downlink subframes, a set of uplink subframes, a set of special subframes, or a set of flexible subframes. In one aspect, a flexible subframe may be configurable by the base station as either a downlink subframe or an uplink subframe. For example, referring to FIG. 9, base station 904 may determine 901 a narrowband TDD frame structure for narrowband communications that includes one or more of a set of downlink subframes, a set of uplink subframes, a set of special subframes, and/or a set of flexible subframes. For example, base station 904 may determine 901 that the narrowband TDD frame structure is one of configuration 0, 1, 2, 3, 4, 5, 6, 1, or o from table 410 in FIG. 4.

At 1504, the base station may transmit a bitmap associated with the narrowband TDD frame structure to a UE. In one aspect, the bitmap may indicate the one or more of the set of downlink subframes, the set of uplink subframes, the set of special subframes, or the set of flexible subframes. In another aspect, a first length of the bitmap associated with the narrowband TDD frame structure may be longer than a second length of a different bitmap associated with a narrowband FDD frame structure. For example, referring to FIG. 9, base station 904 may transmit a bitmap 903 associated with the narrowband TDD frame structure to UE 906. Bitmap 903 may indicate the set of downlink subframes, the set of uplink subframes, the set of special subframes, and/or the set of flexible subframes in the determined narrowband TDD frame structure.

At 1506, the base station may transmit a bitmap associated with the narrowband TDD frame structure to a UE by transmitting a single bitmap indicating the one or more of the set of downlink subframes, the set of uplink subframes, the set of special subframes, or the set of flexible subframes. For example, referring to FIG. 9, when base station 904 is operating in in-band mode, a single bitmap 903 indicating the set of downlink subframes, the set of uplink subframes, the set of special subframes, and/or the set of flexible subframes may be transmitted to UE 906.

At 1508, the base station may transmit a bitmap associated with the narrowband TDD frame structure to a UE by transmitting first information indicating the set of downlink subframes. For example, referring to FIG. 9, when base station 904 is operating in standalone mode, a first bitmap 903 that indicates the set of downlink subframes may be separately transmitted to UE 806.

At 1510, the base station may transmit a bitmap associated with the narrowband TDD frame structure to a UE by transmitting second information indicating the set of uplink subframes. For example, referring to FIG. 9, when base station 904 is operating in standalone mode, a second bitmap 903 that indicates the set of uplink subframes may be separately transmitted to UE 806.

At 1512, the base station may transmit a bitmap associated with the narrowband TDD frame structure to a UE by transmitting third information indicating the set of special subframes. For example, referring to FIG. 9, when base station 904 is operating in standalone mode, a third bitmap 903 that indicates the set of special subframes may be separately transmitted to UE 806.

At 1514, the base station may transmit a bitmap associated with the narrowband TDD frame structure to a UE by transmitting fourth information indicating the set of flexible subframes. For example, referring to FIG. 9, when base station 904 is operating in standalone mode, a fourth bitmap 903 that indicates the set of flexible subframes may be separately transmitted to UE 806.

Figure 16:
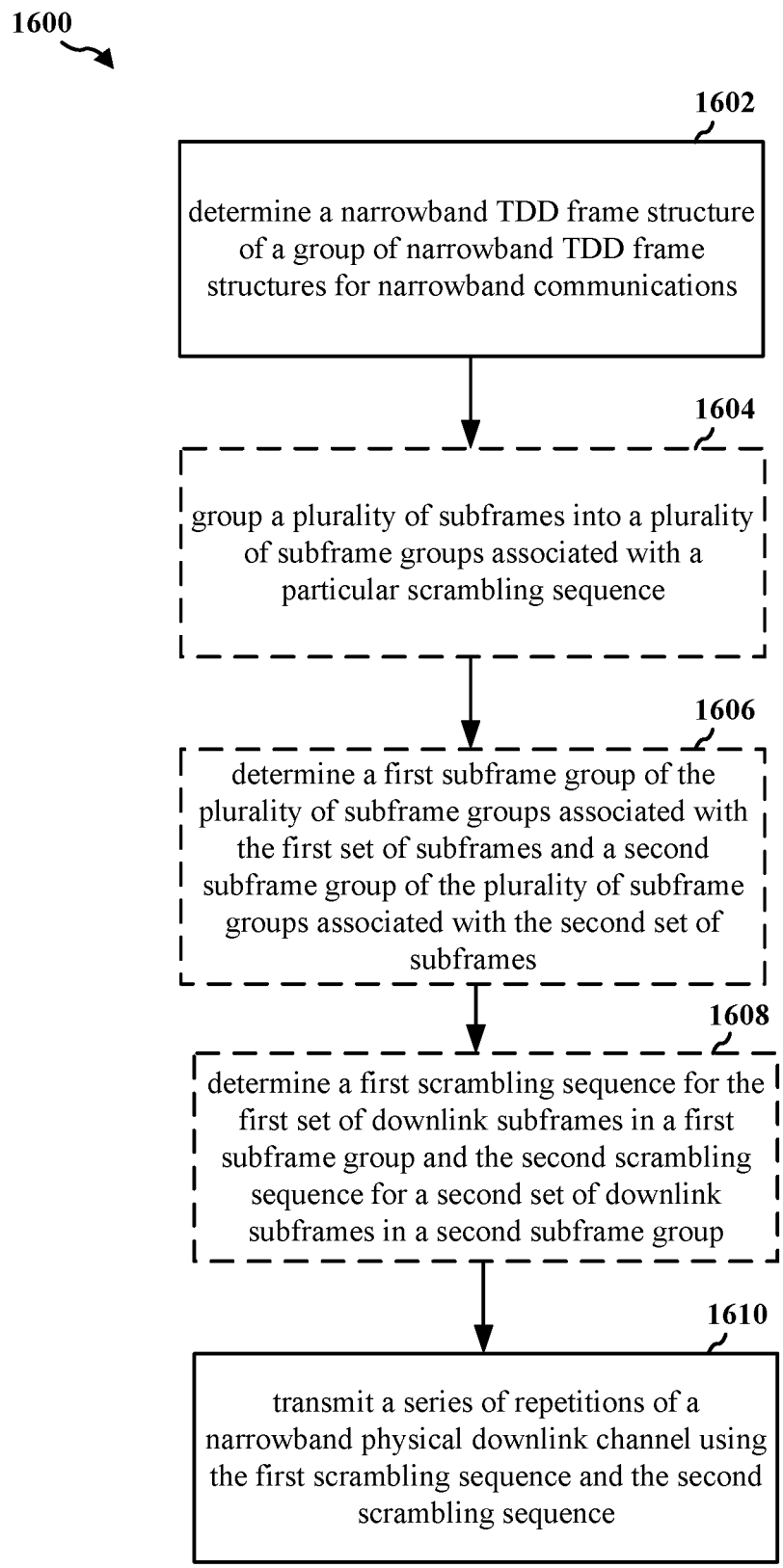
FIG. 16 is a flowchart of a method of wireless communication.

FIG. 16 is a flowchart 1600 of a method of wireless communication. The method may be performed by a base station (e.g., the base station 102, 180, 504, 604, 704, 804, 904, 1004, 1104, 2350, eNB 310, the apparatus 1102/1102'). In FIG. 16, operations with dashed lines indicate optional operations.

At 1602, the base station may determine a narrowband TDD frame structure of a group of narrowband TDD frame structures for narrowband communications. For example, referring to FIG. 10, base station 1004 may determine 1001 a narrowband TDD frame structure that includes one or more of a set of downlink subframes, a set of uplink subframes, a set of special subframes, or a set of flexible subframes. For example, base station 1004 may determine

1001 that the narrowband TDD frame structure is one of configuration 0, 1, 2, 3, 4, 5, 6, 1, or o from table 410 in FIG. 4.

At 1604, the base station may group a plurality of subframes into a plurality of subframe groups. In one aspect, each of the plurality of subframe groups may be associated with a particular scrambling sequence. In another aspect, each subframe group may be determined based on a downlink subframe and a predetermined number of following subframes. In a further aspect, none of the subframe groups may have overlapping subframes. For example, referring to FIG. 10, base station 1004 may group 1003 a plurality of subframes into a plurality of subframe groups. In one aspect, each of the plurality of subframe groups may be associated with a particular scrambling sequence, and each subframe group may be determined based on a downlink subframe and a predetermined number of following subframes. In a first example of FIG. 10, a scrambling sequence generator for the NPDCCH and/or NPDSCH at base station 1004 may be reinitialized after every min(RepetitionSize, M) absolute subframes. Absolute subframes may be a predetermined number of subframes that include all subframes within a range (e.g. four subframes) regardless of whether the subframes are used to transmit the NPDCCH and/or NPDSCH. In a second example of FIG. 10, base station 1004 may use predefined boundaries of subframes and all NPDCCH and/or NPDSCH transmissions that fall within a boundary may have the same scrambling based on the lowest subframe index in that boundary. In one aspect, the boundaries may be defined as mod(sub-frame-index−i_Delta, i_M)=0.

At 1606, the base station may determine a first subframe group of the plurality of subframe groups associated with the first set of subframes and a second subframe group of the plurality of subframe groups associated with the second set of subframes. For example, referring to FIG. 10, base station 1004 may determine 1005 a first subframe group of the plurality of subframe groups associated with the first set of subframes and a second subframe group of the plurality of subframe groups associated with the second set of subframes. In both the first example and the second example of FIG. 10, assume M is equal to four, and that the NPDSCH is repeated on subframes {5, 6, 8, 10, 13, 14, 15, 17} across two radio frames with subframes 0-19. In the first example discussed above with respect to FIG. 10, the range of subframes (e.g., four subframes) starting with subframe 5 includes subframes 5, 6, 7, 8. The range of subframes (e.g., four subframes) starting with subframe 10 (e.g., the first subframe after the last subframe in the first group) includes subframes 10, 11, 12, 13. Further, the range of subframes (e.g., four subframes) starting with subframe 14 (e.g., the first subframe after the last subframe in the second group) includes subframes 14, 15, 16, 17. Thus, base station 1004 may group subframes {5, 6, 8} into a first group, subframes {10, 13} into a second group, and subframes {14, 15, 17} into a third group. In the second example discussed above with respect to FIG. 10, the boundaries of the subframes would be {[0-3] [4-7] [8-11] [12-15] [16-19]}. Thus, base station 1004 may group subframes {0, 1, 2, 3} into a first group, subframes {4, 5, 6, 7} into a second group, subframes {8, 9, 10, 11} into a third group, subframes {12, 13, 14, 15} into a fourth group, and subframes {16, 17, 18, 19} into a fifth group.

At 1608, the base station may determine a first scrambling sequence for the first set of downlink subframes in a first subframe group and the second scrambling sequence for a second set of downlink subframes in a second subframe group. In one aspect, the first set of downlink subframes may include a different number of subframes than the second set of downlink subframes. For example, referring to FIG. 10, base station 1004 may determine 1007 a first scrambling sequence for the first set of downlink subframes in a first subframe group and the second scrambling sequence for a second set of downlink subframes in a second subframe group. Referring to the first example discussed above with respect to FIG. 10, the scrambling sequence used by base station 1004 for the NPDSCH transmitted in subframes {5, 6, 8} may be based on the scrambling sequence of subframe 5. In addition, scrambling sequence used by base station 1004 for the NPDSCH transmitted in subframes {10, 13} may be based on the scrambling sequence of subframe 10. Further, the scrambling sequence used by base station 1004 for the NPDSCH transmitted in subframes {14, 15, 17} may be based on subframe 14. Referring to the second example discussed with respect to FIG. 10, the scrambling sequence used by base station 1004 for the NPDSCH transmitted in subframes {5, 6} may be based on subframe 4, the scrambling sequence used by base station 1004 for the NPDSCH transmitted in subframes {8, 10} may be based on subframe 8, the scrambling sequence used by base station 1004 for the NPDSCH transmitted in subframes {13, 14, 15} may be based on subframe 12, and the scrambling sequence used by base station 1004 for the NPDSCH transmitted in subframe {17} may be based on subframe 16.

At 1610, the base station may transmit a series of repetitions of a narrowband physical downlink channel using the narrowband TDD frame structure. In one aspect, a first portion of repetitions from the series of repetitions may be transmitted in a first set of downlink subframes using the first scrambling sequence. In another aspect, a second portion of repetitions from the series of repetitions may be transmitted in a second set of downlink subframes using a second scrambling sequence. In a further aspect, the first set of subframes may include a same number of subframes as the second set of subframes. For example, referring to FIG. 10, base station 1004 may transmit 1009 a series of repetitions of the NPDCCH and/or NPDSCH based on either the first example or the second example described above with respect to FIG. 10.

Figure 17:
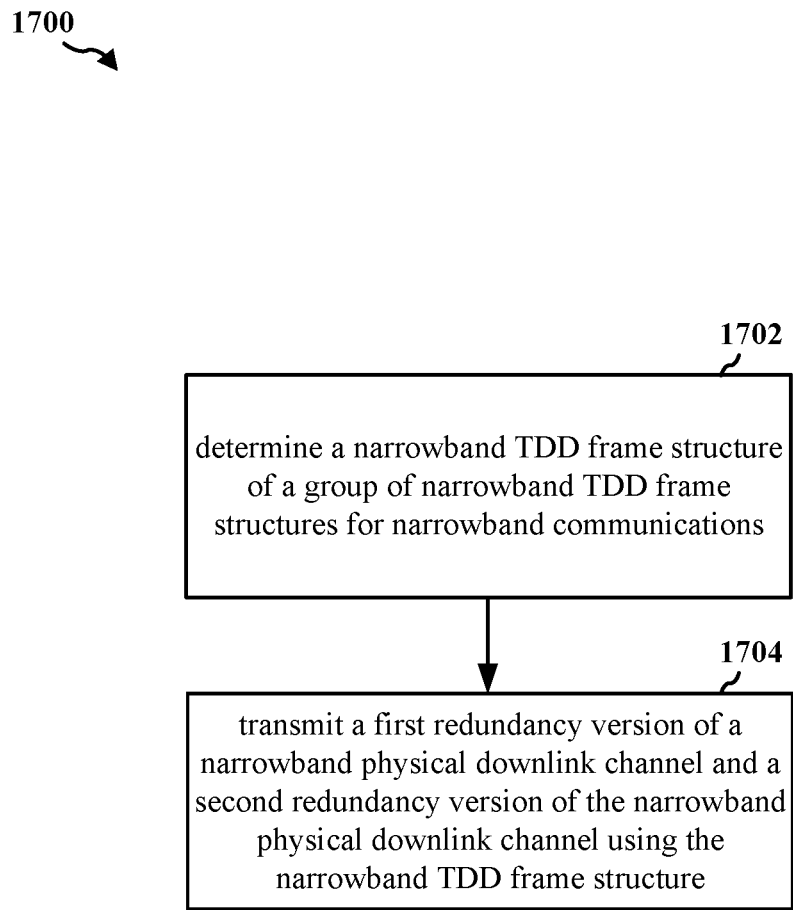
FIG. 17 is a flowchart of a method of wireless communication.

FIG. 17 is a flowchart 1700 of a method of wireless communication. The method may be performed by a base station (e.g., the base station 102, 180, 504, 604, 704, 804, 904, 1004, 1104, 2350, eNB 310, the apparatus 1102/1102'). In FIG. 17, operations with dashed lines indicate optional operations.

At 1702, the base station may determine a narrowband TDD frame structure of a group of narrowband TDD frame structures for narrowband communications. For example, referring to FIG. 11, base station 1104 may determine 1101 a narrowband TDD frame structure that includes one or more of a set of downlink subframes, a set of uplink subframes, a set of special subframes, or a set of flexible subframes. For example, base station 1104 may determine 1101 that the narrowband TDD frame structure is one of configuration 0, 1, 2, 3, 4, 5, 6, 1, or o from table 410 in FIG. 4.

At 1704, the base station may transmit a first redundancy version of a narrowband physical downlink channel and a second redundancy version of the narrowband physical downlink channel using the narrowband TDD frame structure. In one aspect, a number of repetitions of either redundancy version transmitted before switching between the first redundancy version and a second redundancy version may be based on a number of contiguous downlink subframes in the determined narrowband TDD frame structure and a predetermined maximum number of repetitions. For example, referring to FIG. 11, base station 1104 may transmit a first redundancy version (RV0) of the NPDCCH 1103 and/or NPDSCH 1103 and a second redundancy version (RV1) 1105 of the NPDCCH 1105 and/or NPDSCH 1105 using the narrowband TDD frame structure. In one aspect, a number of repetitions of RV0 may be transmitted in a repetition cycle before switching to RV1, and vice versa. The number of repetitions in a repetition cycle may be based on a number of contiguous downlink subframes in the determined narrowband TDD frame structure and a predetermined maximum number of repetitions. As an illustrative example, assume configuration 1 is used for the narrowband TDD frame structure, that sixteen repetitions of the NPDCCH 1103 and/or NPDSCH 1103 are configured, that two versions of repetition are configured, and that the maximum number of repetitions in a repetition cycle is two. Thus, the sequence transmitted by base station 1104 would be {RV0RV0 RV1RV1 RV0RV0 RV1RV1 RV0RV0 RV1RV1 RV0RV0 RV1RV1 RV0RV0 RV1RV1 RV0RV0 RV1RV1 RV0RV0 RV1RV1 RV0RV0 RV1RV1)}.

Figure 18:
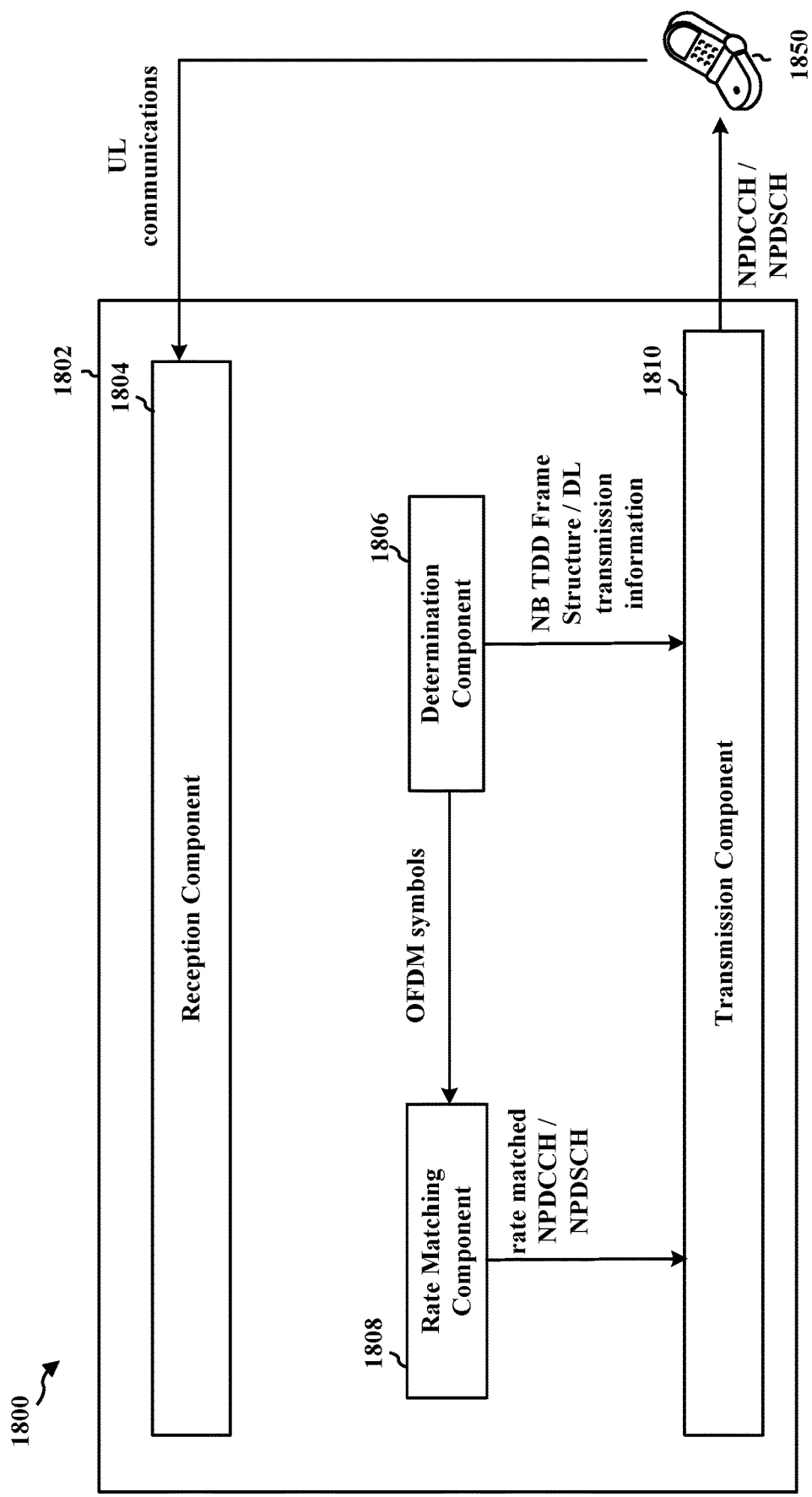
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a base station (e.g., the base station 102, 180, 504, 604, 704, 804, 904, 1004, 1104, 2350, eNB 310, the apparatus 1802') in narrowband communication (e.g., NB-IoT communication or eMTC) with UE 1850 (e.g., UE 104, 350, 506, 606, 706, 806, 906, 1006, 1106, apparatus 2302/2302'). The apparatus may include a reception component 1804, a physical downlink channel component 1812, a subframe component 1814, a determination component 1806, a rate matching component 1808, and a transmission component 1810.

The reception component 1804 may be configured to receive uplink communication(s) from the UE 1850.

The physical downlink channel component 1812 may be configured to determine to transmit a physical downlink channel in a subframe in a narrowband TDD frame structure of a plurality of narrowband TDD frame structures for narrowband communications. In one aspect, the physical downlink channel may include at least one of a NPDSCH or a NPDCCH. The subframe component 1814 may be configured to determine whether the subframe is a special subframe or a downlink subframe when the narrowband TDD frame structure includes one or more special subframes. In certain other configurations, the determination component 1806 may be configured to determine how to transmit a narrowband physical downlink channel based on the determination whether the subframe is a special subframe or a downlink subframe. In certain other configurations, the determination component 1806 may be configured to determine how to transmit a narrowband physical downlink channel based on the determination whether the subframe is a special subframe or a downlink subframe by determining to transmit the narrowband physical downlink channel in the subframe when the subframe is a downlink subframe. In certain other configurations, the determination component 1806 may be configured to determine how to transmit a narrowband physical downlink channel based on the determination whether the subframe is a special subframe or a downlink subframe by determining to refrain from transmitting the narrowband physical downlink channel in the subframe when the subframe is a special subframe. In certain other configurations, the determination component 1806 may be configured to determine how to transmit a narrowband physical downlink channel based on the determination whether the subframe is a special subframe or a downlink subframe by determining to transmit the narrowband physical downlink channel in the subframe with a subset of OFDM symbols in the special subframe punctured when the subframe is a special subframe. In certain other configurations, the determination component 1806 may be configured to determine how to transmit a narrowband physical downlink channel based on the determination whether the subframe is a special subframe or a downlink subframe by determining to transmit the narrowband physical downlink channel in the subframe with at least OFDM symbols in the downlink portion of the special subframe punctured when the subframe is a special subframe. In certain other configurations, the determination component 1806 may be configured to determine how to transmit a narrowband physical downlink channel based on the determination whether the subframe is a special subframe or a downlink subframe by determining to transmit the narrowband physical downlink channel in the subframe when the subframe is a special subframe by rate matching the narrowband physical downlink channel based in the subframe based on the number of downlink of OFDM symbols in the subframe. In certain other configurations, the determination component 1806 may be configured to determine how to transmit a narrowband physical downlink channel based on the determination whether the subframe is a special subframe or a downlink subframe by determining to transmit the narrowband physical downlink channel in the subframe when the subframe is a special subframe and a number of OFDM symbols in the special subframe is greater than a predetermined threshold. In certain other configurations, the determination component 1806 may be configured to determine how to transmit a narrowband physical downlink channel based on the determination whether the subframe is a special subframe or a downlink subframe by determining to transmit the narrowband physical downlink channel in the subframe with a subset of OFDM symbols punctured in the special subframe when the subframe is a special subframe and a number of OFDM symbols in the special subframe is less than a predetermined threshold. In certain other configurations, the determination component 1806 may be configured to determine how to transmit a narrowband physical downlink channel based on the determination whether the subframe is a special subframe or a downlink subframe by determining to refrain from transmitting the narrowband physical downlink channel in the subframe when the subframe is a special subframe and a number of OFDM symbols in the special subframe is less than a predetermined threshold. In certain other configurations, the determination component 1806 may be configured to determine how to transmit a narrowband physical downlink channel based on the determination whether the subframe is a special subframe or a downlink subframe by determining to drop the transmission of the narrowband physical downlink channel in the subframe when the subframe is a special subframe and a number of OFDM symbols in the special subframe is less than a predetermined threshold.

In certain aspects, the determination component 1806 may send a signal indicating the subframe in the NB TDD frame structure used for the transmission of a NPDSCH and/or NPDCCH to the transmission component 1810. In certain other aspects, the determination component 1806 may be configured to send a signal associated with OFDM symbols to the rate matching component 1808.

The rate matching component 1808 may be configured to rate match the narrowband physical downlink channel in the subframe based on the number of downlink of OFDM symbols in the subframe. The rate matching component 1808 may be configured to send a signal associated with the rate matched NPDCCH and/or NPDSCH to the transmission component 1810.

In certain configurations, the transmission component 1810 may be configured to transmit the narrowband physical downlink channel (e.g., NPDCCH and/or NPDSCH) to the UE 1850. In certain other configurations, the transmission component 1810 may be configured to transmit the narrowband physical downlink channel in a subsequent downlink subframe to the UE 1850. In certain other configurations, the transmission component 1810 may be configured to transmit the narrowband physical downlink channel in a next downlink subframe upon determining to refrain from transmitting the narrowband physical downlink channel in the subframe to the UE 1850.

The apparatus may include additional components that perform each of the blocks of the algorithm in the aforementioned flowcharts of FIGS. 12A-12C. As such, each block in the aforementioned flowcharts of FIGS. 12A-12C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
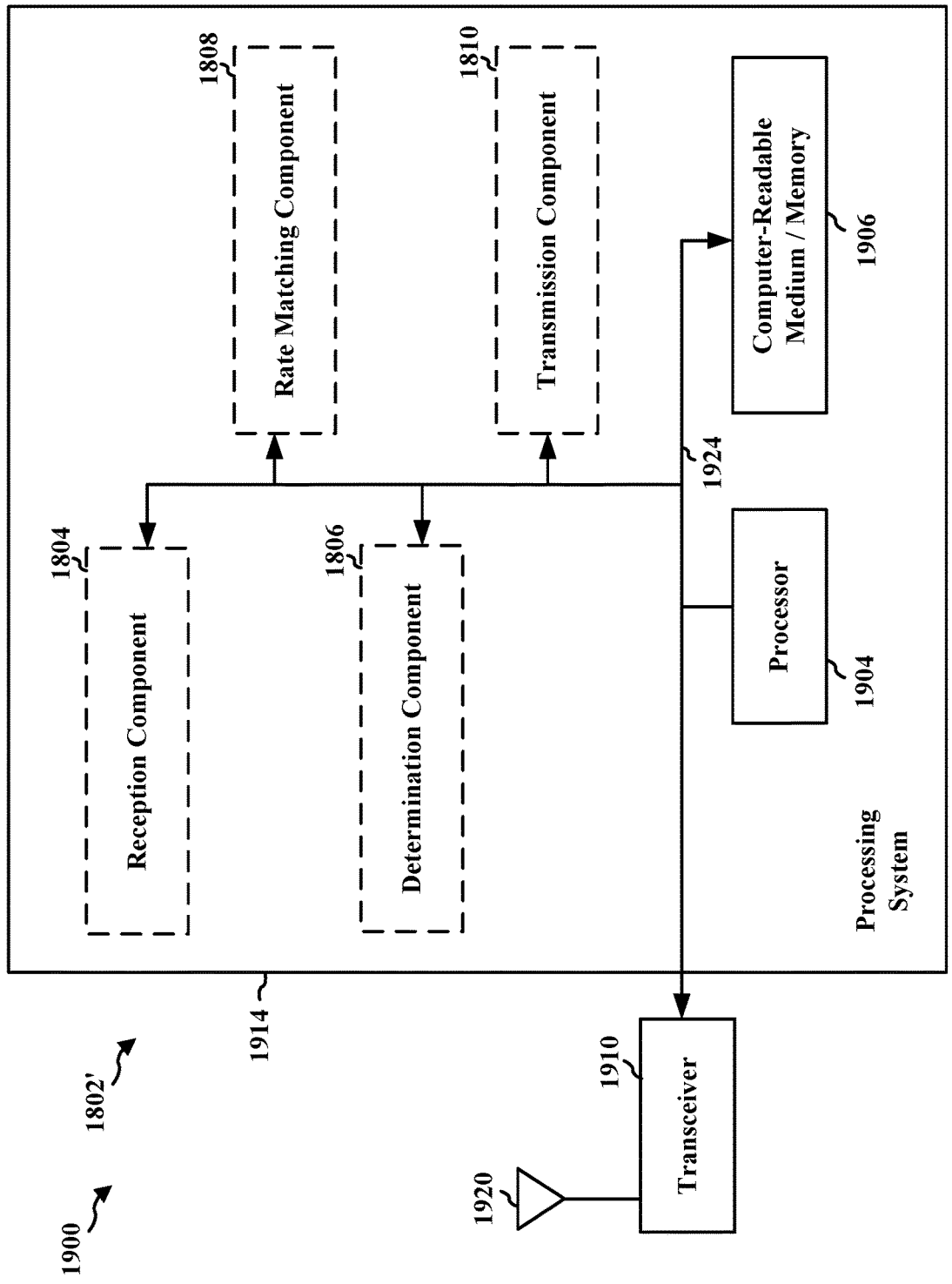
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810 1812, 1814, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1810, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described above for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814. The components may be software components running in the processor 1904, resident/stored in the computer readable medium/memory 1906, one or more hardware components coupled to the processor 1904, or some combination thereof. The processing system 1914 may be a component of the eNB 310 and may include the memory 376 and/or at least one of the TX processor 316, the RX processor 370, and the controller/processor 375.

In certain configurations, the apparatus 1802/1802' for wireless communication may include means for determining to transmit a physical downlink channel in a subframe in a narrowband TDD frame structure of a plurality of narrowband TDD frame structures for narrowband communications. In one aspect, the physical downlink channel may include at least one of a NPDSCH or a NPDCCH. In certain other configurations, the apparatus 1802/1802' for wireless communication may include means for determining whether the subframe is a special subframe or a downlink subframe when the narrowband TDD frame structure includes one or more special subframes. In certain other configurations, the apparatus 1802/1802' for wireless communication may include means for determining how to transmit a narrowband physical downlink channel based on the determination whether the subframe is a special subframe or a downlink subframe. In certain aspects, the means for determining how to transmit a narrowband physical downlink channel based on the determination whether the subframe is a special subframe or a downlink subframe may be configured to determine to transmit the narrowband physical downlink channel in the subframe when the subframe is a downlink subframe. In certain other aspects, the means for determining how to transmit a narrowband physical downlink channel based on the determination whether the subframe is a special subframe or a downlink subframe may be configured to determine to refrain from transmitting the narrowband physical downlink channel in the subframe when the subframe is a special subframe. In certain other aspects, the means for determining how to transmit a narrowband physical downlink channel based on the determination whether the subframe is a special subframe or a downlink subframe may be configured to determine to transmit the narrowband physical downlink channel in the subframe with a subset of OFDM symbols in the special subframe punctured when the subframe is a special subframe. In an aspect, the narrowband physical downlink channel may be transmitted. In certain other aspects, the means for determining how to transmit a narrowband physical downlink channel based on the determination whether the subframe is a special subframe or a downlink subframe may be configured to determine to transmit the narrowband physical downlink channel in the subframe with at least OFDM symbols in the downlink portion of the special subframe punctured when the subframe is a special subframe. In certain other aspects, the means for determining how to transmit a narrowband physical downlink channel based on the determination whether the subframe is a special subframe or a downlink subframe may be configured to determine to transmit the narrowband physical downlink channel in the subframe when the subframe is a special subframe and a number of OFDM symbols in the special subframe is greater than a predetermined threshold. In certain other aspects, the means for determining how to transmit a narrowband physical downlink channel based on the determination whether the subframe is a special subframe or a downlink subframe may be configured to determine to transmit the narrowband physical downlink channel in the subframe with a subset of OFDM symbols punctured in the special subframe when the subframe is a special subframe and a number of OFDM symbols in the special subframe is less than a predetermined threshold. In certain other aspects, the means for determining how to transmit a narrowband physical downlink channel based on the determination whether the subframe is a special subframe or a downlink subframe may be configured to determine to refrain from transmitting the narrowband physical downlink channel in the subframe when the subframe is a special subframe and a number of OFDM symbols in the special subframe is less than a predetermined threshold. In certain other aspects, the means for determining how to transmit a narrowband physical downlink channel based on the determination whether the subframe is a special subframe or a downlink subframe by determining to drop the transmission of the narrowband physical downlink channel in the subframe when the subframe is a special subframe and a number of OFDM symbols in the special subframe is less than a predetermined threshold. In certain other configurations, the apparatus 1802/1802' for wireless communication may include means for rate matching the narrowband physical downlink channel based in the subframe based on the number of downlink of OFDM symbols in the subframe. In certain other configurations, the apparatus 1802/1802' for wireless communication may include means for transmitting the narrowband physical downlink channel. In certain other configurations, the apparatus 1802/1802' for wireless communication may include means for transmitting the narrowband physical downlink channel in a subsequent downlink subframe. In certain other configurations, the apparatus 1802/1802' for wireless communication may include means for transmitting the narrowband physical downlink channel in a next downlink subframe upon determining to refrain from transmitting the narrowband physical downlink channel in the subframe. The aforementioned means may be one or more of the aforementioned components of the apparatus 1802 and/or the processing system 1914 of the apparatus 1802' configured to perform the functions recited by the aforementioned means. As described above, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 20:
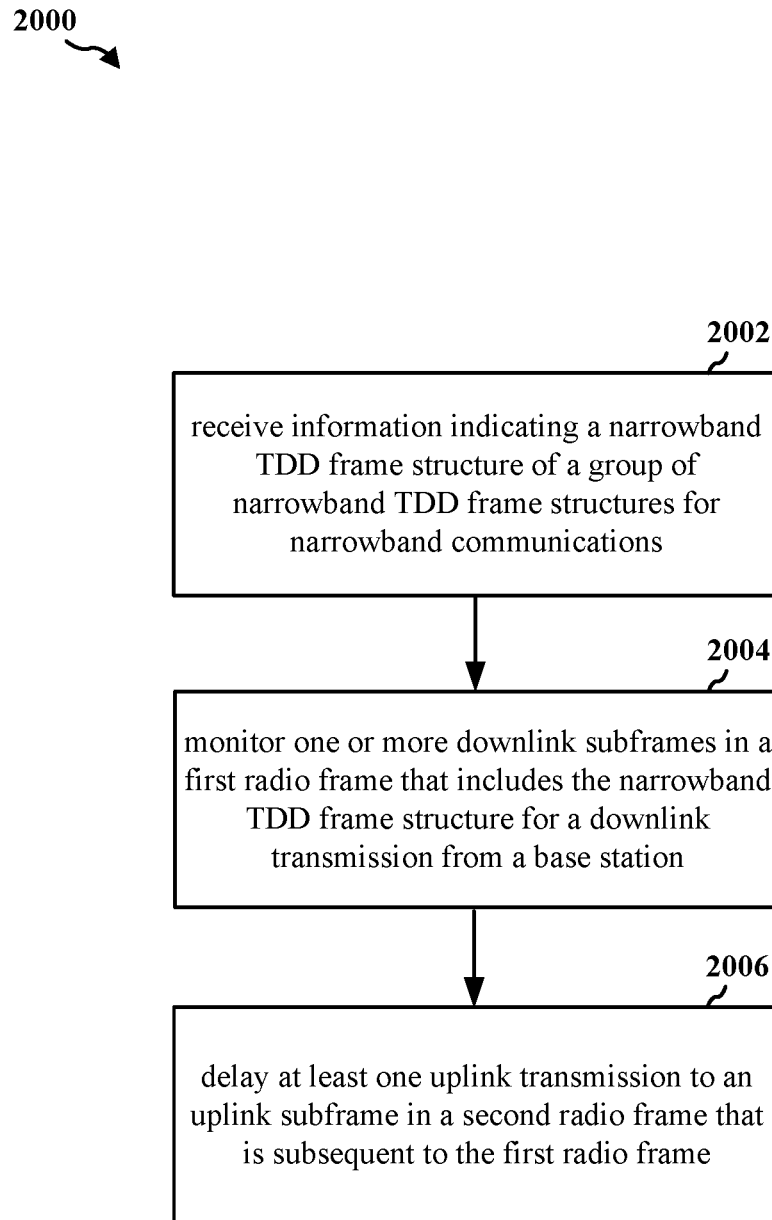
FIG. 20 is a flowchart of a method of wireless communication.

FIG. 20 is a flowchart 2000 of a method of wireless communication. The method may be performed by a UE (e.g., the UE 104, 350, 506, 606, 706, 806, 906, 1006, 1106, 1850, the apparatus 2302/2302'). In FIG. 20, operations with dashed lines indicate optional operations.

At 2002, the UE may receive information indicating a narrowband TDD frame structure of a group of narrowband TDD frame structures for narrowband communications. For example, referring to FIG. 8A, UE 806 may receive information 801 indicating a narrowband TDD frame structure from base station 804. For example, the information 801 may indicate that the narrowband TDD frame structure is one of configuration 0, 1, 2, 3, 4, 5, 6, 1, or o from table 410 in FIG. 4.

At 2004, the UE may monitor one or more downlink subframes in a first radio frame that includes the narrowband TDD frame structure for a downlink transmission from a base station. For example, referring to FIG. 8A, UE 806 may monitor 803 one or more downlink subframes for a downlink transmission (e.g., NPDCCH and/or NPDSCH) in a first radio frame that uses the narrowband TDD frame structure.

At 2006, the UE may delay at least one uplink transmission to an uplink subframe in a second radio frame that is subsequent to the first radio frame. For example, referring to FIG. 8A, UE 806 may delay an NPUSCH transmission 805 to an uplink subframe located in a second radio frame that is subsequent to the first radio frame. In other words, interlacing is not enabled, and UE 806 may only monitor downlink subframes or transmit using uplink subframes in a single radio frame, but not both.

Figure 21:
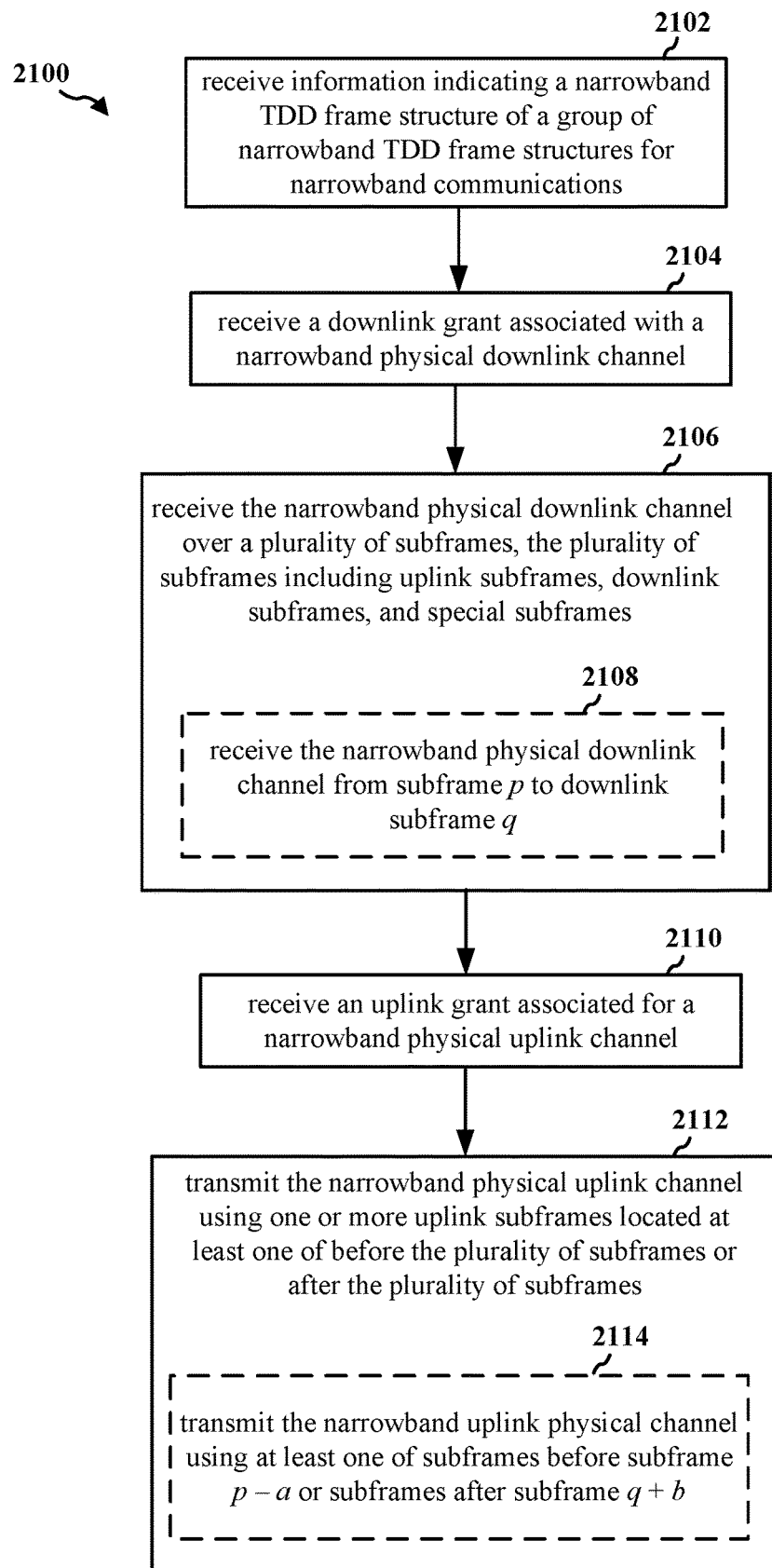
FIG. 21 is a flowchart of a method of wireless communication.

FIG. 21 is a flowchart 2100 of a method of wireless communication. The method may be performed by a UE (e.g., the UE 104, 350, 506, 606, 706, 806, 906, 1006, 1106, 1850, the apparatus 2302/2302'). In FIG. 21, operations with dashed lines indicate optional operations.

At 2102, the UE may receive information indicating a narrowband TDD frame structure of a group of narrowband TDD frame structures for narrowband communications. For example, referring to FIG. 8B, UE 806 may receive information 801 indicating a narrowband TDD frame structure for narrowband communications from base station 804. For example, the information 801 may indicate that the narrowband TDD frame structure is one of configuration 0, 1, 2, 3, 4, 5, 6, 1, or o from table 410 in FIG. 4.

At 2104, the UE may receive a downlink grant associated with a narrowband physical downlink channel. For example, referring to FIG. 8B, UE 806 may receive a downlink grant 807 that allocates a first set of subframes for the NPDCCH 809 and/or NPDSCH 809. For example, the downlink grant may indicate that downlink subframes p to q are allocated for the NPDCCH 809 and/or NPDSCH 809.

At 2106, the UE may receive the narrowband physical downlink channel associated with the downlink grant over a plurality of subframes. In one aspect, the plurality of subframes may include uplink subframes, downlink subframes, and special subframes. In one aspect, the narrowband physical downlink channel includes a NPDSCH. In a further aspect, the narrowband physical downlink channel may be received over subframes p to q. For example, referring to FIG. 8B, UE 806 may receive the NPDCCH 809 and/or NPDSCH 809 associated with the downlink grant 807 in at least one subframe in the set of subframes p to q. In a first example associated with FIG. 8B, assume narrowband TDD frame structure is configuration 1, and subframes 3, 4, and 5 (e.g., p is equal to 3 and q is equal to 5) are allocated in the downlink grant 807 for the NPDCCH 809 and/or NPDSCH 809.

At 2108, the UE may receive the narrowband physical downlink channel associated with the downlink grant over a plurality of subframes by receiving the narrowband physical downlink channel from subframe p to subframe q. For example, referring to FIG. 8B, UE 806 may receive the NPDCCH 809 and/or NPDSCH 809 associated with the downlink grant 807 in at least one subframe in the set of subframes p to q. In a first example associated with FIG. 8B, assume narrowband TDD frame structure is configuration 1, and subframes 3, 4, and 5 (e.g., p is equal to 3 and q is equal to 5) are allocated in the downlink grant 807 for the NPDCCH 809 and/or NPDSCH 809.

At 2110, the UE may receive an uplink grant for a narrowband physical uplink channel. In one aspect, the downlink grant and the uplink grant may be received in a same search space. For example, referring to FIG. 8B, UE 806 may receive an uplink grant 811 that allocates a second set of subframes for the NPUCCH 813 and/or NPUSCH 813. For example, the second set of subframes may be located before the first set of subframes, located after the first set of subframes, and/or partially overlap with the first set of subframes. In addition, UE 806 may be restricted to transmit the NPUCCH 813 and/or NPUSCH 813 using a subset of subframes in the second set. In one aspect, the UE 806 may be restricted to a subset of subframes to accommodate switching from receiving the NPDCCH 809 and/or NPDSCH 809 to transmitting the NPUCCH 813 and/or NPUSCH 813. In certain configurations, the downlink grant 807 and the uplink grant 811 may be received in the same search space. In one aspect, a NPUCCH (ACK) and a NPDSCH may not be interlaced. Referring to the first example discussed above with respect to FIG. 8B, assume the uplink grant 811 indicates that the UE 806 may transmit the NPUCCH 813 and/or NPUSCH 813 in uplink subframes located in the set of subframes 1, 2, 3, 4, 5, 6, 7, and 8. In addition, assume the UE 806 is restricted to subframes that are located a number of subframes before the first subframe allocated for the NPDCCH 809 and/or NPDSCH 809 (e.g., subframe p−a). In addition, assume UE 806 is restricted to subframes that are located b number of subframes after the last subframe allocated for the NPDCCH 809 and/or NPDSCH 809 (e.g., subframe q+b). Furthermore, assume that a is equal to 1 and that b is equal to two.

At 2112, the UE may transmit the narrowband physical uplink channel associated with the uplink grant using one or more uplink subframes located at least one of before the plurality of subframes or after the plurality of subframes. In one aspect, the narrowband physical uplink channel includes at least one of a NPUCCH or a NPUSCH. In another aspect, the narrowband physical uplink channel does not includes an ACK/NACK associated with the NPUCCH. For example, referring to FIG. 8B, UE 806 may transmit the NPUCCH 813 and/or NPUSCH 813 using subframes 1, 2, and 8 because subframe 3 is restricted (e.g., 4−1=3) for switching and subframes 6 and 7 are also restricted (e.g., 5+2=7) for switching.

At 2114, the UE may transmit the narrowband physical uplink channel associated with the uplink grant using one or more uplink subframes located at least one of before the plurality of subframes or after the plurality of subframes by transmitting the narrowband uplink physical channel using at least one of subframes before subframe p−a or subframes after subframe q+b. In one aspect, a and b may be positive integers. For example, referring to FIG. 8B, UE 806 may transmit the NPUCCH 813 and/or NPUSCH 813 using subframes 1, 2, and 8 because subframe 3 is restricted (e.g., 4−1=3) for switching and subframes 6 and 7 are also restricted (e.g., 5+2=7) for switching.

Figure 22:
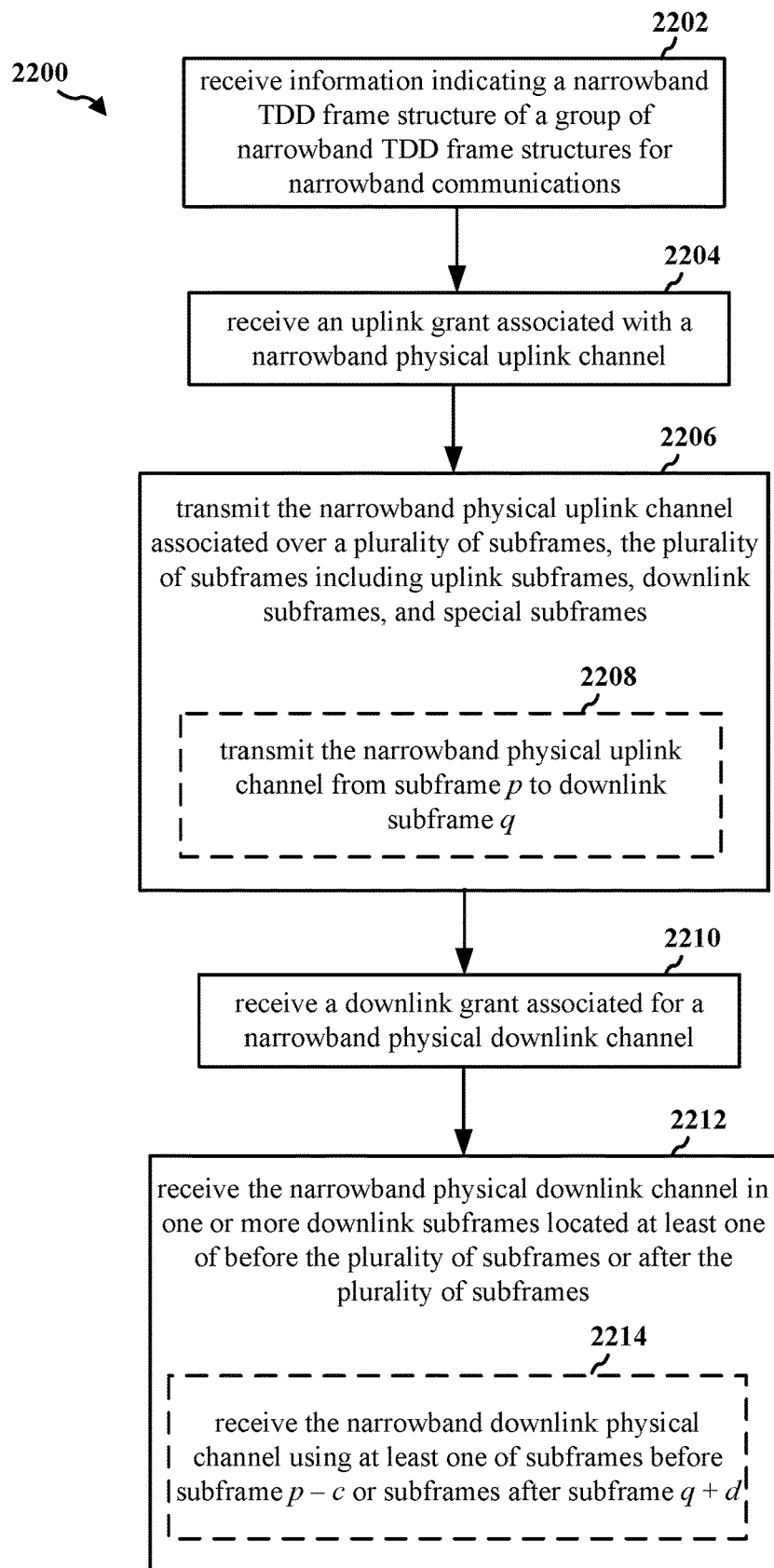
FIG. 22 is a flowchart of a method of wireless communication.

FIG. 22 is a flowchart 2200 of a method of wireless communication. The method may be performed by a UE (e.g., the UE 104, 350, 506, 606, 706, 806, 906, 1006, 1106, 1850, the apparatus 2302/2302'). In FIG. 22, operations with dashed lines indicate optional operations.

At 2202, the UE may receive information indicating a narrowband TDD frame structure of a group of narrowband TDD frame structures for narrowband communications. For example, referring to FIG. 8C, UE 806 may receive information 801 indicating a TDD frame structure for narrowband communications from base station 804. For example, the information 801 may indicate that the narrowband TDD frame structure is one of configuration 0, 1, 2, 3, 4, 5, 6, 1, or o from table 410 in FIG. 4.

At 2204, the UE may receive an uplink grant associated with a narrowband physical uplink channel. For example, referring to FIG. 8C, UE 806 may receive an uplink grant 815 that allocates a first set of subframes for the NPUCCH 817 and/or NPUSCH 817. For example, the uplink grant 815 may indicate that downlink subframes p to q are allocated for the NPUCCH 817 and/or NPUSCH 817.

At 2206, the UE may transmit the narrowband physical uplink channel associated with the uplink grant over a plurality of subframes. In one aspect, the plurality of subframes may include uplink subframes, downlink subframes, and special subframes. For example, referring to FIG. 8C, UE 806 may transmit the NPUCCH 817 and/or NPUSCH 817 associated with the uplink grant 815 in at least one subframe in the set of subframes p to q. As an illustrative example, assume narrowband TDD frame structure is configuration 1, and subframes 6 and 7 (e.g., p is equal to 6 and q is equal to 7) are allocated in the uplink grant 815 for the NPUCCH 817 and/or NPUSCH 817. In other words, the first set of subframes may include a special subframe 6 and uplink subframe 7.

At 2208, the UE may transmit the narrowband physical uplink channel associated with the uplink grant over a plurality of subframes by transmitting the narrowband physical uplink channel from subframe p to subframe q. For example, referring to FIG. 8C, may transmit the NPUCCH 817 and/or NPUSCH 817 associated with the uplink grant 815 in at least one subframe in the set of subframes p to q.

At 2210, the UE may receive a downlink grant for a narrowband physical downlink channel. For example, referring to FIG. 8C, UE 806 may receive downlink grant 819 that allocates a second set of subframes for the NPDCCH 821 and/or NPDSCH 821. For example, the second set of subframes may be located before the first set of subframes, located after the first set of subframes, and/or partially overlap with the first set of subframes. In addition, UE 806 may be restricted to monitor a subset of subframes in the second set for the NPDCCH 821 and/or NPDSCH 821. In one aspect, the UE 806 may be restricted to monitor only a set of the allocated downlink subframes to accommodate switching from transmitting the NPUCCH 817 and/or NPUSCH 817 to monitoring for the NPDCCH 821 and/or NPDSCH 821.

At 2212, the UE may receive the narrowband physical downlink channel associated with the downlink grant in one or more downlink subframes located at least one of before the plurality of subframes or after the plurality of subframes. For example, referring to FIG. 8C, UE 806 may receive the NPDCCH 821 and/or NPDSCH 821 in the second set of subframes. For example, the second set of subframes may be located before the first set of subframes, located after the first set of subframes, and/or partially overlap with the first set of subframes. In addition, UE 806 may be restricted to monitor a subset of subframes in the second set for the NPDCCH 821 and/or NPDSCH 821. In one aspect, the UE 806 may be restricted to monitor only a set of the allocated downlink subframes to accommodate switching from transmitting the NPUCCH 817 and/or NPUSCH 817 to monitoring for the NPDCCH 821 and/or NPDSCH 821 that may be received in the second set of subframes. Referring to the example discussed above with respect to FIG. 8C, assume the downlink grant 819 indicates that the UE 806 that downlink subframes located between subframes 4, 5, 6, 7, 8, and 9 are allocated for the NPDCCH 821 and/or NPDSCH 821. In addition, assume the UE 806 is restricted to subframes that are located c number of subframes before the first subframe allocated for the NPUCCH 817 and/or NPUSCH 817 (e.g., subframe p−c). In addition, assume UE 806 is restricted to subframes that are located d number of subframes after the last subframe allocated for the NPUCCH 817 and/or NPUSCH 817 (e.g., subframe q+d). Furthermore, assume that c is equal to 1 and that d is equal to one. Hence, UE 806 may monitor downlink subframes 4 and 9 and not subframe 5 because subframe 5 is restricted (e.g., 6-1=5) for switching. There are no downlink subframes located after subframe 7, and thus no downlink subframes after subframe 7 are restricted for switching.

At 2214, the UE may receive the narrowband physical downlink channel associated with the downlink grant in one or more downlink subframes located at least one of before the plurality of subframes or after the plurality of subframes by receiving the narrowband downlink physical channel using at least one of subframes before subframe p−c or subframes after subframe q+d. In one aspect, c and d may be positive integers. For example, referring to FIG. 8C, UE 806 may receive the NPDCCH 821 and/or NPDSCH 821 in the second set of subframes. For example, the second set of subframes may be located before the first set of subframes, located after the first set of subframes, and/or partially overlap with the first set of subframes. In addition, UE 806 may be restricted to monitor a subset of subframes in the second set for the NPDCCH 821 and/or NPDSCH 821. In one aspect, the UE 806 may be restricted to monitor only a set of the allocated downlink subframes to accommodate switching from transmitting the NPUCCH 817 and/or NPUSCH 817 to monitoring for the NPDCCH 821 and/or NPDSCH 821 that may be received in the second set of subframes. Referring to the example discussed above with respect to FIG. 8C, assume the downlink grant 819 indicates that the UE 806 that downlink subframes located between subframes 4, 5, 6, 7, 8, and 9 are allocated for the NPDCCH 821 and/or NPDSCH 821. In addition, assume the UE 806 is restricted to subframes that are located c number of subframes before the first subframe allocated for the NPUCCH 817 and/or NPUSCH 817 (e.g., subframe p−c). In addition, assume UE 806 is restricted to subframes that are located d number of subframes after the last subframe allocated for the NPUCCH 817 and/or NPUSCH 817 (e.g., subframe q+d). Furthermore, assume that c is equal to 1 and that d is equal to one. Hence, UE 806 may monitor downlink subframes 4 and 9 and not subframe 5 because subframe 5 is restricted (e.g., 6−1=5) for switching. There are no downlink subframes located after subframe 7, and thus no downlink subframes after subframe 7 are restricted for switching.

Figure 23:
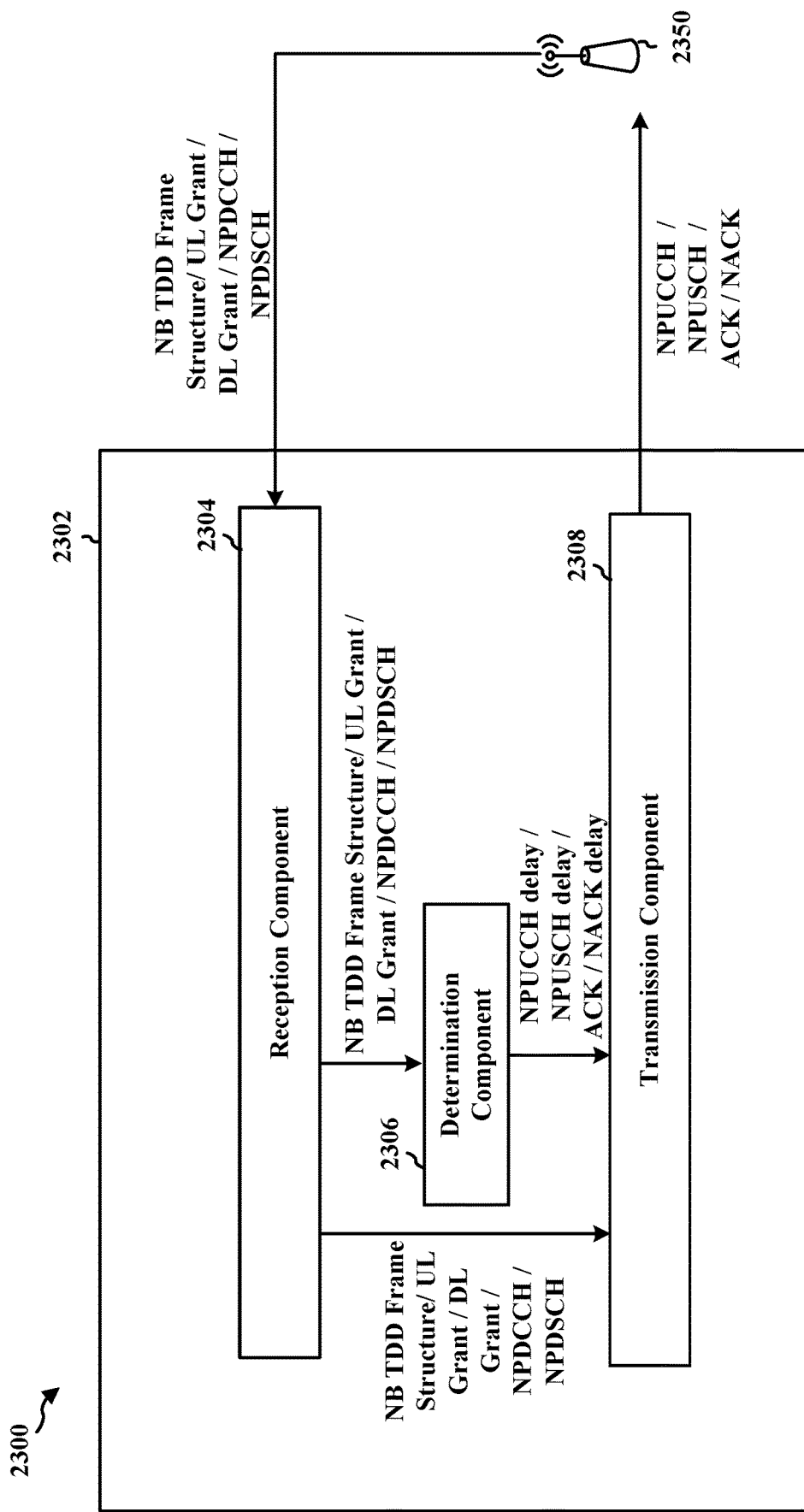
FIG. 23 is a conceptual data flow diagram illustrating the data flow between different means/components in an exemplary apparatus.

FIG. 23 is a conceptual data flow diagram 2300 illustrating the data flow between different means/components in an exemplary apparatus 2302. The apparatus may be a UE (e.g., the UE 104, 350, 506, 606, 706, 806, 906, 1006, 1106, the apparatus 2302') in narrowband communication (e.g., NB-IoT communication or eMTC) with base station 2350 (e.g., base station 102, 180, 504, 604, 704, 804, 9004, 1004, 1104, the apparatus 1802/1802', eNB 310). The apparatus may include reception component 2304 that may receive information indicating a narrowband TDD frame structure of a group of narrowband TDD frame structures for narrowband communications. Reception component 2304 may send a signal associated with the narrowband TDD frame structure to determination component 2306. In addition, reception component 2304 may monitor one or more downlink subframes in a first radio frame that includes the narrowband TDD frame structure for a downlink transmission from base station 2350. Transmission component 2308 may delay at least one uplink transmission to an uplink subframe in a second radio frame that is subsequent to the first radio frame. Further, reception component 2304 may receive a downlink grant associated with a narrowband physical downlink channel. Reception component 2304 may send a signal associated with the downlink grant to determination component 2306. In addition, reception component 2304 may receive the narrowband physical downlink channel associated with the downlink grant over a plurality of subframes. In one aspect, the plurality of subframes may include uplink subframes, downlink subframes, and special subframes. In one aspect, the narrowband physical downlink channel includes a NPDSCH. In a further aspect, the narrowband physical downlink channel may be received over subframes p to q. Reception component 2304 may send a signal associated with the received narrowband physical downlink channel to determination component 2306. Further, reception component 2304 may receive an uplink grant for a narrowband physical uplink channel. In one aspect, the downlink grant and the uplink grant may be received in a same search space. Reception component 2304 may send a signal associated with the uplink grant to determination component 2306. Determination component 2306 may determine one or more of a number of symbols, subframes, and/or radio frames to delay a transmission of one of more of a NPUCCH, NPUSCH, and/or ACK/NACK associated with one or more of a NPDCCH and/or NPDSCH. Determination component 2306 may send a signal associated with the delayed symbols, subframes, and/or radio frames to transmission component 2308. Transmission component 2308 may transmit the narrowband physical uplink channel associated with the uplink grant using one or more uplink subframes located at least one of before the plurality of subframes or after the plurality of subframes. In one aspect, the narrowband physical uplink channel includes at least one of a NPUCCH or a NPUSCH. In another aspect, the narrowband physical uplink channel does not includes an ACK/NACK associated with the NPUCCH. For example, transmission component 2308 may transmit the narrowband physical uplink channel associated with the uplink grant using one or more uplink subframes located at least one of before the plurality of subframes or after the plurality of subframes, e.g., by transmitting the narrowband uplink physical channel using at least one of subframes before subframe p−a or subframes after subframe q+b, a and b being positive integers. Additionally and/or alternatively, transmission component 2308 may transmit the narrowband physical uplink channel associated with the uplink grant over a plurality of subframes by transmitting the narrowband physical uplink channel from subframe p to subframe q. Reception component 2304 may receive the narrowband physical downlink channel associated with the downlink grant in one or more downlink subframes located at least one of before the plurality of subframes or after the plurality of subframes. For example, reception component 2304 may receive the narrowband downlink physical channel using at least one of subframes before subframe p−c or subframes after subframe q+d. In one aspect, c and d may be positive integers.

The apparatus may include additional components that perform each of the blocks of the algorithm in the aforementioned flowcharts of FIGS. 20-22. As such, each block in the aforementioned flowcharts of FIGS. 20-22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 24:
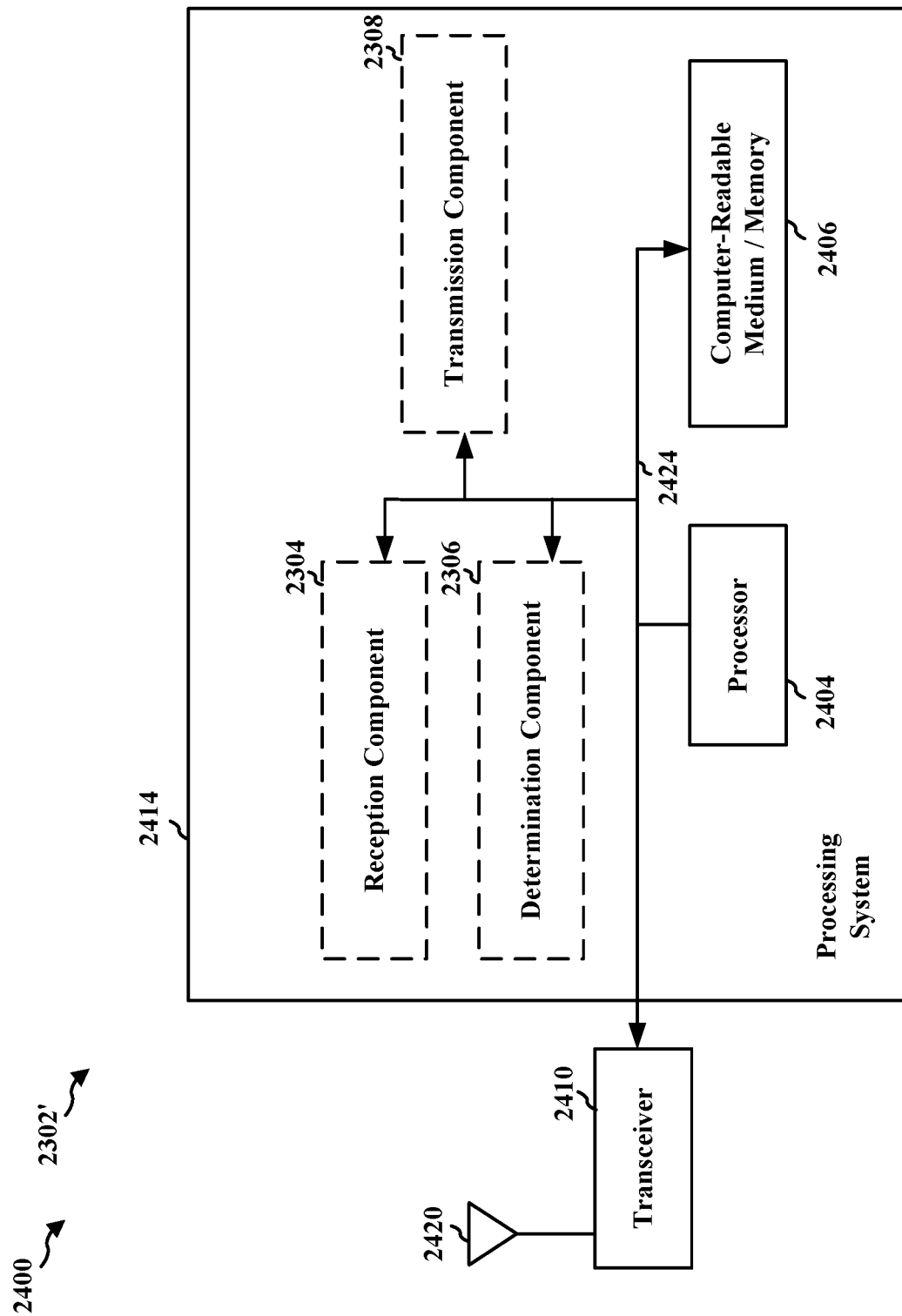
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware components, represented by the processor 2404, the components 2304, 2306, 2308, and the computer-readable medium/memory 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the reception component 2304. In addition, the transceiver 2410 receives information from the processing system 2414, specifically the transmission component 2308, and based on the received information, generates a signal to be applied to the one or more antennas 2420. The processing system 2414 includes a processor 2404 coupled to a computer-readable medium/memory 2406. The processor 2404 is responsible for general processing, including the execution of software stored on the computer-readable medium/memory 2406. The software, when executed by the processor 2404, causes the processing system 2414 to perform the various functions described above for any particular apparatus. The computer-readable medium/memory 2406 may also be used for storing data that is manipulated by the processor 2404 when executing software. The processing system 2414 further includes at least one of the components 2304, 2306, 2308. The components may be software components running in the processor 2404, resident/stored in the computer readable medium/memory 2406, one or more hardware components coupled to the processor 2404, or some combination thereof. The processing system 2414 may be a component of the UE 350 and may include the memory 360 and/or at least one of the TX processor 368, the RX processor 356, and the controller/processor 359.

In one configuration, the apparatus 2302/2302' for wireless communication may include means for receiving information indicating a narrowband TDD frame structure of a group of narrowband TDD frame structures for narrowband communications. In another configuration, the apparatus 2302/2302' for wireless communication may include means for monitoring one or more downlink subframes in a first radio frame that includes the narrowband TDD frame structure for a downlink transmission from a base station. In a further configuration, the apparatus 2302/2302' for wireless communication may include means for delaying at least one uplink transmission to an uplink subframe in a second radio frame that is subsequent to the first radio frame. In one configuration, the apparatus 2302/2302' for wireless communication may include means for receiving a downlink grant associated with a narrowband physical downlink channel. In another configuration, the apparatus 2302/2302' for wireless communication may include means for receiving the narrowband physical downlink channel associated with the downlink grant over a plurality of subframes. In one aspect, the plurality of subframes may include uplink subframes, downlink subframes, and special subframes. In one aspect, the narrowband physical downlink channel includes a NPDSCH. In a further aspect, the narrowband physical downlink channel may be received over subframes p to q. In a further configuration, the apparatus 2302/2302' for wireless communication may include means for receiving an uplink grant for a narrowband physical uplink channel. In one aspect, the downlink grant and the uplink grant may be received in a same search space. In one configuration, the apparatus 2302/2302' for wireless communication may include means for transmitting the narrowband physical uplink channel associated with the uplink grant using one or more uplink subframes located at least one of before the plurality of subframes or after the plurality of subframes. In one aspect, the narrowband physical uplink channel includes at least one of a NPUCCH or a NPUSCH. In another aspect, the narrowband physical uplink channel does not includes an ACK/NACK associated with the NPUCCH. In one aspect, the means for transmitting the narrowband physical uplink channel associated with the uplink grant using one or more uplink subframes located at least one of before the plurality of subframes or after the plurality of subframes, e.g., by transmitting the narrowband uplink physical channel using at least one of subframes before subframe p−a or subframes after subframe q+b. In one aspect, a and b may be positive integers. In a further configuration, the apparatus 2302/2302' for wireless communication may include means for transmitting the narrowband physical uplink channel associated with the uplink grant over a plurality of subframes. In one aspect, the plurality of subframes may include uplink subframes, downlink subframes, and special subframes. In one configuration, the apparatus 2302/2302' for wireless communication may include means for transmitting the narrowband physical uplink channel associated with the uplink grant over a plurality of subframes by transmitting the narrowband physical uplink channel from subframe p to downlink subframe q. In another configuration, the apparatus 2302/2302' for wireless communication may include means for receiving the narrowband physical downlink channel associated with the downlink grant in one or more downlink subframes located at least one of before the plurality of subframes or after the plurality of subframes. In one aspect, the means for receiving the narrowband downlink physical channel may be configured to receive the narrowband physical channel using at least one of subframes before subframe p−c or subframes after subframe q+d. In one aspect, c and d may be positive integers. The aforementioned means may be one or more of the aforementioned components of the apparatus 2302 and/or the processing system 2414 of the apparatus 2302' configured to perform the functions recited by the aforementioned means. As described above, the processing system 2414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a User Equipment (UE), comprising:
    receiving a narrowband physical downlink channel in a first subframe in a time-division duplex (TDD) frame structure of a plurality of TDD frame structures for narrowband communications including one or more special subframes, wherein the first subframe is a downlink subframe; and
    receiving the narrowband physical downlink channel in a special subframe of the TDD frame structure, if a number of downlink orthogonal frequency division multiplexing (OFDM) symbols in the special subframe is greater than a predetermined threshold.

2. The method of claim 1, wherein the narrowband physical downlink channel includes at least one of a narrowband physical downlink shared channel (NPDSCH) or a narrowband physical downlink control channel (NPDCCH).

3. The method of claim 1, further comprising receiving the narrowband physical downlink channel in a subset of OFDM symbols punctured in the special subframe of the TDD frame structure, if the number of OFDM symbols in the special subframe is less than the predetermined threshold.

4. A method of wireless communication for a User Equipment (UE), comprising:
    receiving a narrowband physical downlink channel in a first subframe in a time-division duplex (TDD) frame structure of a plurality of TDD frame structures for narrowband communications including one or more special subframes, wherein the first subframe is a downlink subframe; and
    receiving the narrowband physical downlink channel in a special subframe, wherein a portion of the narrowband physical downlink channel is mapped to a subset of punctured orthogonal frequency division multiplexing (OFDM) symbols, the subset of punctured OFDM symbols including one or more OFDM symbols in a uplink portion of the special subframe.

5. The method of claim 4, wherein the narrowband physical downlink channel is received in at least one OFDM symbol in a downlink portion of the special subframe punctured.

6. A method of wireless communication for a User Equipment (UE), comprising:
    receiving a narrowband physical downlink channel in a first subframe in a time-division duplex (TDD) frame structure of a plurality of TDD frame structures for narrowband communications including one or more special subframes, wherein the first subframe is a downlink subframe; and
    receiving the narrowband physical downlink channel in a special subframe of the TDD frame structure, wherein the narrowband physical downlink channel is rate matched for the special subframe based on a number of downlink orthogonal frequency division multiplexing (OFDM) symbols in the special subframe.

7. An apparatus for wireless communication for a User Equipment (UE), comprising:
    a memory; and
    at least one processor coupled to the memory and configured to:
        receive a narrowband physical downlink channel in a first subframe in a time-division duplex (TDD) frame structure of a plurality of TDD frame structures for narrowband communications including one or more special subframes, wherein the first subframe is a downlink subframe; and
        receive the narrowband physical downlink channel in a special subframe of the TDD frame structure, if a number of downlink orthogonal frequency division multiplexing (OFDM) symbols in the special subframe is greater than a predetermined threshold.

8. The apparatus of claim 7, wherein the narrowband physical downlink channel includes at least one of a narrowband physical downlink shared channel (NPDSCH) or a narrowband physical downlink control channel (NPDCCH).

9. The apparatus of claim 7, wherein the at least one processor is further configured to receive the narrowband physical downlink channel in a subset of OFDM symbols punctured in the special subframe of the TDD frame structure, if the number of OFDM symbols in the special subframe is less than the predetermined threshold.

10. An apparatus for wireless communication for User Equipment (UE), comprising:
    a memory; and
    at least one processor coupled to the memory and configured to:
        receive a narrowband physical downlink channel in a first subframe in a time-division duplex (TDD) frame structure of a plurality of TDD frame structures for narrowband communications including one or more special subframes, wherein the first subframe is a downlink subframe; and
        receive the narrowband physical downlink channel in a special subframe, wherein a portion of the narrowband physical downlink channel is mapped to a subset of punctured orthogonal frequency division multiplexing (OFDM) symbols, the subset of punctured OFDM symbols including one or more OFDM symbols in a uplink portion of the special subframe.

11. The apparatus of claim 10, wherein the narrowband physical downlink channel is received in at least one OFDM symbol in a downlink portion of the special subframe punctured.

12. An apparatus for wireless communication User Equipment (UE), comprising:
a memory; and
at least one processor coupled to the memory and configured to:
receive a narrowband physical downlink channel in a first subframe in a time-division duplex (TDD) frame structure of a plurality of TDD frame structures for narrowband communications including one or more special subframes, wherein the first subframe is a downlink subframe; and
receive the narrowband physical downlink channel in a special subframe of the TDD frame structure, wherein the narrowband physical downlink channel is rate matched for the special subframe based on a number of downlink orthogonal frequency division multiplexing (OFDM) symbols in the special subframe.

13. A computer-readable medium storing computer executable code for a User Equipment (UE), comprising code to:
receive a narrowband physical downlink channel in a first subframe in a time-division duplex (TDD) frame structure of a plurality of TDD frame structures for narrowband communications including one or more special subframes, wherein the first subframe is a downlink subframe; and
receive the narrowband physical downlink channel in a special subframe of the TDD frame structure, if a number of downlink orthogonal frequency division multiplexing (OFDM) symbols in the special subframe is greater than a predetermined threshold.

14. The computer-readable medium of claim 13, wherein the narrowband physical downlink channel includes at least one of a narrowband physical downlink shared channel (NPDSCH) or a narrowband physical downlink control channel (NPDCCH).

15. The computer-readable medium of claim 13, further comprising code to receive the narrowband physical downlink channel in a subset of OFDM symbols punctured in the special subframe of the TDD frame structure, if the number of OFDM symbols in the special subframe is less than the predetermined threshold.

16. A computer-readable medium storing computer executable code for User Equipment (UE), comprising code to:
receive a narrowband physical downlink channel in a first subframe in a time-division duplex (TDD) frame structure of a plurality of TDD frame structures for narrowband communications including one or more special subframes, wherein the first subframe is a downlink subframe; and
receive the narrowband physical downlink channel in a special subframe, wherein a portion of the narrowband physical downlink channel is mapped to a subset of punctured orthogonal frequency division multiplexing (OFDM) symbols, the subset of punctured OFDM symbols including one or more OFDM symbols in a uplink portion of the special subframe.

17. The computer-readable medium of claim 16, wherein the narrowband physical downlink channel is received in at least one OFDM symbol in a downlink portion of the special subframe punctured.

18. A computer-readable medium storing computer executable code for User Equipment (UE), comprising code to:
receive a narrowband physical downlink channel in a first subframe in a time-division duplex (TDD) frame structure of a plurality of TDD frame structures for narrowband communications including one or more special subframes, wherein the first subframe is a downlink subframe; and
receive the narrowband physical downlink channel in a special subframe of the TDD frame structure, wherein the narrowband physical downlink channel is rate matched for the special subframe based on a number of downlink orthogonal frequency division multiplexing (OFDM) symbols in the special subframe.

* * * * *